July 2, 1946.  A. H. DICKINSON  2,402,988
ACCOUNTING APPARATUS
Filed May 23, 1941   26 Sheets-Sheet 2
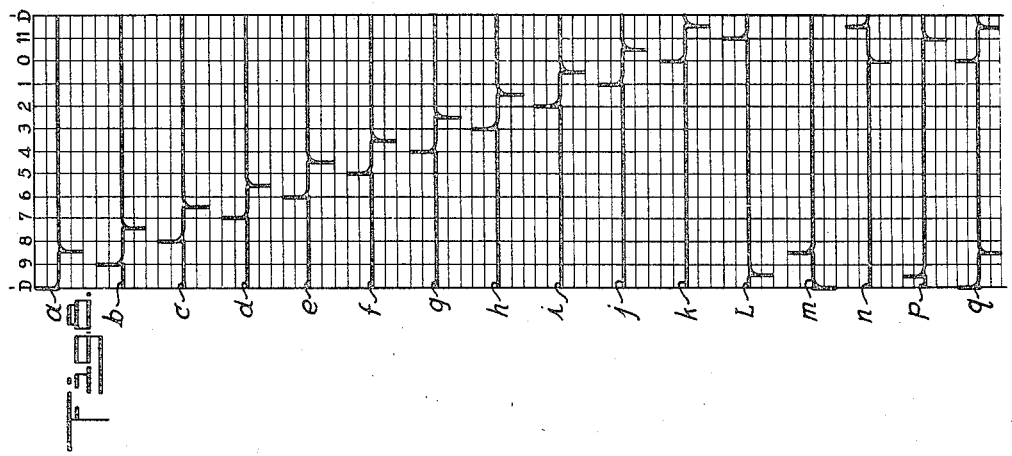
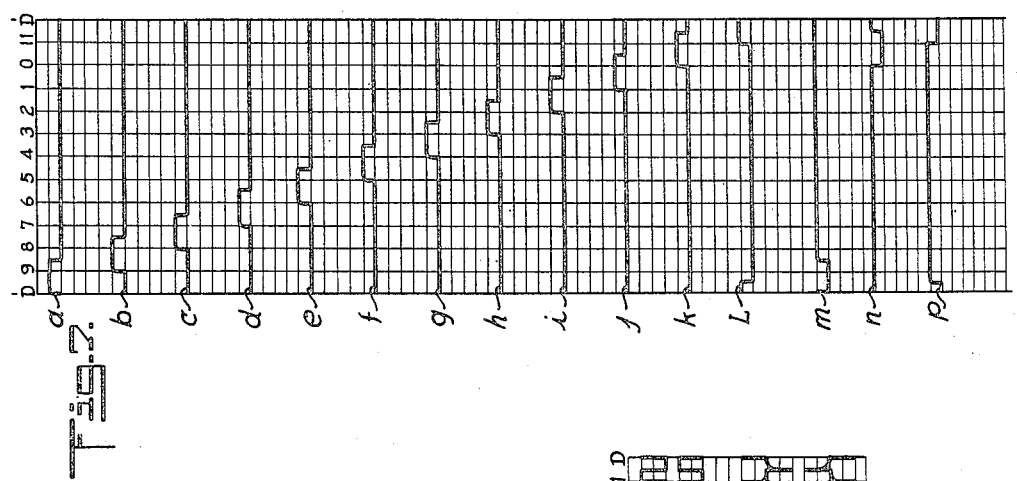
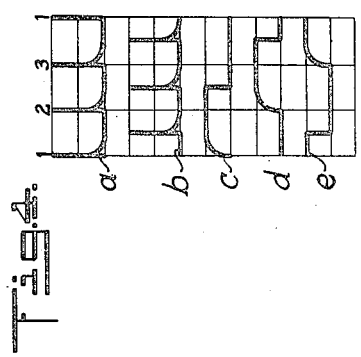
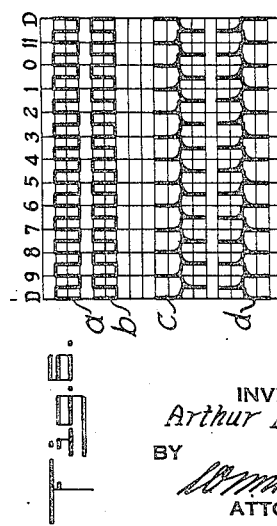
INVENTOR
Arthur H. Dickinson
BY
ATTORNEY

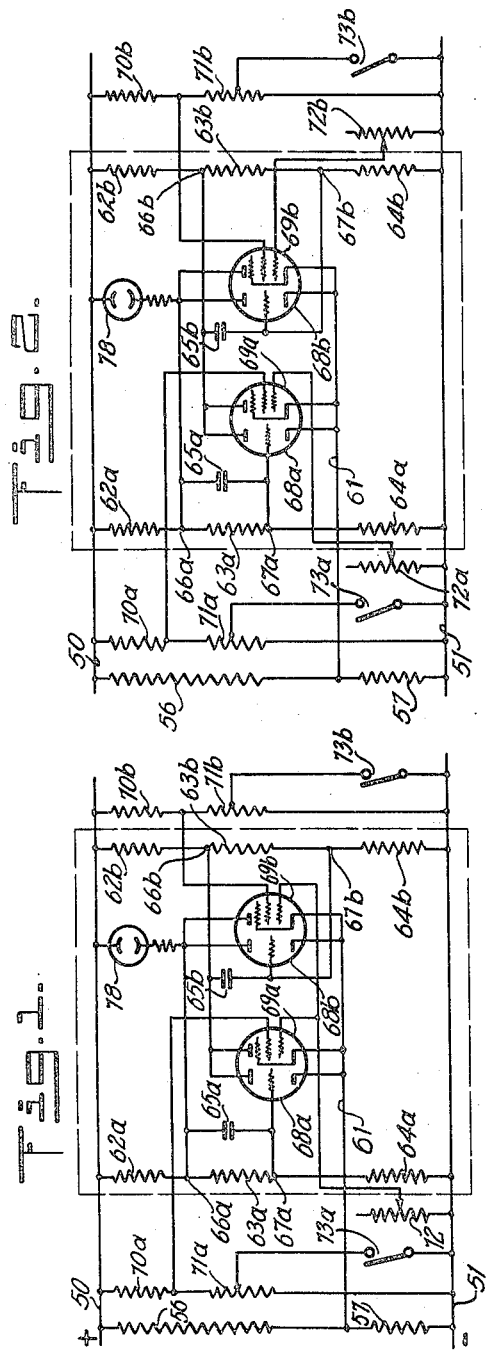

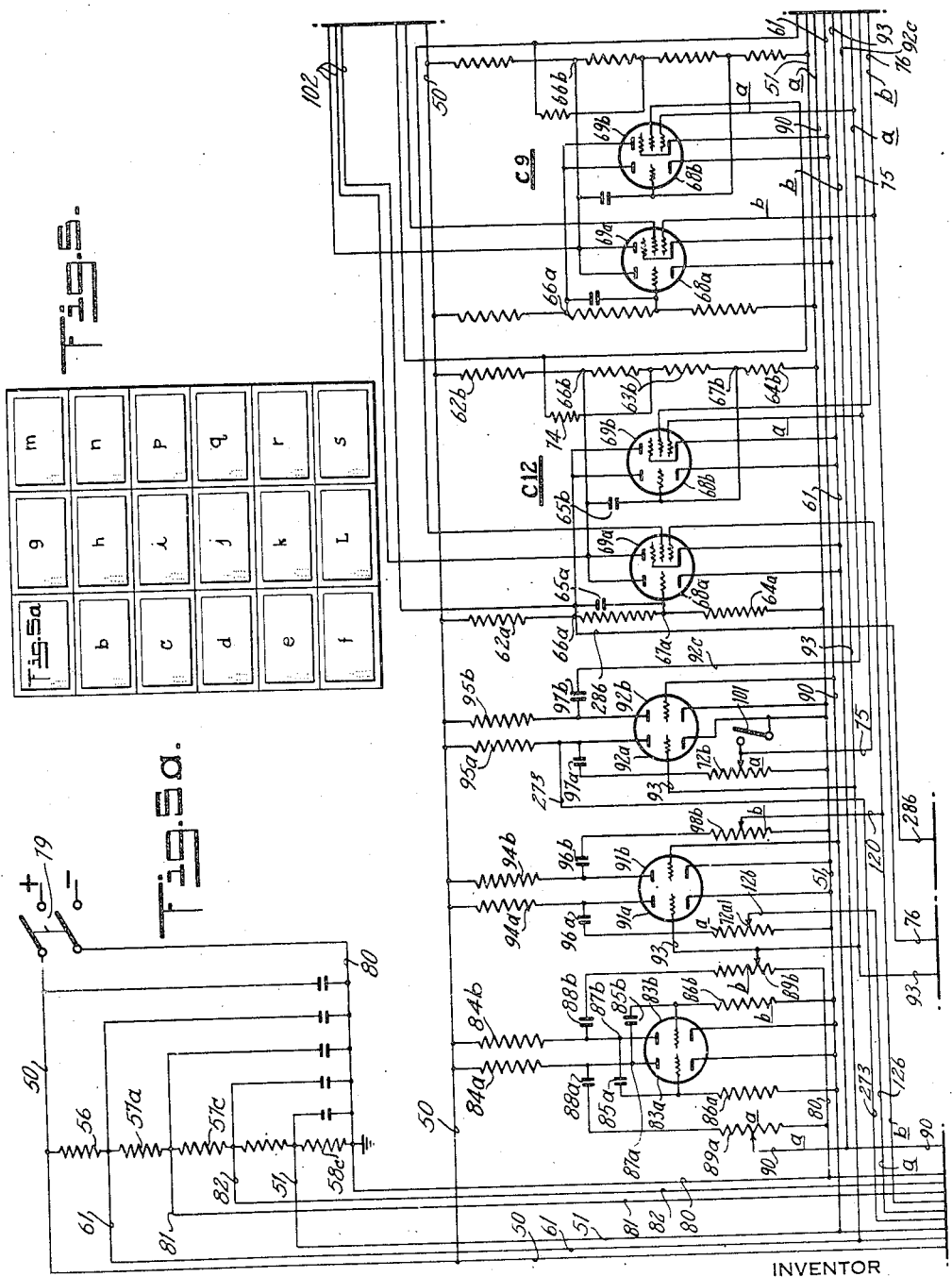

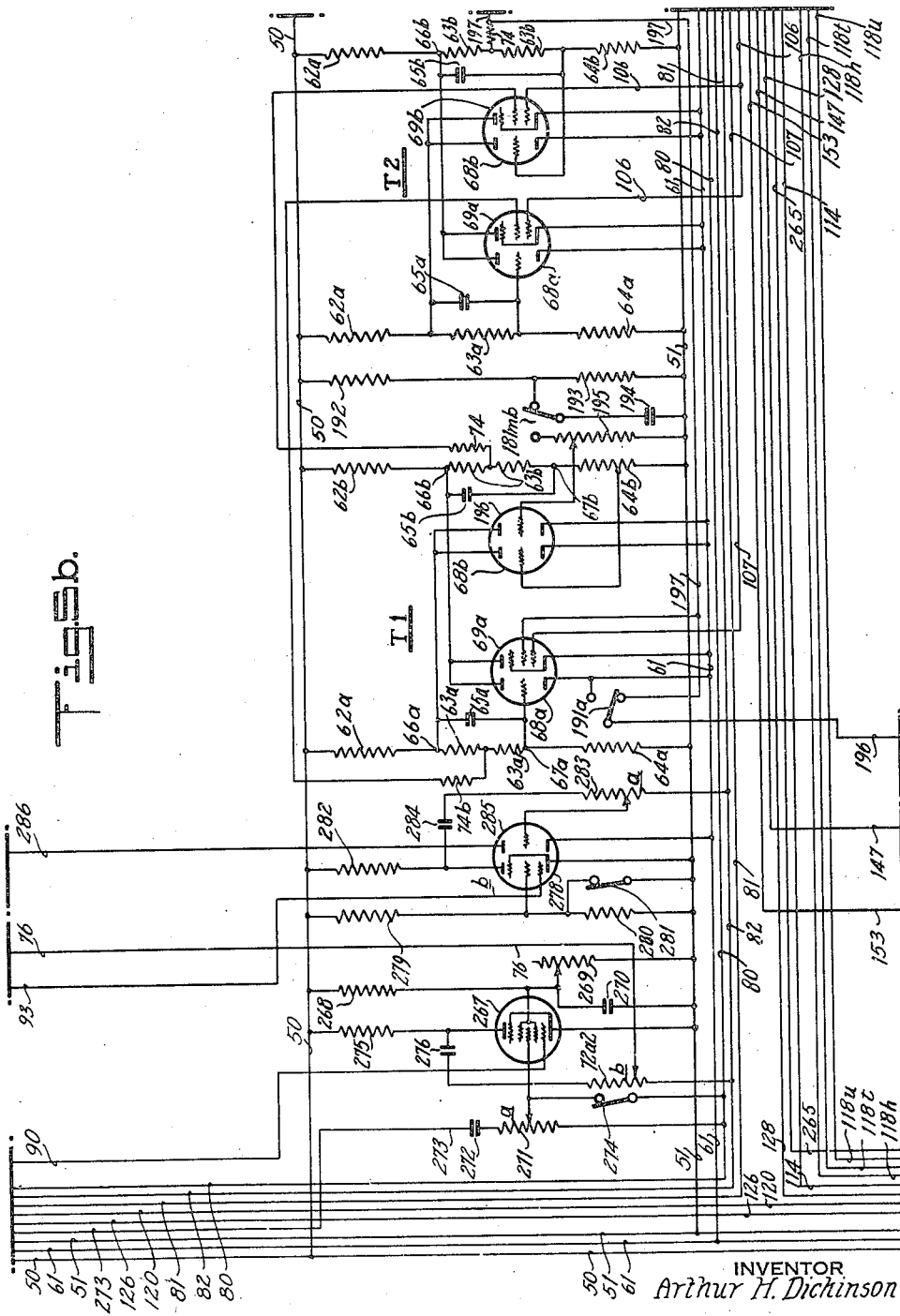

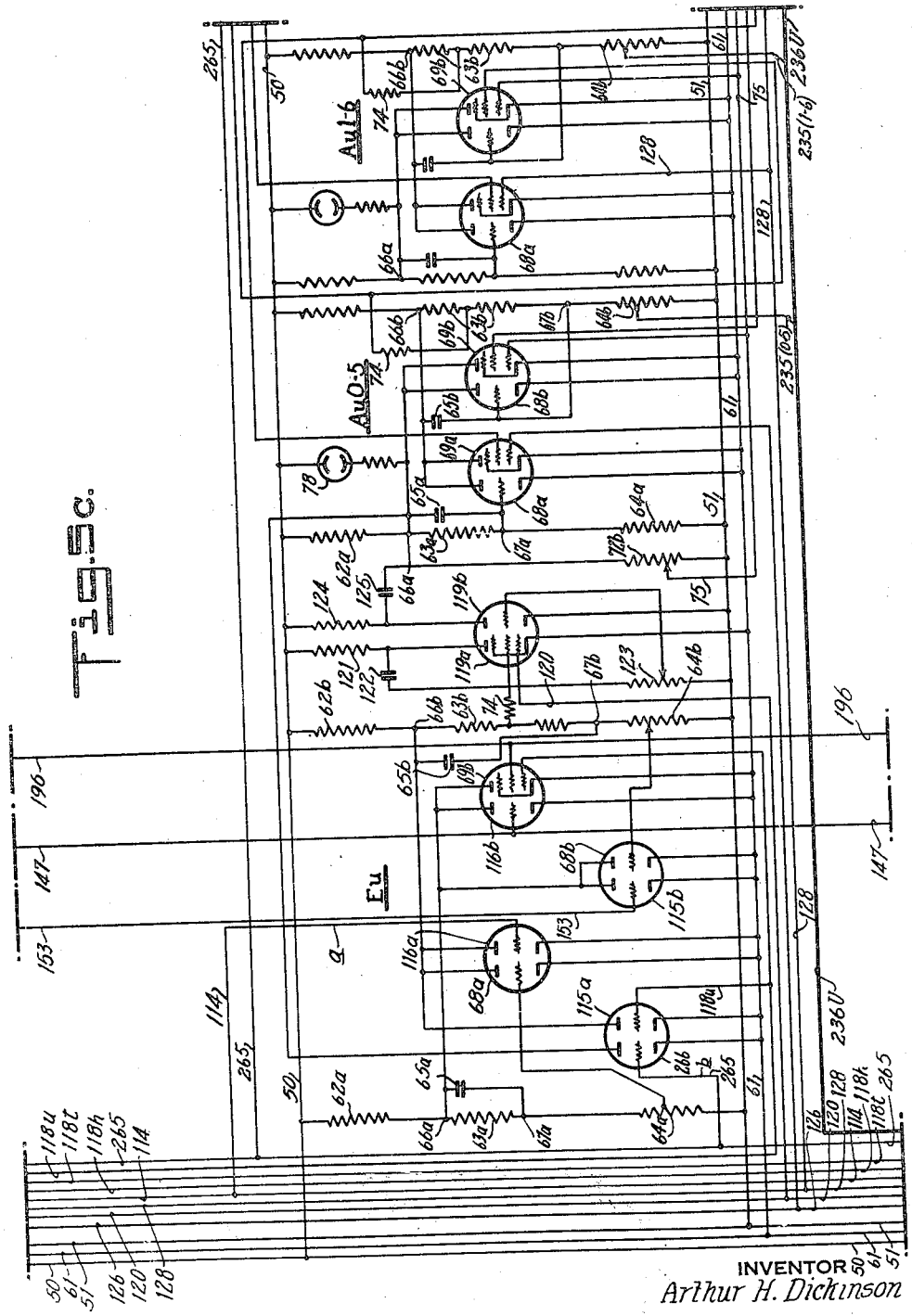

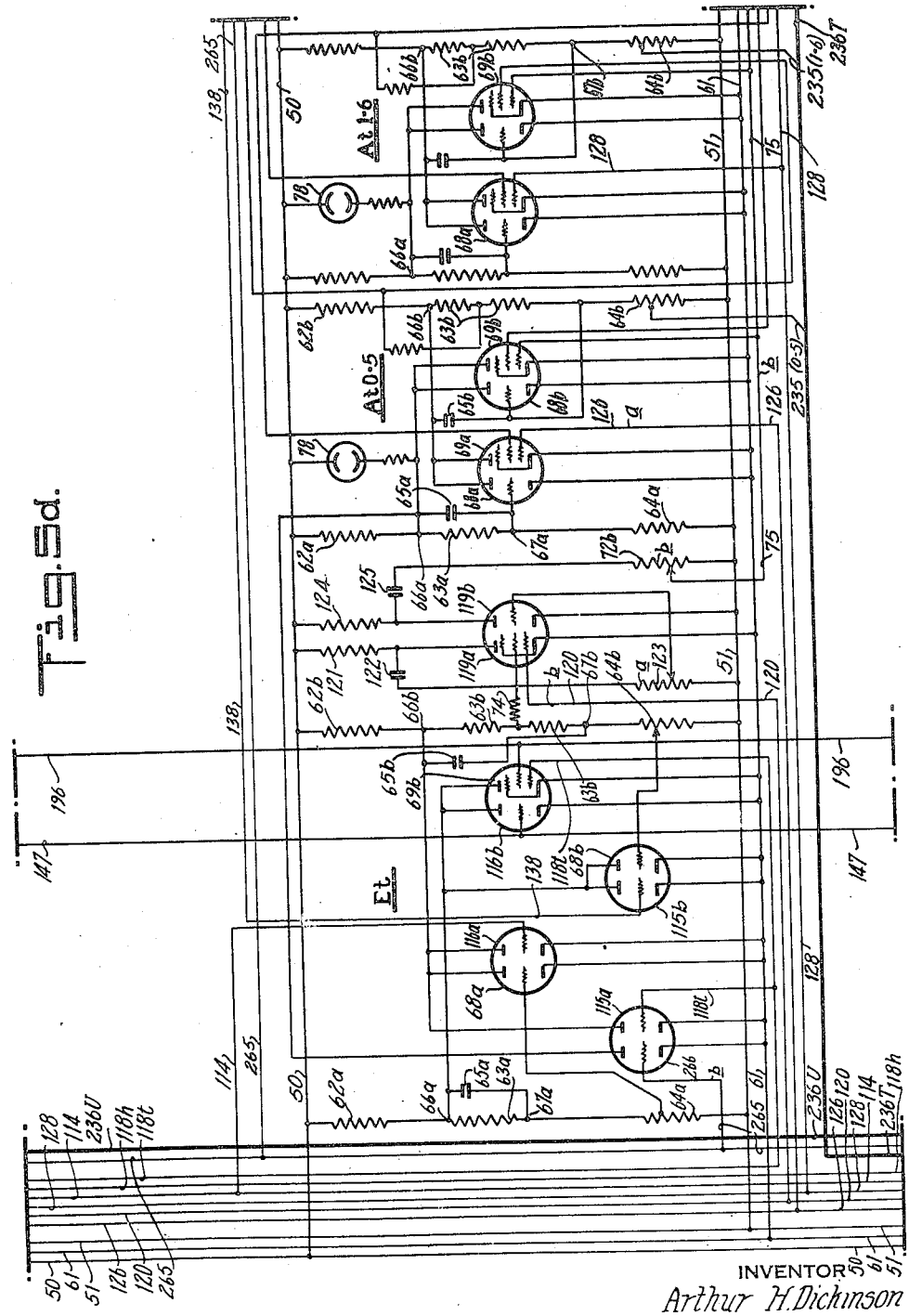

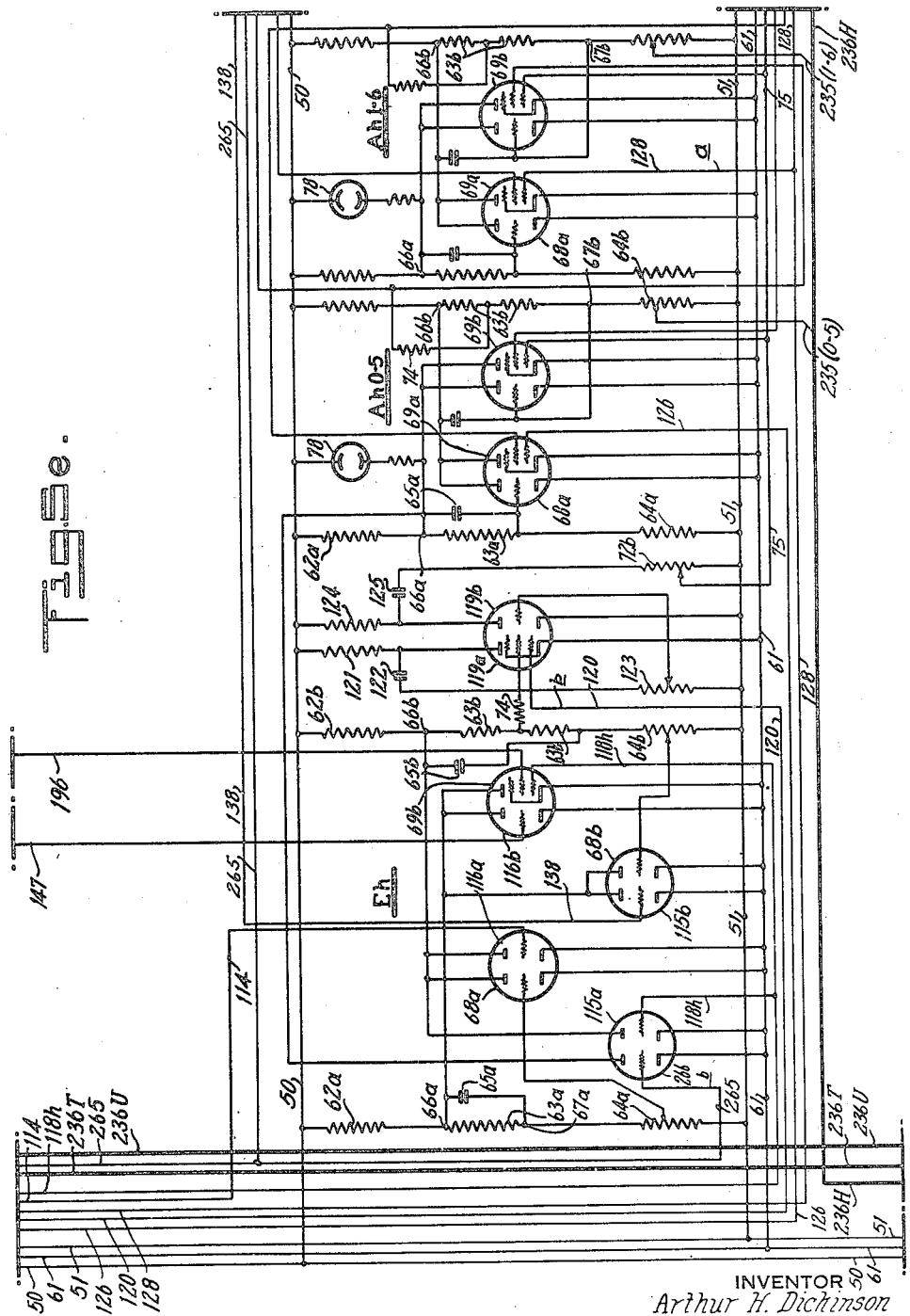

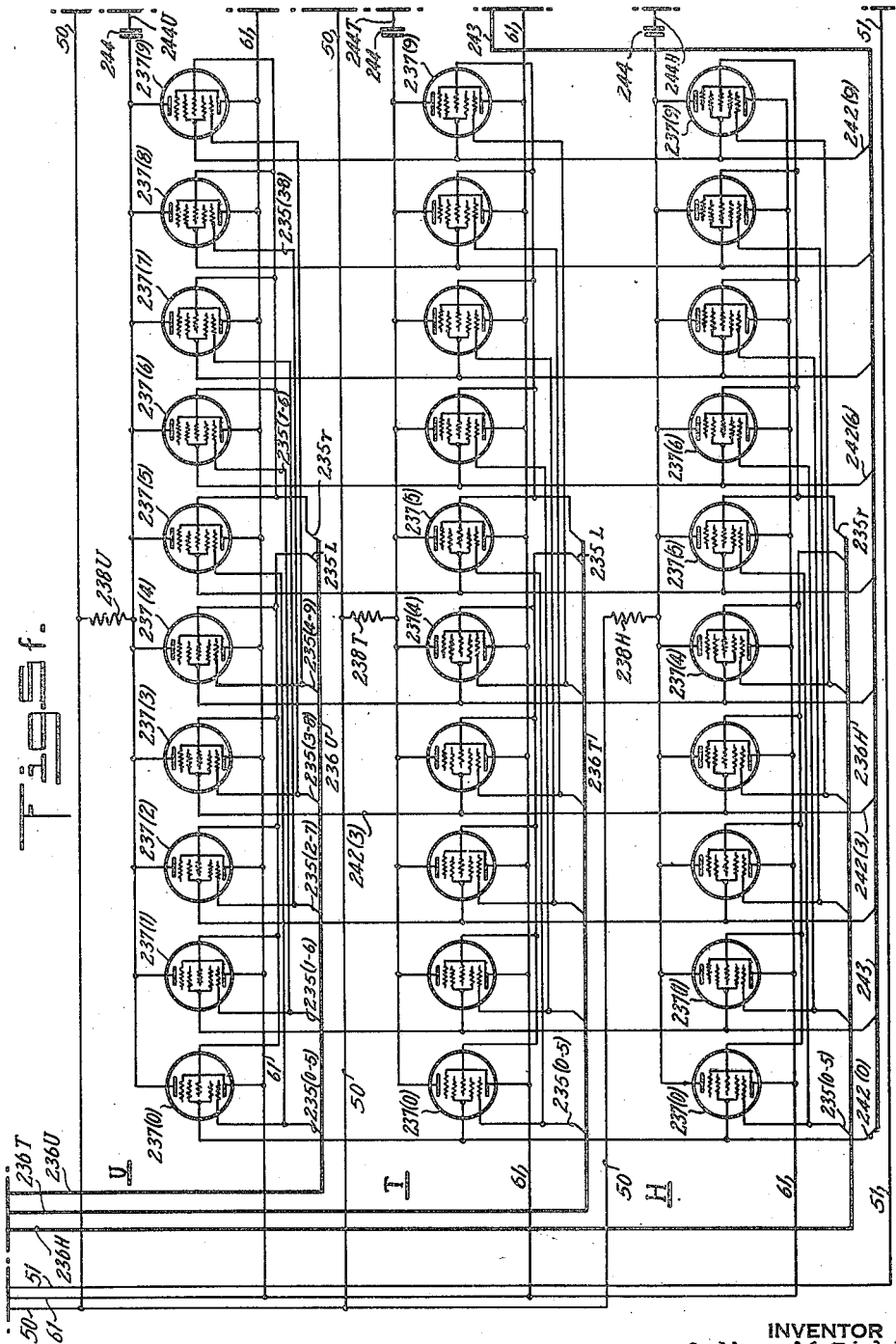

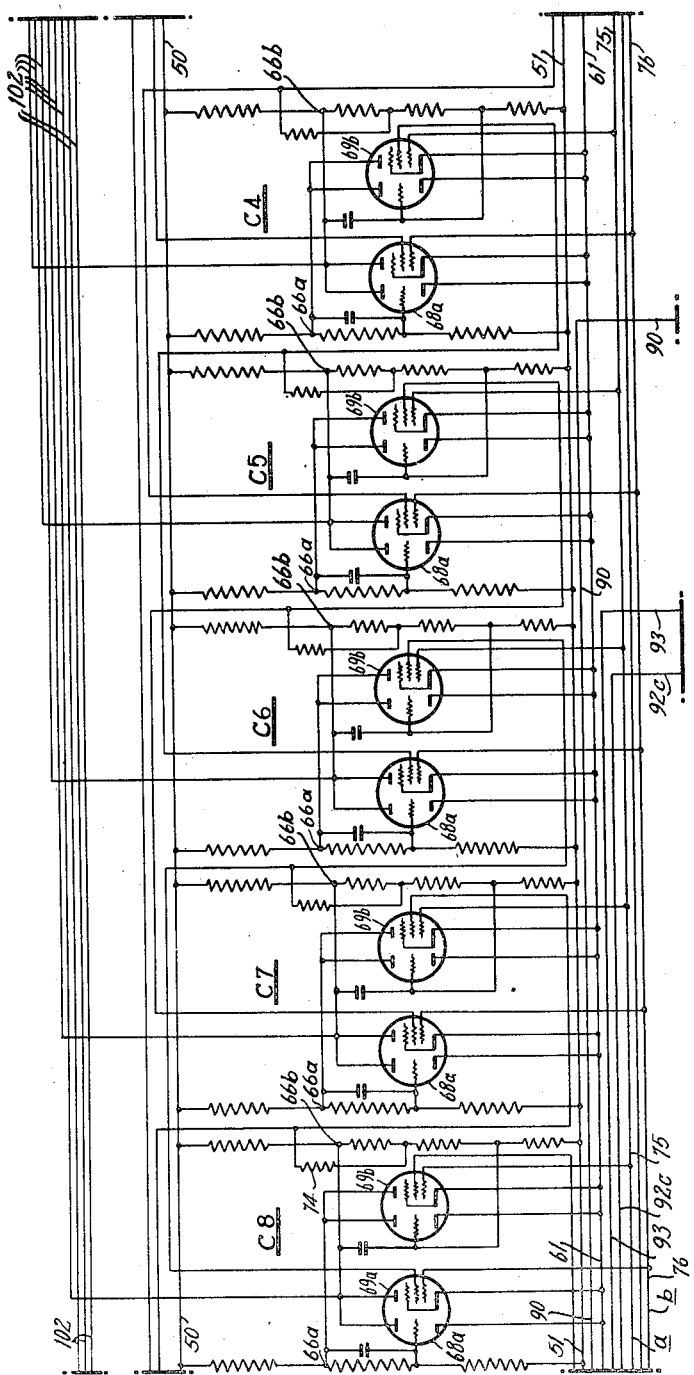

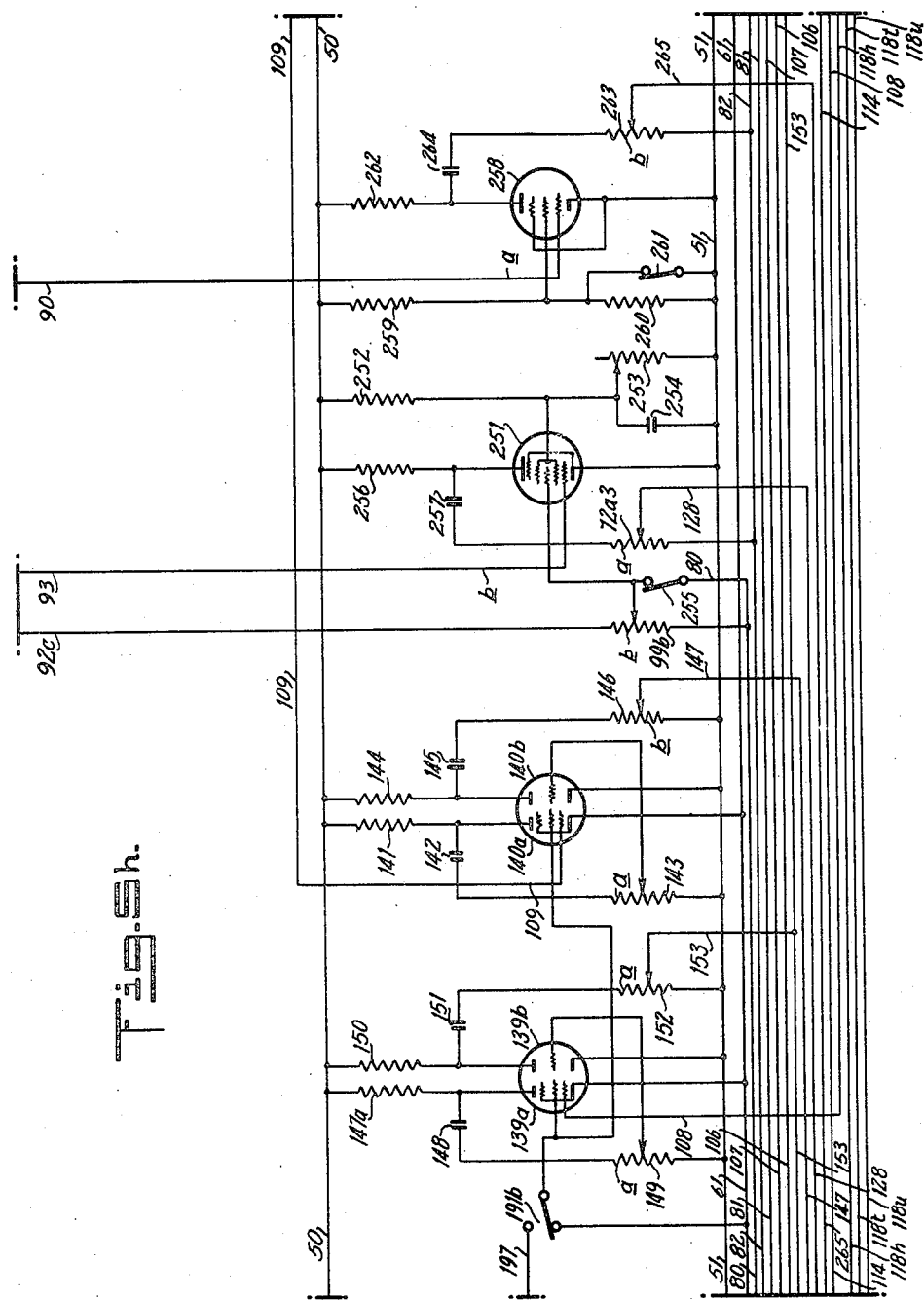

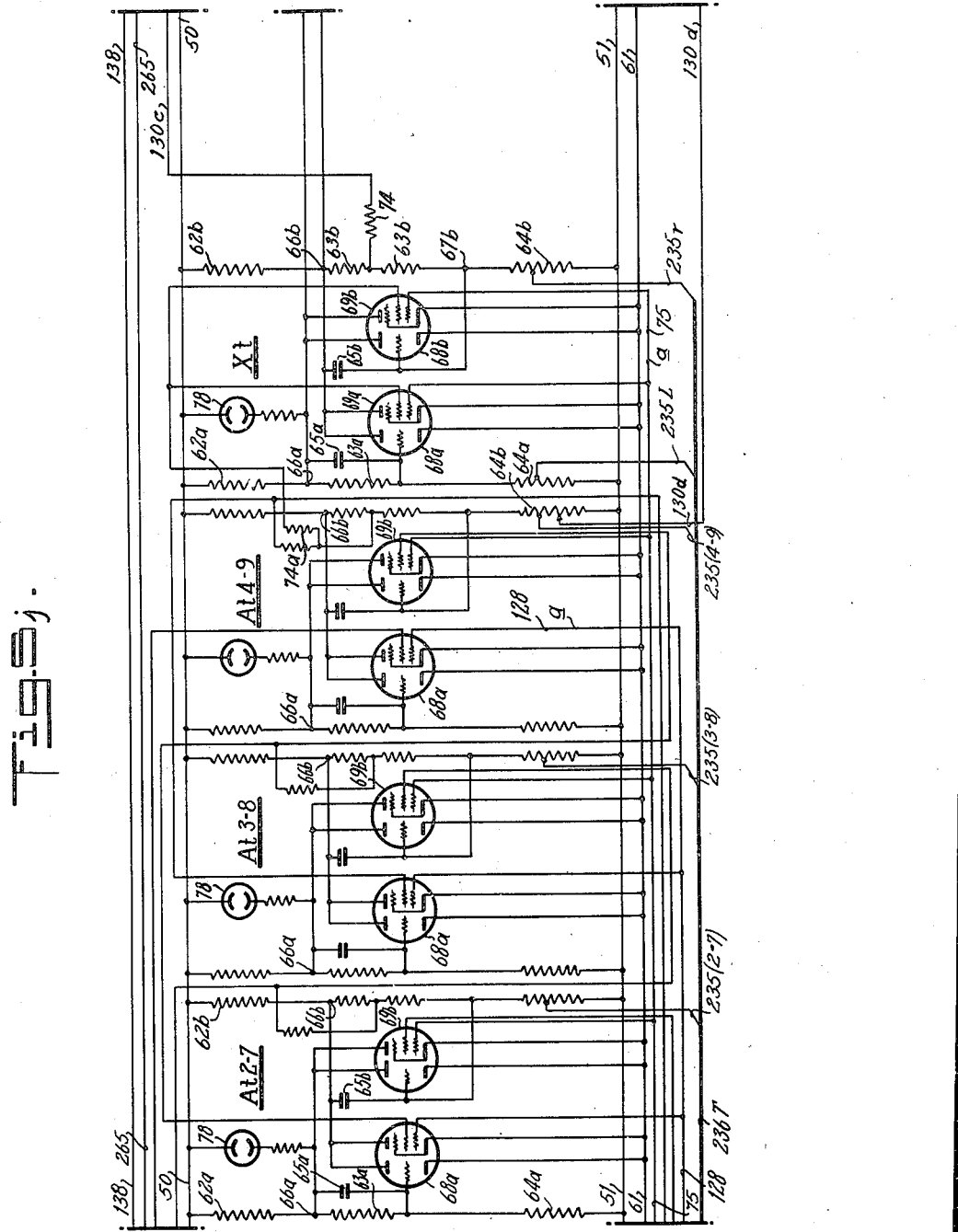

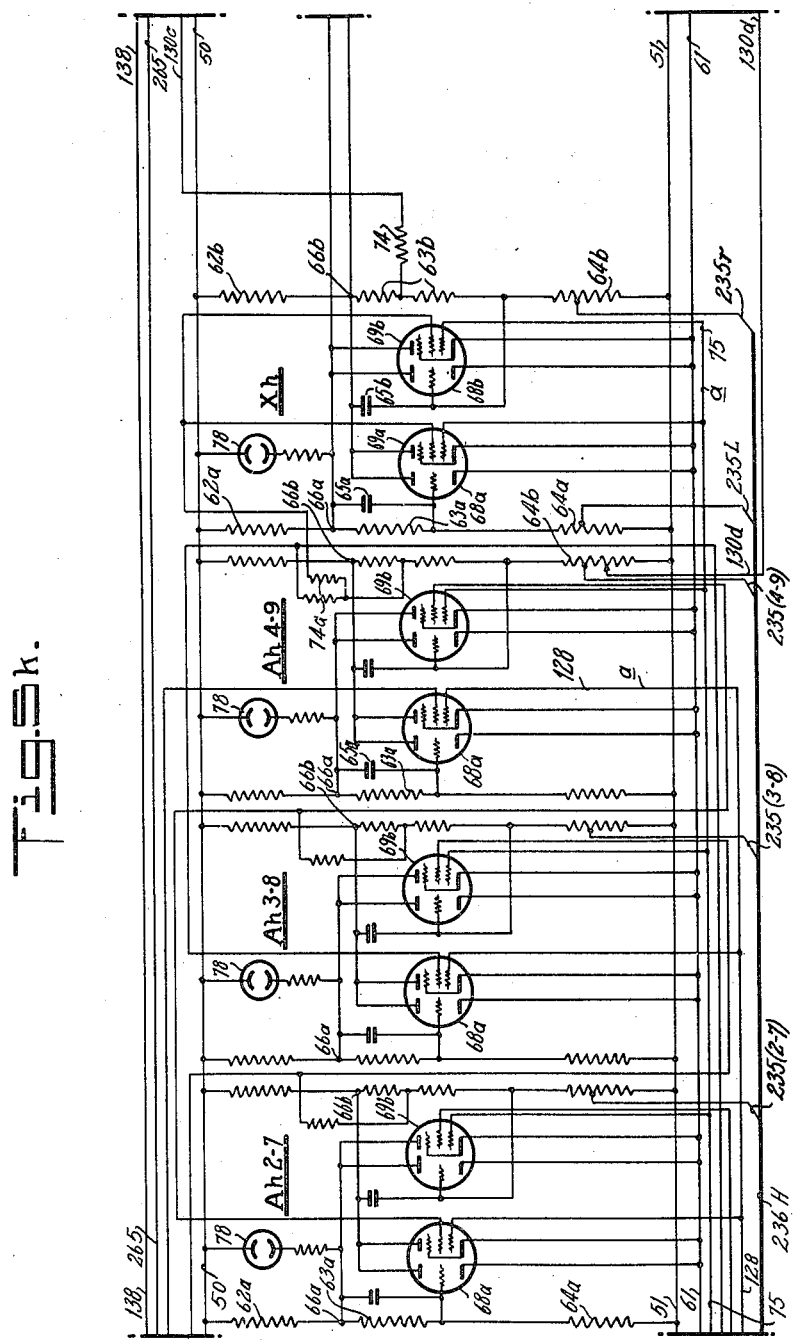

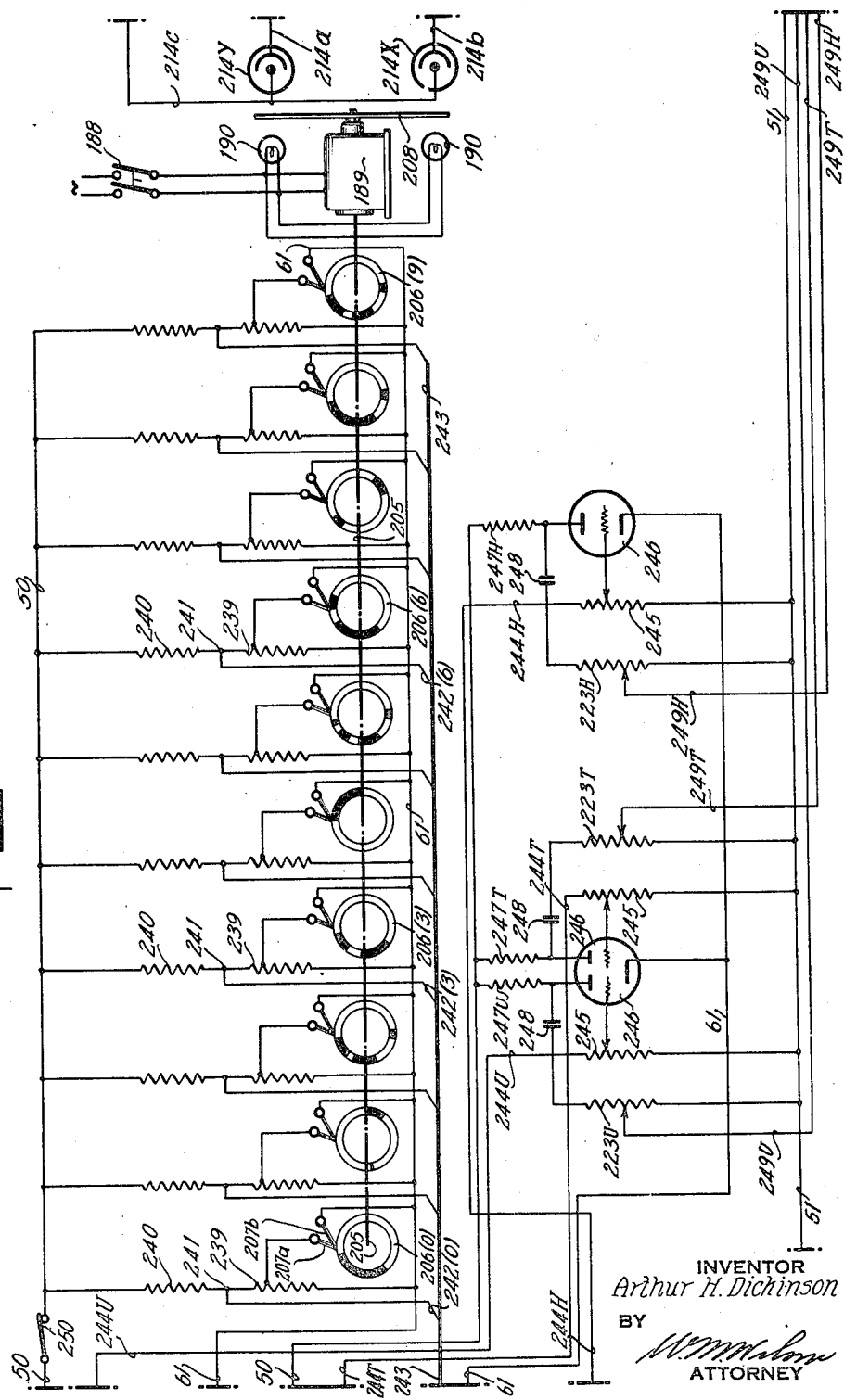

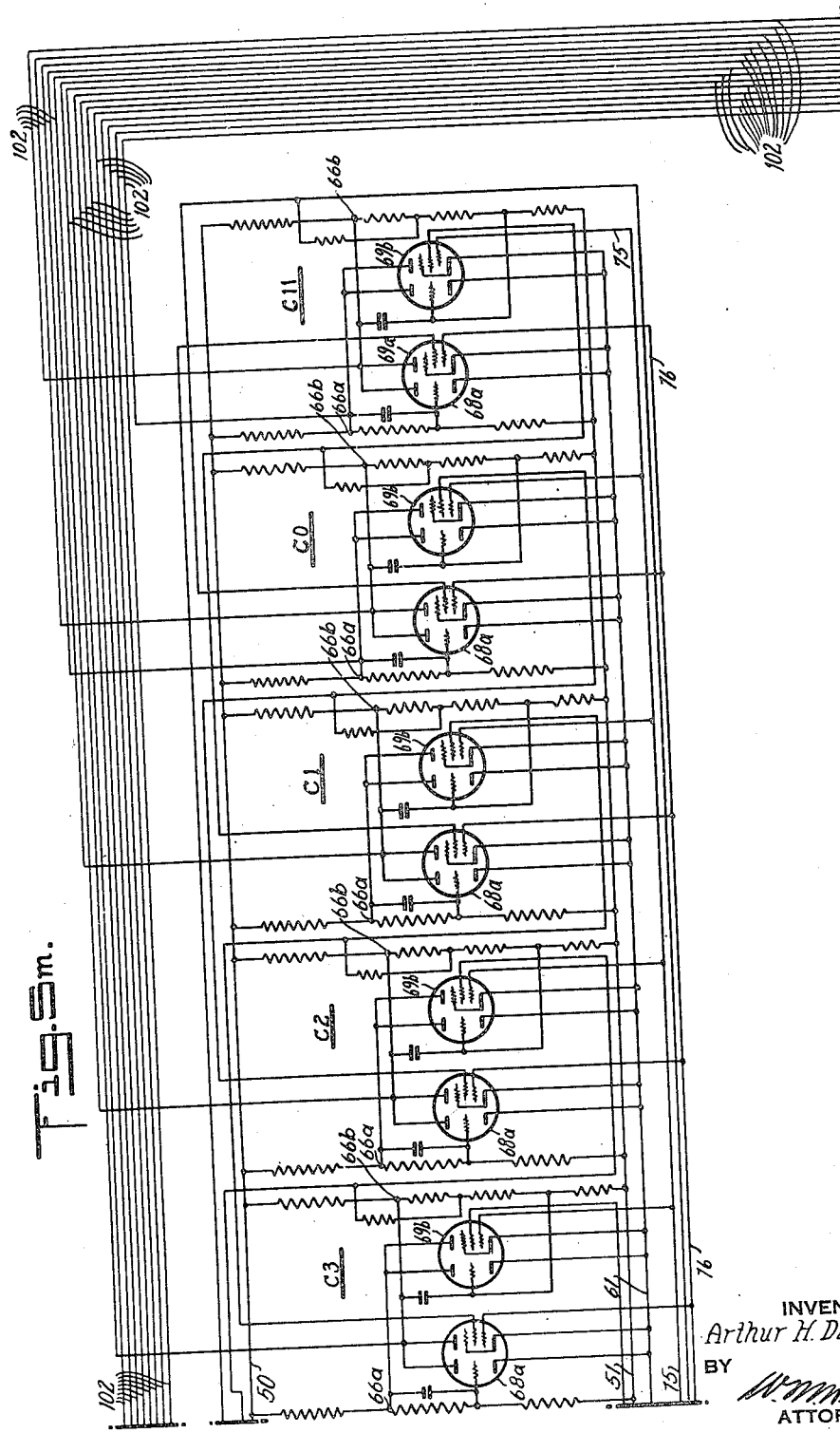

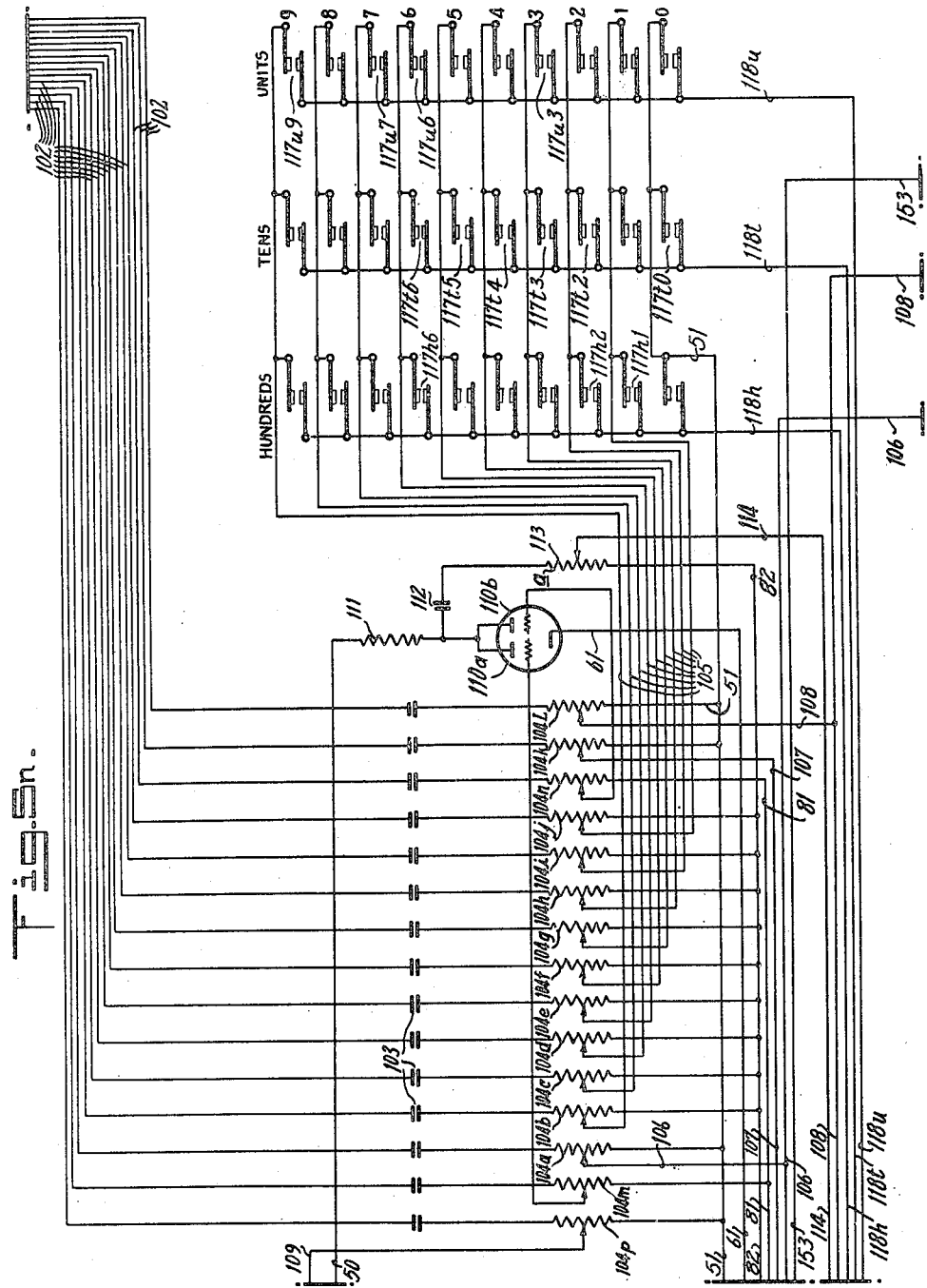

July 2, 1946.  A. H. DICKINSON  2,402,988
ACCOUNTING APPARATUS
Filed May 23, 1941   26 Sheets-Sheet 17

INVENTOR
Arthur H. Dickinson
BY
ATTORNEY

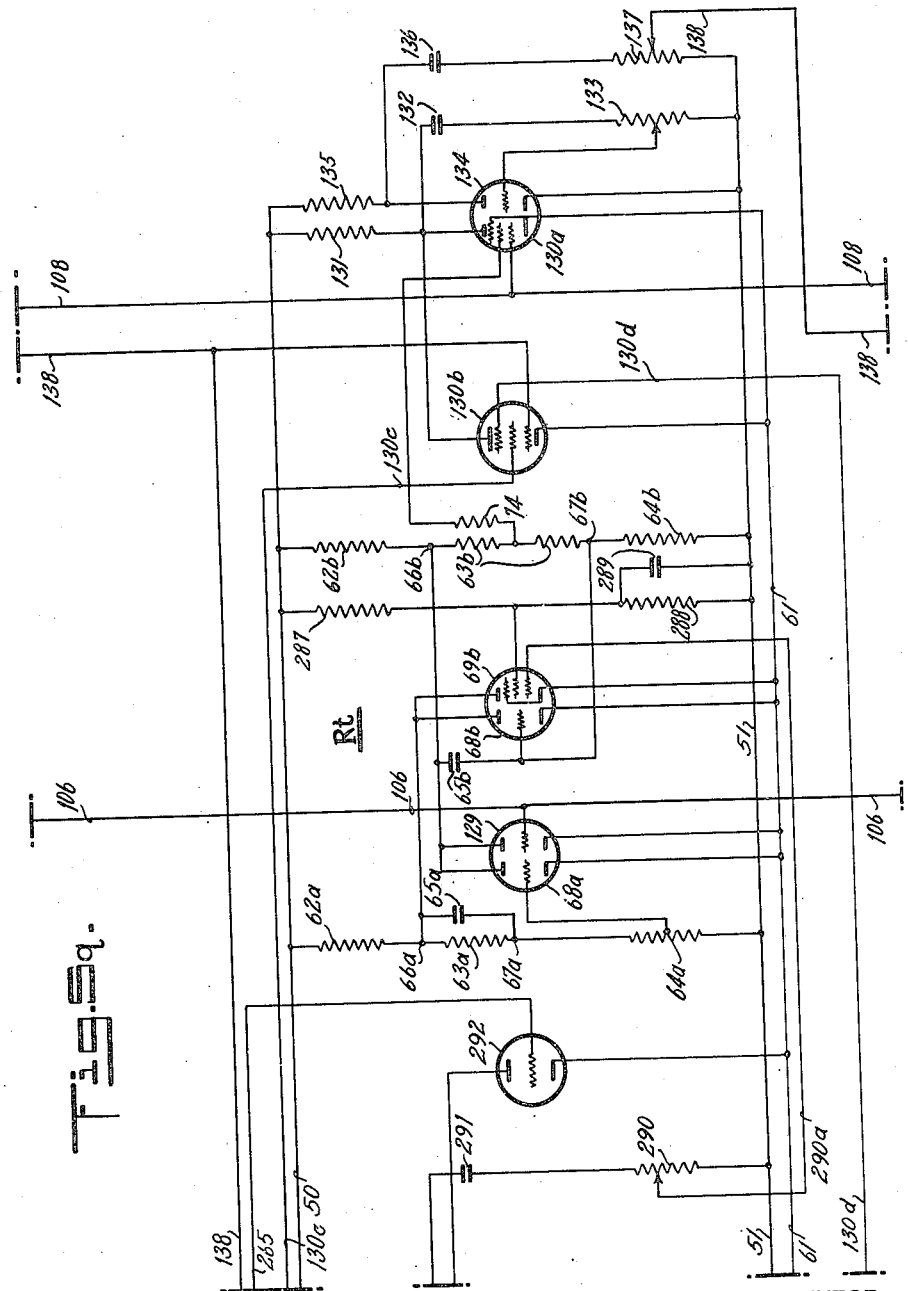

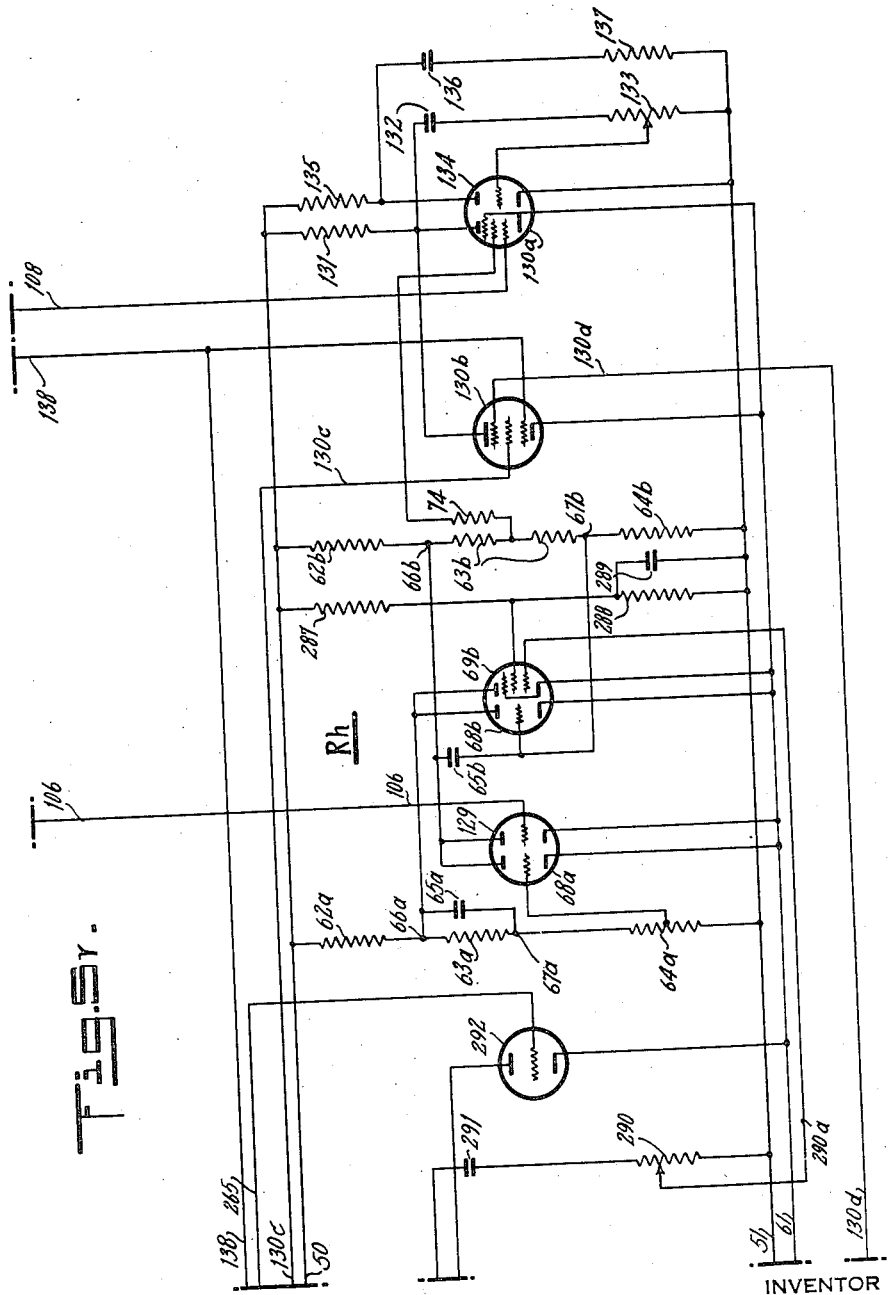

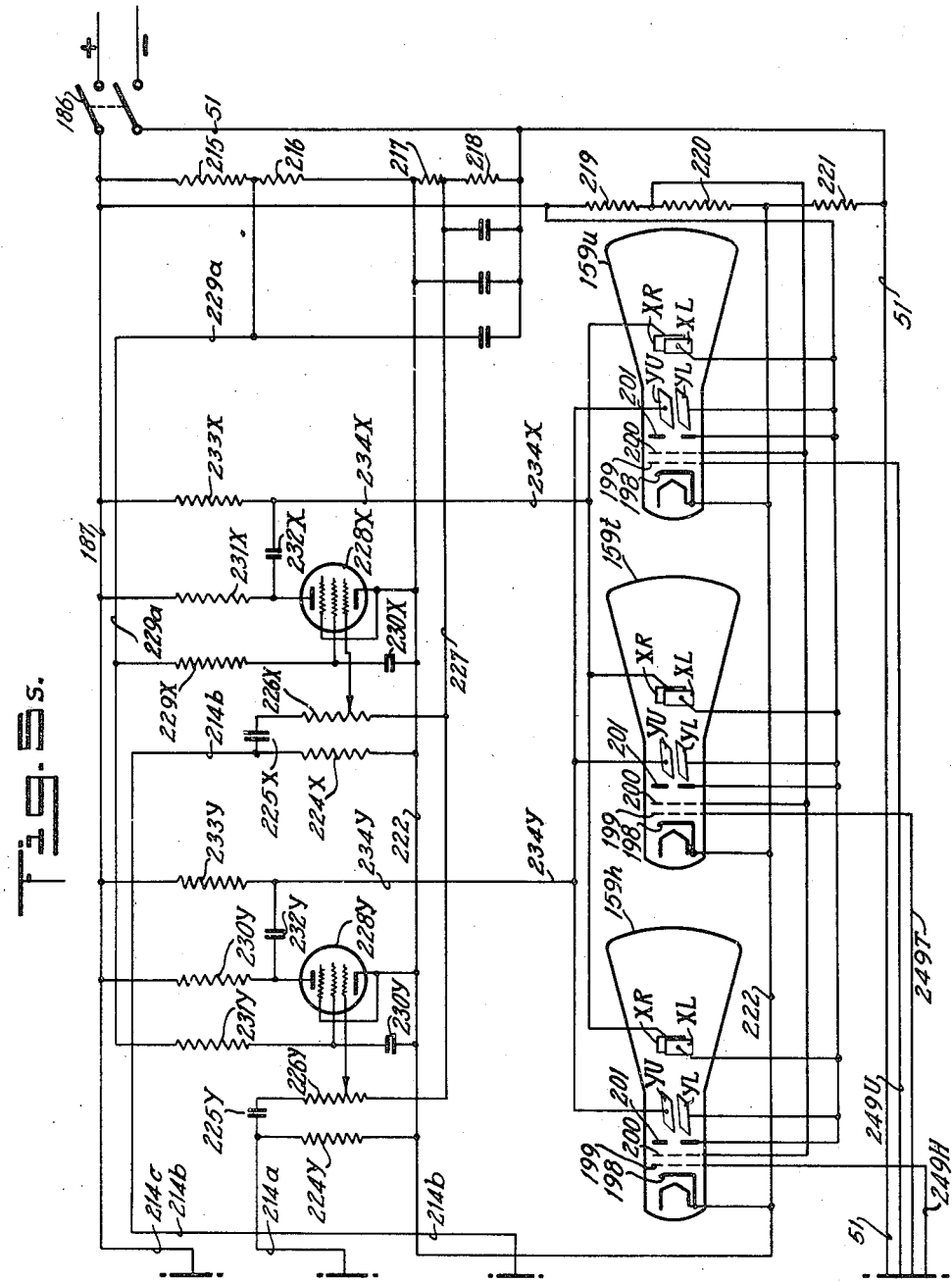

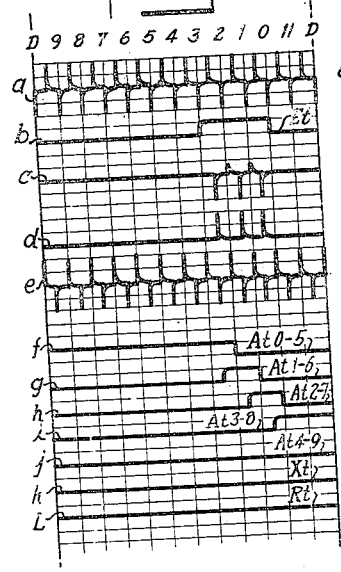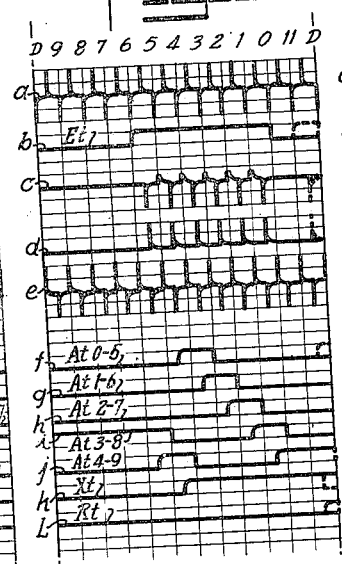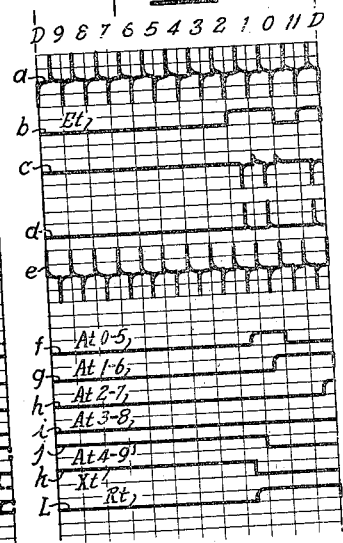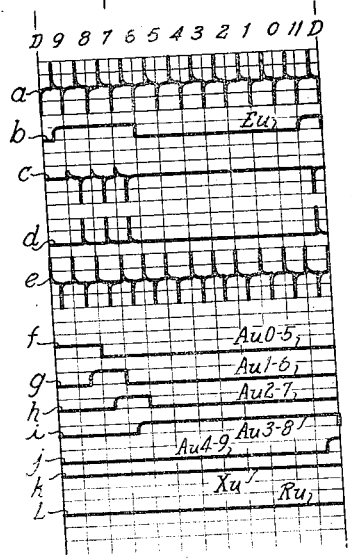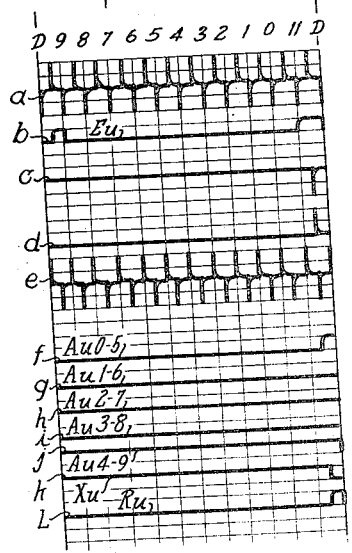

July 2, 1946.  A. H. DICKINSON  2,402,988
ACCOUNTING APPARATUS
Filed May 23, 1941   26 Sheets-Sheet 22
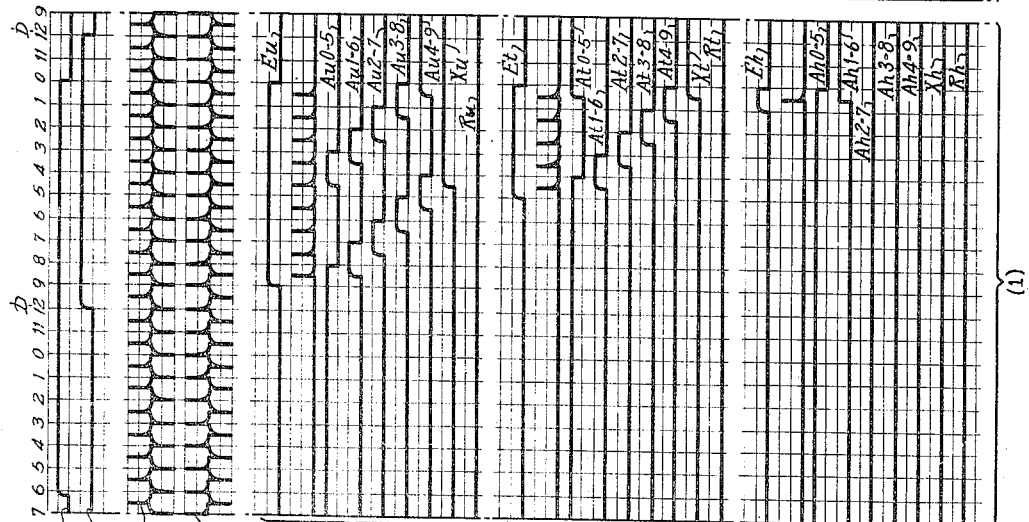
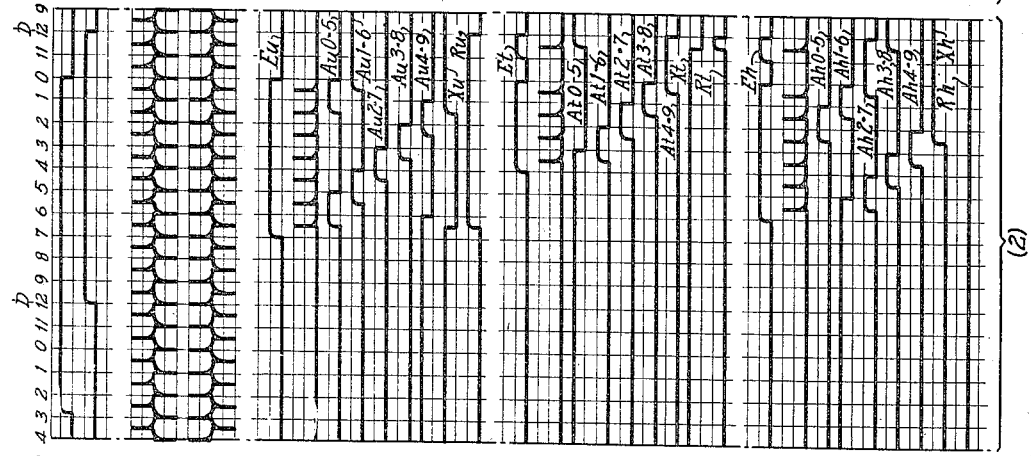
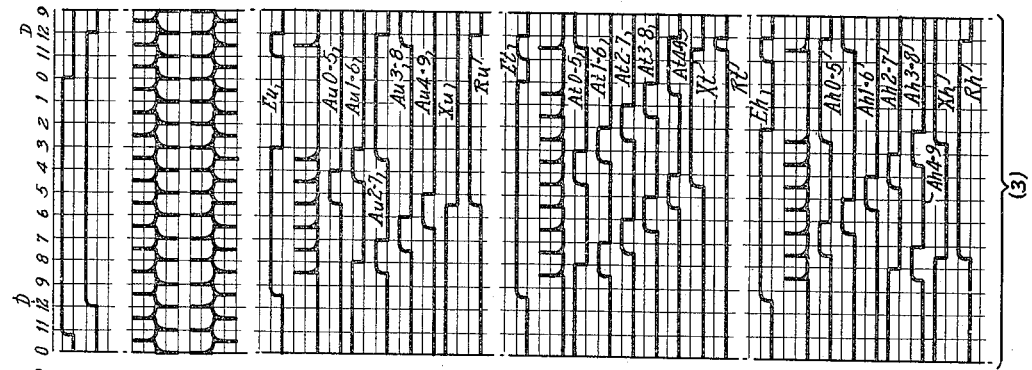
INVENTOR
Arthur H. Dickinson
BY
ATTORNEY INVENTOR
Arthur H. Dickinson
BY
ATTORNEY

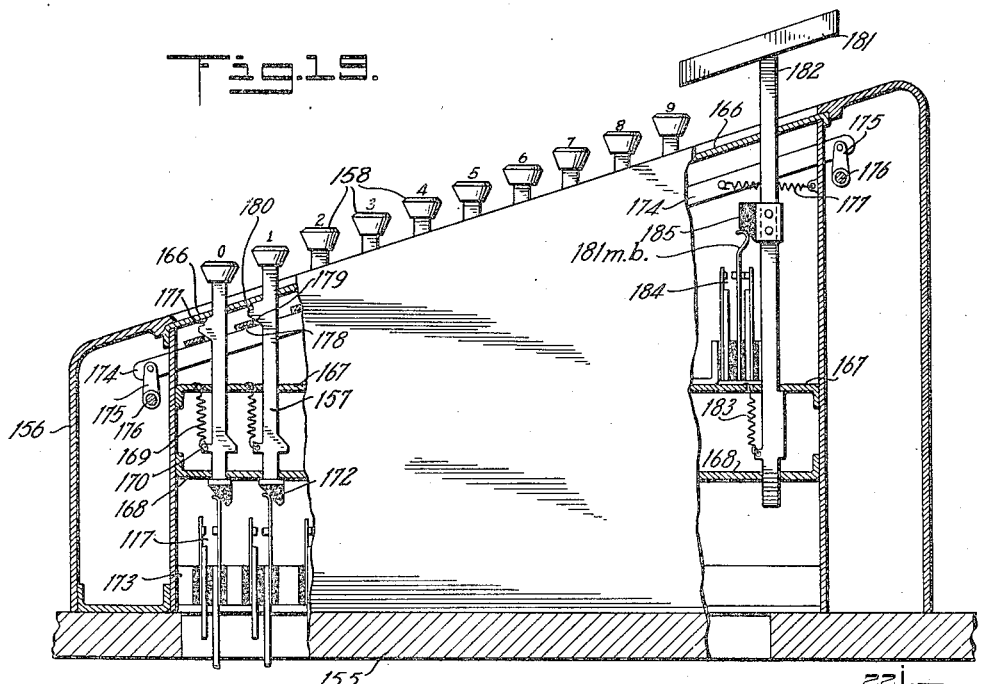
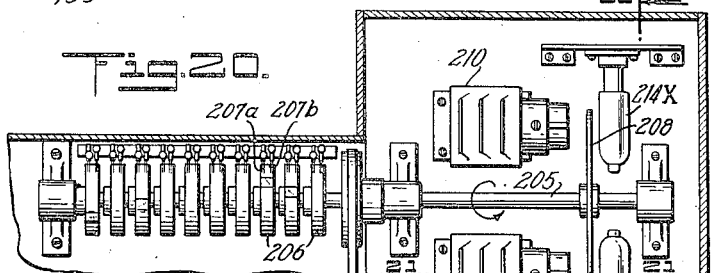
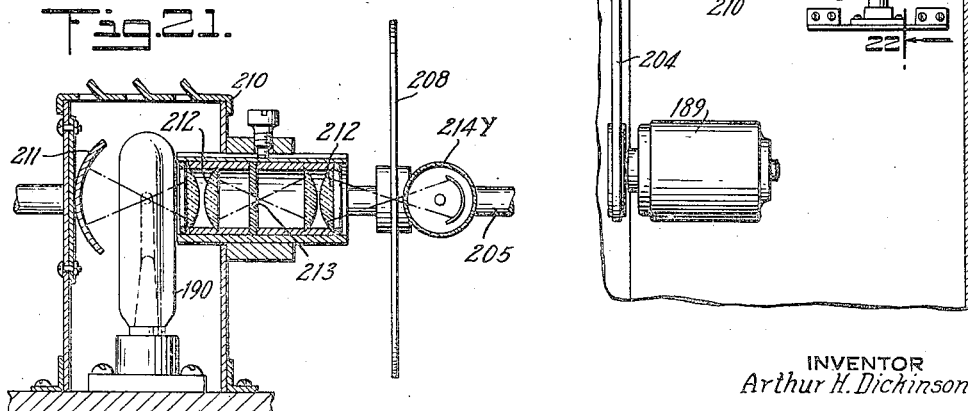

July 2, 1946.          A. H. DICKINSON          2,402,988
                      ACCOUNTING APPARATUS
                    Filed May 23, 1941      26 Sheets-Sheet 25

INVENTOR
Arthur H. Dickinson
BY
ATTORNEY

July 2, 1946. A. H. DICKINSON 2,402,988
ACCOUNTING APPARATUS
Filed May 23, 1941 26 Sheets-Sheet 26
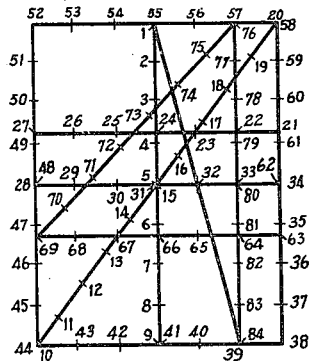
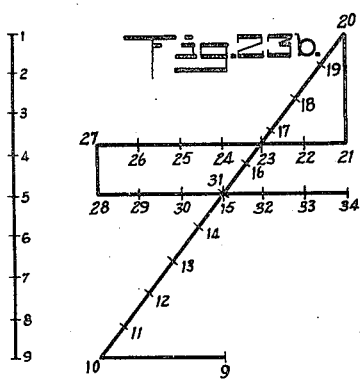
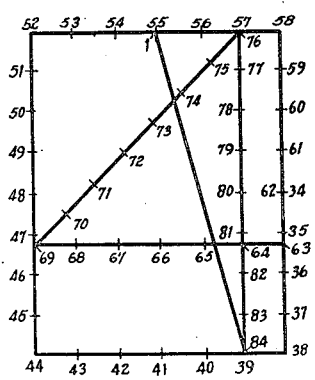
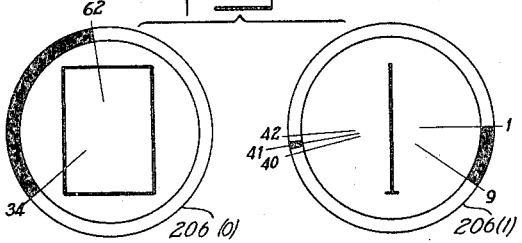
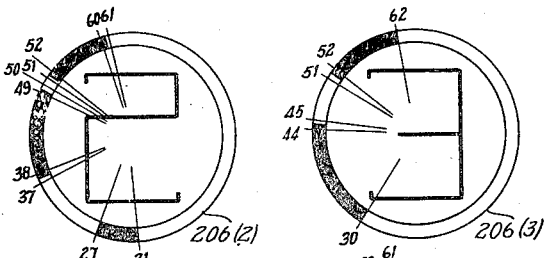
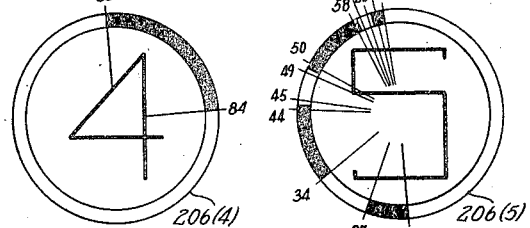
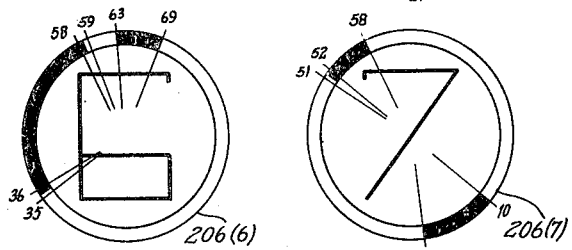
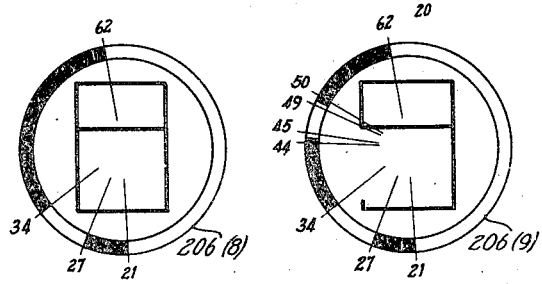
INVENTOR
Arthur H. Dickinson
BY
ATTORNEY Patented July 2, 1946

2,402,988

UNITED STATES PATENT OFFICE 2,402,988

ACCOUNTING APPARATUS

Arthur H. Dickinson, Scarsdale, N. Y., assignor to International Business Machines Corporation, New York, N. Y., a corporation of New York Application May 23, 1941, Serial No. 394,882

32 Claims. (Cl. 235—61)

The present invention relates to electronic accumulators embodying solely electronic controlling and manifesting means and is directed to an electronic accumulator which is an improvement over the electronic accumulator as disclosed in my prior, copending application, Serial No. 314,767, filed January 20, 1940. Attention is also directed to my copending applications on electronic accumulators; namely, Ser. No. 394,881 and Ser. No. 394,883, both filed of even date with the instant application.

According to my invention, a device is provided in which manifestations are separately produced by combining a plurality of electronic manifestation producing means which are combined with either one of two different manifestations of another electronic manifestation producing means, whereby a combinational representation of a digit is produced by a number of elements, less in number, than the digits of a chosen notation.

Another object is to provide a novel method of producing an electronic manifestation indicative of the value of a plurality of cumulatively combined quantities.

A further object is to provide an electronic digit manifesting means which comprises a plurality of discrete electronic means, which, in combination with an additional discrete electronic means, produces a combinational manifestation of digit values and means including entry control means for sequentially operating said plurality of discrete means and for sequentially operating said additional means, at a submultiple of the rate of sequential operation of the individual ones of said plurality of means, to effect a manifestation of any chosen entered digit.

Still another object is to provide a plurality of discrete electronic means, and an additional electronic means, one of said plurality being conditioned at any one time, and said additional means being similarly or oppositely conditioned, to combinationally indicate a chosen digit, and means including entry control means controlling the entry of a digit by operating said plurality of discrete means sequentially during portions of a complete cycle, which portions are representative of any entry, to condition each one of said plurality, in sequence, and to operate said additional means, a number of times, bearing a fixed ratio to the number of complete operations of all of said plurality of means, to thereby produce a combinational representation, which is indicative of the cumulative value of digits entered.

Another object is to provide a series of cyclically sequentially operating electronic elements and an additional electronic element, and means, controlling the sequential operation of each of said plurality, in steps, and of said additional element, in a lesser number of steps, said first steps equalling in number the value of a digit to be entered to thereby produce a combinational manifestation indicative of an entered digit.

A further object is to provide inertialess means for producing a visible positioned manifestation and an additional manifestation, alternately visible and invisible, and means including entry control means for controlling the operation of said inertialess means in proportion to the value of a digit to be entered, to position said visible manifestation in accordance with the value of the digit and to render said additional manifestation, visible or invisible, in accordance with the value of said digit.

Another object is to provide a plurality of electronic manifesting means, cyclically operable, and an additional means, operated once for each full cycle of operation of said plurality and means, including entry control means, for operating said plurality of means, for portions of a cycle, proportional to the value of a digit to be entered.

Still another object is to provide a novel accumulator comprising a plurality of electronic means connected in a closed network, an additional electronic means controlled by one, only, of said plurality, control means for adjusting the electrical condition within said network to any one of an equal plurality of similar electrical conditions, and to adjust the electrical condition of said additional means to the same kind or to a different kind of electrical condition to thereby produce a combinational representation indicative of the cumulative value of digits entered in accordance with a base greater than said first plurality, means, including means producing timed control effects having periods proportional to digits to be entered, and means for selectively applying said control effects to said control means.

A further object is to provide an electronic accumulator, means for additively and subtractively receiving electronic entries of multidenominational quantities, and means responsive to electron flow for electronically manifesting the desired total of said amounts in novel combinational manner.

Still another object is to provide novel electronic carry means.

Another object is to provide a novel accumulator comprising a plurality of discrete electronic elements which may be sequentially operated, an additional element, and means including entry control means for said elements, controlled by a manifestation representative of a digit, for causing sequentially repeated operation of said plurality and timed repeated operation of said additional element, for a period representative of and proportional to said digit.

A further object is to provide in an electronic accumulator, means for, selectively, additively or subtractively entering multidenominational quantities and means comprising a plurality of discrete electronic elements and an additional element, controlled by said selective means for producing a combinational representation, of an entered quantity, comprising one of a plurality of separately differentially positioned manifestations produced by said plurality of elements and a similar or different kind of manifestation produced by said additional element, each combination being representative of an integer of said quantity.

Still another object is to provide a novel electronic accumulator comprising a series of electronic elements, alternately operable to an "on" and to an "off" condition, successive elements conditioning one other element only, for reversal of "on" or "off" condition, and one element conditioning one other of said first elements and an additional element for reversal of "on" or "off" condition, and means stepping along the "on" position of said first elements in proportion to the value of digits entered and operating said additional element in lesser proportion.

Still another object is to provide a novel electronic accumulator comprising a plurality of electronic elements connected in closed cascade, an additional element, means for stepping an electronic condition from one element to the next cascade element sequentially and then back to the first, repeatedly, and in proportion to the value of digits to be entered, and operating said additional element once for each of said repetitions, and electronic means automatically indicating the number of a chosen plurality of operations of said additional element.

Another object is to provide a novel electronic accumulator comprising electronic manifesting means, means controlling the application of a number of pulses to said manifesting means in proportion to the value of a digit to be entered, said manifesting means assuming a definite electrical condition, indicative of the number of said pulses applied thereto, up to a chosen number, and electronic means indicating the number of times said chosen number of pulses has been applied.

Still another object is to provide a novel manner of producing reset.

A further object is to provide novel means for producing a carry upon a carry.

Another object is to provide, in combination, means for electronically producing in visible outline, a composite tracing comprising each outline of a plurality of different digits including all of a chosen notation, means for limiting said tracing to one, only, of said outlines, and electronic digit manifesting means producing combinational electronic manifestations in a novel manner, representative, respectively, of each of the digits of said notation, any chosen one combinational manifestation controlling said limiting means to produce a corresponding visible digit outline.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a basic wiring diagram of a novel trigger circuit employed in the invention.

Fig. 2 is a wiring diagram of a modification of the trigger circuit of Fig. 1.

Fig. 3 is a basic wiring diagram of the electronic commutator employed in the invention.

Fig. 4 parts $a$ and $b$ are diagrammatic illustrations on an enlarged scale of pulses employed for controlling elements of the electronic commutator shown in Fig. 3 and Fig. 4 parts $c$, $d$, and $e$ are diagrammatic illustrations on an enlarged scale of voltage conditions resulting from the operation of the elements comprising said commutator.

Fig. 5 is a diagrammatic illustration of the grouping and arrangement of the figures which assembled together constitute a complete wiring diagram of the invention.

Figs. 5$a$ to 5$n$, inclusive, and 5$p$ to 5$s$, inclusive, grouped together and arranged as shown in Fig. 5 comprise the complete wiring diagram of the invention.

Fig. 6 parts $a$ and $b$ are diagrammatic illustrations of wave forms produced in the output of an oscillator utilized in the invention, and parts $c$ and $d$ illustrate such wave forms, respectively, after conversion to peaked pulses.

Fig. 7 comprises diagrammatic illustrations of wave forms illustrating voltage conditions resulting from the operation of elements comprising an electronic commutator which is employed for producing control and digit representing pulses.

Fig. 8 parts $a$ to $n$ and $p$ are diagrammatic illustrations of pulses produced after conversion of the wave forms shown in corresponding lines of Fig. 7 and Fig. 8 part $q$ is a diagrammatic illustration of pulses similarly produced.

Figure 9I:
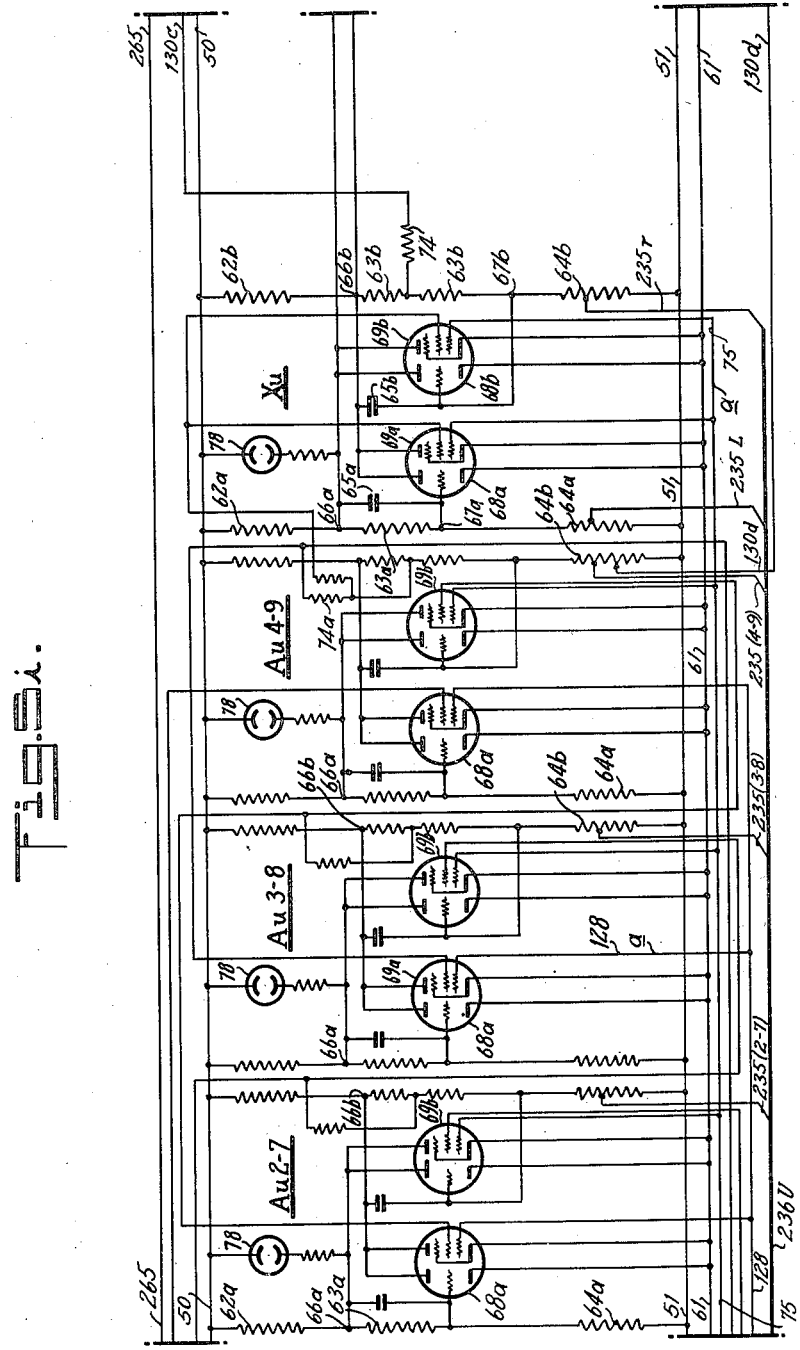
Figure 9P:
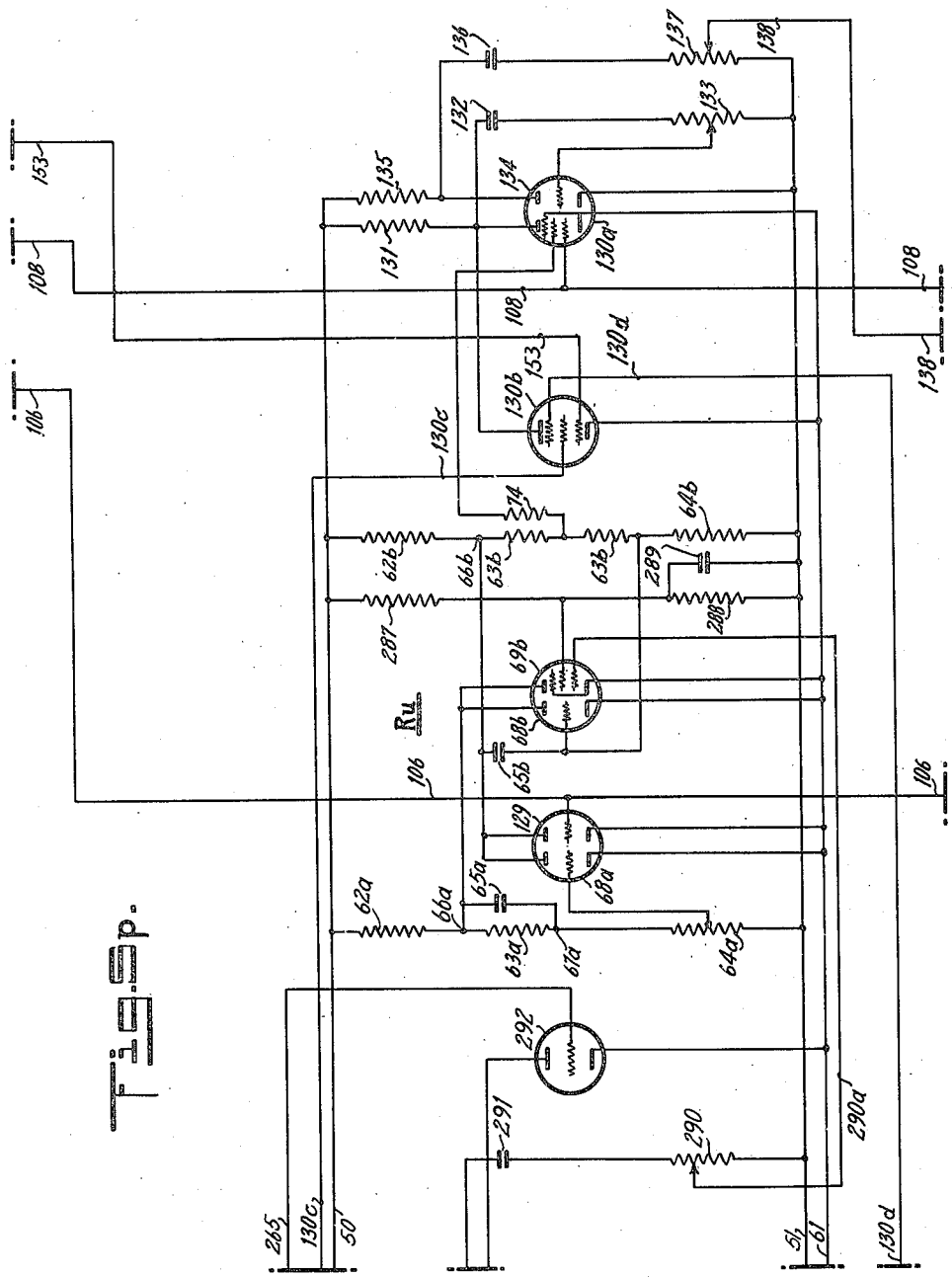

Fig. 9 parts $a$ to $e$ are electrical timing diagrams illustrating phenomena occurring during an additive entry into one order of the accumulator, and Fig. 9 parts $f$ to L, are electrical timing diagrams illustrating voltage conditions produced upon the sequential operation of digit manifesting elements when such an additive entry is made.

Fig. 10 is a timing chart similar to Fig. 9 but relating to another additive entry into the same order of the accumulator.

Fig. 11 is a timing chart similar to Fig. 9 but relating to a third additive entry into the same order of the accumulator.

Fig. 12 is a timing chart similar to Fig. 9 but relating to a subtractive entry into one order of the accumulator.

Fig. 13 is similar to Fig. 12 but relates to a second subtractive entry into the accumulator.

Fig. 14 shows electrical timing diagrams of phenomena occurring in a single entry circuit of a key-controlled embodiment of the invention.

Fig. 15 shows electrical timing diagrams of pulses employed for controlling the sequential operation of elements of the electronic accumulator.

Figs. 16$a$, 16$b$, and 16$c$ are electrical timing diagrams illustrating voltage conditions produced upon the sequential operation of the digit manifesting elements comprising, respectively the units, tens and hundreds orders of the accumulator, when three multidenominational entries are made.

Figure 17:
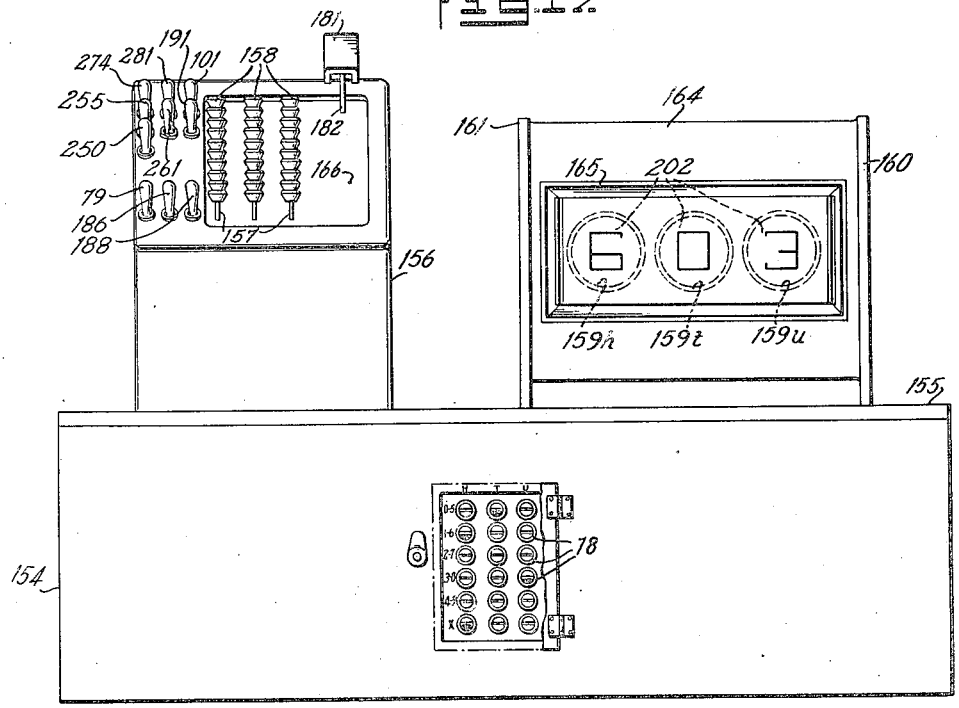

Fig. 17 is a front elevation illustrating the construction of a complete key-controlled device including indicating cathode ray oscilloscopes.

Figure 18:
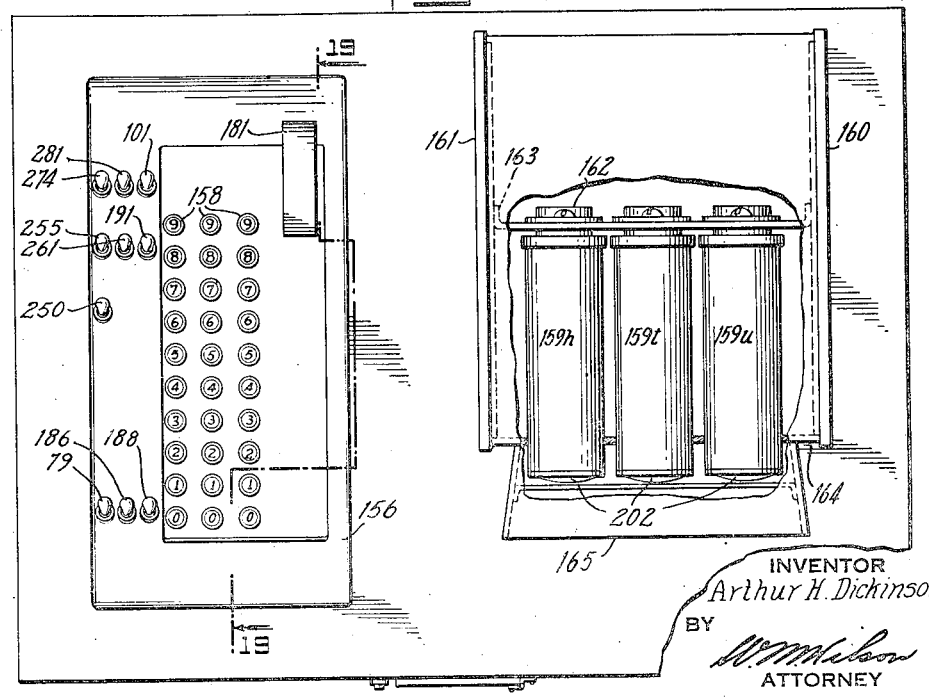

Fig. 18 is a plan view, with parts cut away, of the device of Fig. 17.

Fig. 19 is a view on an enlarged scale of a section taken on line 19—19 of Fig. 18.

Fig. 20 is an inside partial plan view of the control portion of the indicating cathode ray oscilloscope unit.

Fig. 21 is a detail sectional view taken on line 21—21 of Fig. 20.

Figure 22:
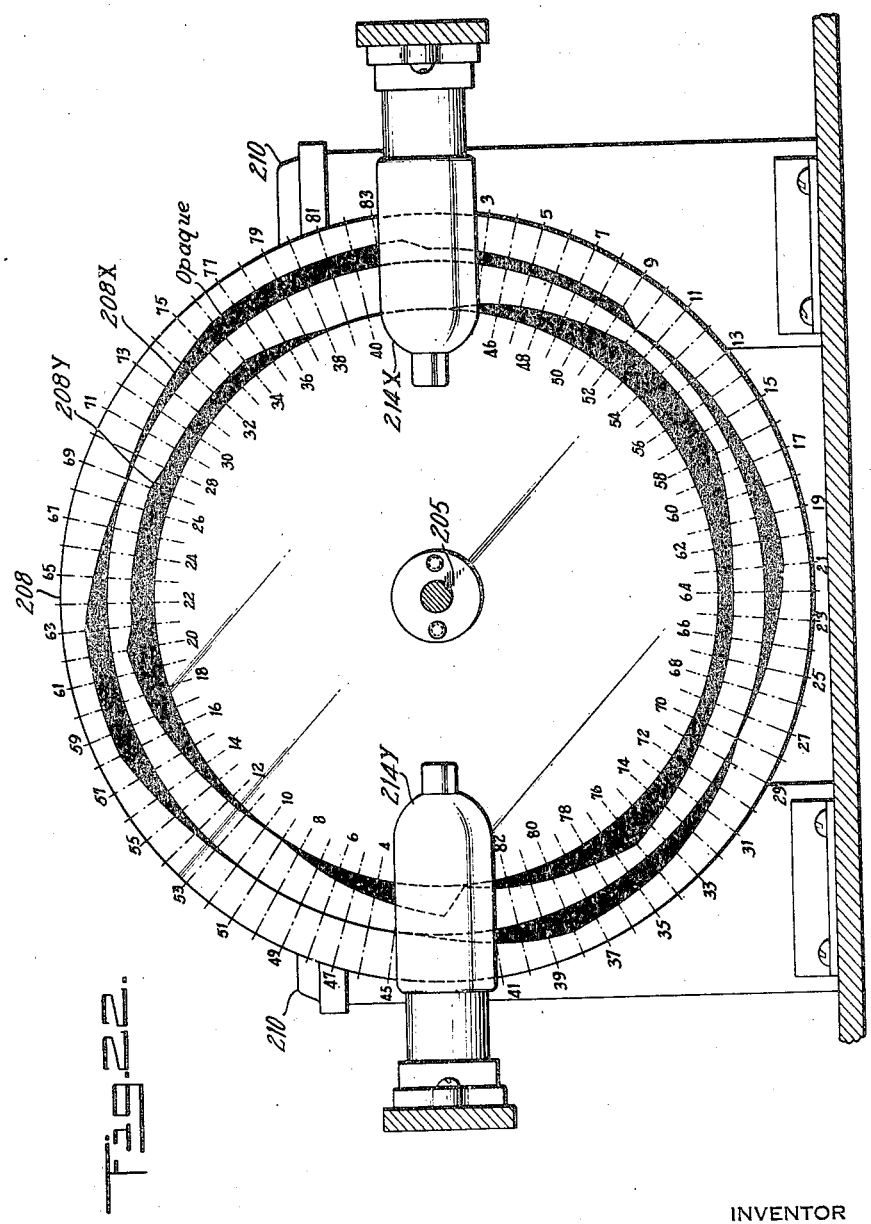

Fig. 22 is a sectional view taken on line 22—22 of Fig. 20.

Fig. 23 is a view of the complete composite character formed by the operation of the pattern component emitter.

Figs. 23a, 23b and 23c are views illustrating portions of the composite character formed by the operation of the pattern emitter.

Fig. 24 is a diagrammatic illustration of ten different selectors employed in the control portion of the indicating cathode ray oscilloscope unit, each selector being inscribed with the particular character which it selects from the composite character.

For purposes of simplicity the electronic accumulator or totalizer is shown as embodied in a key-operated machine. It is to be specifically understood, however, that this accumulator may also be embodied in record controlled tabulating machines, generally of the Hollerith type.

The construction and operation of various basic circuits will first be described, followed by an explanation of how these circuits are employed for producing pulses, for controlling entries, for entering and manifesting digits, for determining and effecting carries and for other purposes. Examples will be given both of entries which are to be added and entries to be subtracted. A key-operated embodiment will then be described in detail with examples of algebraic adding of multidenominational amounts in connection with an accumulator comprising a plurality orders. This will be followed by an explanation of the manner in which the accumulator controls a cathode ray tube indicator so that digits are visibly indicated in true numeral configuration. Finally the methods for resetting and conditioning will be described.

1. General

Before proceeding to a detailed description of the novel accumulator, a more general description will be set forth.

Various controlling impulses are employed in this accumulator for producing entry, carry and other operations. The means for producing these electrical impulses may comprise an electronic commutator. This is composed of discrete elements which include electronic tubes, the number of elements equalling the number of cycle points or index point positions in a single machine cycle. Each element may have either an "on" or an "off" status, and at any one index point position, one only, of the total number of elements is in an "on" status. The status of the elements is controlled by pulse producing means. Such control consists of a step-by-step operation of the elements whereby there is a sequential "on" and "off" conditioning of each element. The operation of the electronic commutator is continuous, once it is conditioned and placed in operation.

The electronic commutator is conditioned prior to operation of the accumulator by manipulating switches that control electronic circuits producing conditioning pulses. Such pulses are effective to place any of the circuit elements, other than a chosen one, in an "off" status and to place this chosen element in an "on" status. In the operation of the commutator, each of the elements may be turned on, under control of an element which immediately precedes it, and is itself "on," and also each of the elements may be turned off, under control of an element which immediately follows it, and is itself "on." It will therefore be understood that elements of the commutator device are sequentially turned on and off, each element being so operated, once each machine cycle. Such action of the commutator elements provides a pulse at each of the index point positions of the cycle and the resulting plurality of pulses may be employed for entry control, carry control, and other control purposes.

Each order of the accumulator includes, in addition to entry control and carry control means, a number of electronic tubes and related circuits comprising electronic digit manifesting means. The latter comprise discrete digit manifesting elements which include electronic tubes, the number of elements being less than ten, for use with tens notation. Each digit element may have either an "on" status or an "off" status, that one only which is "on," in combination with the "on" and "off" status of an extra element, being indicative of the digit in the order. The status of the digit elements and the extra one is controlled by entry means, which produce differentially timed impulses, each indicative of a desired entry, and entry control means controlled by these impulses. Such digit element control consists of a step-by-step operation of the elements whereby, commencing with the one succeeding the one only which is "on," there is a sequential "on" and "off" conditioning of all elements except the extra element. The extra element is turned on and off successively whenever the sequential operation of the digit elements commences to repeat. The last digit element to remain "on," in combination with the "on" or "off" status of the extra element, corresponds in its numerical designation, to the value of the digit entered or to the sum or difference of the digit originally standing in the order and the entry. More specifically, each of the digit representing elements is turned on under control of the element, representative of the digit which immediately precedes it, and is itself "on," and further each of the digit elements is turned off under control of an element, which represents the digit which immediately follows it, and is itself "on." The extra element is turned on and off successively whenever a given digit element is turned on. It is seen that the number of different elements which are turned on and off during an entry is equal to the true value of an entered digit, if adding, and is equal to the complemental value of the entered digit, if subtracting. The shift of the extra element from an "on" to "off" status, or vice versa, is dependent upon whether or not the sequential operation of the digit elements commences to repeat during entry operations.

When carry is effected in any order of the accumulator, a sequential operation occurs, and the digit element, representative of the digit immediately succeeding that digit, represented by the element which is "on," is switched on and the one previously "on," is switched off. The above-mentioned extra element may be turned on or off during entry of a carry increment. Carry operations are determined and effected by electronic means, such as tubes and associated circuits. The digit standing in each order of the accumulator may be visibly manifested either by glow discharge or other luminous means or by a cathode ray tube indicator, such as is disclosed in applicant's copending application Serial No. 313,061, filed January 9, 1940.

After the entry of a series of amounts is completed and the total is determined by observation of either the glow tubes or the cathode ray tube indicator, the accumulator is zeroized by manipulating reset switches controlling electronic circuits which produce resetting pulses. Such pulses are effective to place any of the digit elements, other than the 0 ones, in an "off" status and to place the 0 elements, in an "on" status.

As set forth above, the principles underlying various basic circuits will be first explained. The wiring diagrams of these circuits are shown in Figs. 1, 2 and 3. After pointing out the fundamentals of their operation, the use of such circuits, in various parts of an electronic accumulator will then be described in detail.

2. *Trigger circuit*

A basic circuit, which is employed in this invention comprises vacuum tubes, illustrated in Fig. 1 as a plurality of tubes in one envelope, these tubes being associated with resistances and condensers as shown. Two of the vacuum tubes are so interconnected in a circuit and operate in such a manner that the circuit assumes two conditions of stability. When one of the tubes is conducting, a large amount of current flows through it and the other tube is at shut-off. In other words, in one condition of stability, one of the tubes has a relatively low impedance and the other has a relatively high impedance. In the other condition of stability, the respective conditions of the two tubes is reversed. Controlling impulses are applied to other vacuum tubes of the circuit to cause the shift from one condition of stability to the other. Every other impulse brings the circuit to the original condition of stability. Such an arrangement of vacuum tubes and associated circuits is herein termed a trigger circuit, and voltage variations and conditions therein, which are determined by the conditions of stability, may be employed for various controlling purposes.

Referring to Fig. 1, voltage of the polarity indicated is supplied to lines 50 and 51 and to a voltage divider consisting of resistances 56 and 57. Voltage is also supplied by means of the divider to line 61, its potential being positive with respect to line 51.

The trigger circuit comprises two impedance networks. One network includes resistances 62a, 63a and 64a, resistance 63a being shunted by coupling condenser 65a. Vacuum tubes 68b and 69b are connected in parallel between point 66a, located between resistances 62a and 63a, and line 61. The second impedance network consists of resistances 62b, 63b, and 64b, resistance 63b being shunted by coupling condenser 65b. The vacuum tubes 68a and 69a are connected in parallel between point 66b, located between resistances 62b and 63b, and line 61. Resistances 62a and 62b are equal in value as are resistances 63a and 63b, and resistances 64a and 64b. The capacities of condensers 65a and 65b are also equal. In actual practice an efficient combination was found when the values of resistances 62a and 64a were each approximately one-third the value of resistance 63a. A suitable value for the capacity of the condenser 65a is of the order of a few hundred micromicrofarads.

Assuming that the grid of tube 68a is substantially at the same potential as line 61, its grid bias will be substantially zero. With resistance 62b properly chosen, tube 68a has an impedance relatively low as compared to that of 62b and its anode and point 66b to which the anode is connected will have a voltage which is not much greater than that of line 61, with large current flow through 68a. With resistances 63b and 64b properly chosen, the potential drop across 63b is great enough to maintain point 67b and hence the grid of tube 68b, negative with respect to line 61. With tube 68b negatively biased, it has an impedance greater than that of resistance 62a. Hence the anode of tube 68b and point 66a, to which the anode is connected, are at a high enough potential so that the voltage drop across resistance 63a will not force the potential of point 67a below that of line 61. The foregoing describes one condition of stability in which tube 68a has a large current flow therethrough and tube 68b is at shut-off, hence with no current flow therethrough and point 66a is at a higher potential, with respect to lines 61 and 51, than is point 66b. The manner of switching the trigger circuit to the other condition of stability is as follows:

Pentodes 69a and 69b may be employed for shifting the trigger circuit from one condition of stability to the reverse one. The screen grid (hereinafter designated as a screen) of tube 69a is connected to a point on a voltage divider consisting of resistors 70a and 71a. The potential of this point being positive, with respect to line 61, the screen voltage of tube 69a is positive with respect to its cathode. The screen of tube 69b is connected to a point on a voltage divider consisting of resistors 70b and 71b. The voltage of this point is likewise positive with respect to line 61, so that the screen potential of tube 69b is positive with respect to its cathode. The control grid (hereinafter designated as the grid) of pentode 69a is connected to the control grid of 69b and both are connected to a resistance 72, to which positive pulses are applied, in a manner described later. In the absence of any pulse on resistor 72, the negative grid bias of tubes 69a and 69b is the potential difference between lines 61 and 51 and is sufficiently great to maintain tubes 69a and 69b at shut-off.

When a positive pulse is applied to resistance 72, there is a simultaneous negative bias reduction of the grids of both tubes 69a and 69b, but since the anode of tube 69a is directly connected to that of tube 68a and since the plate voltage of tube 68a and point 66b is very low, this particular bias reduction is ineffective to increase current flow through tube 69a and thus has no effect on the trigger circuit. The anode of tube 69b, however, is directly connected to that of tube 68b and to point 66a, and since the potential of this point, with respect to line 61, is relatively high, the simultaneous bias reduction of tube 69b causes a current flow as follows: From line 50, resistor 62a, tube 69b, line 61, resistance 57 to line 51, thus causing point 66a to suddenly drop in potential, producing a negative pulse. This pulse is fed through condenser 65a to the grid of tube 68a, effecting a sudden increase in the negative grid bias thereof, and reducing current flow through tube 68a and resistance 62b. Point 66b, accordingly, rises in potential, with respect to line 61, to produce a positive pulse which is fed through condenser 65b to the grid of tube 68b, changing its grid bias to substantially zero. Since, as just described, the potential of point 66b has now risen and that of point 66a has now dropped, tubes 68a and 68b assume a condition of stability which is the reverse of that originally described, namely, tube 68a is now shut-off while tube 68b passes a large amount of current. The new status of the trigger circuit is maintained until another pulse is applied to resistance 72. When this occurs, the resulting negative grid bias reduction of pentode 69b is ineffective, while that of tube 69a is effective to increase current flow therethrough, and the trigger circuit is returned to the condition of stability originally described.

It may be noted that to best achieve the operations as described above, the pulses applied to the grids of pentodes 69a and 69b should be of steep wave form. Preferably the RC product of the value of resistance 72 and the value of the capacity of any associated condenser should not exceed one-fifth the RC product of resistance 63a and condenser 65a. It should also be noted, that negative pulses, applied to the grids of tubes 69a and 69b, are ineffective, to cause the shifting action explained above.

In the foregoing description, it is assumed that switches 73a and 73b are in open position, as shown. The closure of switch 73a, shunts out a portion of resistance 71a, thus reducing the screen potential of tube 69a to substantially that of line 61. Assuming that the condition of stability is such that point 66b is at a high potential, such screen potential reduction prevents any negative grid bias reduction of tube 69a from being effective in bringing about increased current flow therethrough. Therefore, until switch 73a is opened, successive applications of pulses to resistance 72 are ineffective to change the status of the trigger circuit from a condition in which points 66b and 66a are at high and low potentials, respectively.

Similarly, the closure of switch 73b shunts out a portion of resistance 71b, thus reducing the screen potential of tube 69b to substantially that of line 61. Such screen voltage reduction, when point 66a is at high potential, prevents any negative grid bias reduction of tube 69b from being effective in bringing about increased current flow therethrough. Therefore, under these conditions until switch 73b is opened, successive applications of positive pulses to resistance 72 are ineffective to change the status of the trigger circuit from a condition in which points 66a and 66b are at high and low potentials, respectively. Switches 73a and 73b, therefore, comprise parts of selection means whereby selectivity in operation is obtained.

The condition of the trigger circuit may be determined by observation of a glow discharge (neon) tube 78, which is connected, in series with a current limiting resistor, between line 50 and point 66a. When point 66a is at a high potential with respect to line 61, the difference in voltage between it and line 50 is insufficient to ignite discharge tube 78. When point 66a, however, is at a low potential (point 66b at high potential), the difference in voltage is great enough to cause neon tube 78 to fire.

The foregoing has described a trigger circuit in which vacuum tubes and electrical elements are so interconnected and operated as to produce alternate conditions of stability. The triggering pulses are derived from a common source and are applied simultaneously to two points of the circuit. Pulses, simultaneously applied, are effective, alternately only, in each of the two branches of the circuit and cause it to shift back and forth from one condition of stability to another. The manner in which the screens of pentodes are employed to permit triggering impulses to be selectively effective for controlling sequential operations was also described.

That portion of the circuit of Fig. 1 within the broken line enclosure finds extensive use in various portions of the complete circuit of the electronic accumulator. For purposes of simplicity, this enclosed portion will be hereinafter termed an element and it will also be understood that when points 66b and 66a are at high and low potentials, respectively, with respect to lines 61 and 51, the element is in an "on" status and that when the potentials of points 66b and 66a are low and high, respectively, with respect to lines 61 and 51, the element is in an "off" status. The voltages which exist at points of the triggering circuit such as 66b and 66a, and which vary in accordance with the conditions of stability, are employed for many control purposes, as subsequently explained.

The circuit of Fig. 2 also relates to a triggering circuit, which is substantially similar to that just described in connection with Fig. 1. Portions of this circuit, which correspond in character and function to elements of the circuit of Fig. 1, are given the same reference characters. With regard to the arrangement of Fig. 2, it also may have two conditions of stability, but in lieu of deriving pulses from a common source and applying it to two circuit points to shift the condition of stability, two sources of pulses, such as resistances 72a and 72b are employed. It is assumed that such pulses do not, occur simultaneously. The grid of tube 69a is connected to resistance 72a and whenever a positive pulse occurring at one time, on 72a is applied to the grid of 69a, there is an increased current flow through 69a, assuming that 68a and 68b now have high and low impedances, respectively, and the circuit shifts to a stable condition in which points 66b and 66a are at low and high potentials, respectively. With the circuit in this last status, a positive pulse occurring at another time on resistor 72b reduces the negative grid bias of tube 69b causing increased current flow therethrough and the circuit is shifted to the opposite condition of stability wherein points 66b and 66a are at high and low potentials, respectively. The manner in which the circuit shifts from one condition of stability to the other is similar to that operation as described in connection with the circuit in Fig. 1. Selection means, as in the circuit of Fig. 1, are provided, since it is obvious that closure of switch 73a (Fig. 2) prevents pulses applied to resistor 72a from being effective and the closure of switch 73b prevents pulses applied to resistor 72b from being effective. Manipulation of switches 73a and 73b, therefore, permits selective operation of the circuit. This modification of the triggering circuit, which includes the two sources of pulses, is employed extensively in the circuits of the electronic accumulator. That portion of the Fig. 2 circuit within the broken line enclosure, is identical in structure to that portion in Fig. 1 within the broken line, except that the control grids of 69a and 69b are not connected, and is therefore termed an element, and it, along with its two sources of pulses forms the basis of the electronic commutator and the digit manifesting elements which are presently to be described.

While tubes 69a and 69b have been shown as pentodes in the circuits of Figs. 1 and 2, it will be understood that one, or both of these vacuum tubes may be triodes, as are tubes 68a and 68b. When tubes 69a and 69b are triodes, however, no screen grids are available to afford the trigger circuit the feature of selectivity provided by the selection means, as set forth above.

3. Electronic commutator

The purpose of this commutator which is of the type as shown and claimed in applicant's copending application Serial No. 394,884, filed May 23, 1941, is to provide means whereby various results may be obtained at high rates of speed and without the undesired effects of inertia and when the circuit functions either continuously or intermittently with respect to a given time base. The circuit employs vacuum tubes and associated impedances, the trigger circuit element as employed in Fig. 2 and described in section 2, being utilized as a fundamental element. The number of elements which are employed depends upon the number of steps through which it is desired to progress before the circuit repeats its function.

Assuming that one of the elements of the circuit is "on" and the remaining ones are "off," the former element conditions the next succeeding or second element, so that upon the occurrence of a pulse, termed an advancing pulse, the conditioned element is turned on. This next element, when "on," in turn conditions the element just preceding, so that upon the occurrence of a pulse, termed a restoring pulse, which occurs prior to the next advancing pulse, this preceding element is turned off. The second element which is now "on" in turn conditions a third element, so that when the following advancing pulse occurs, this third element is switched on. In such status the third element, so conditions the second element, that upon the occurrence of the next restoring pulse, the second element is turned off. The foregoing is a general explanation of the operation of the commutator when two advancing and two restoring pulses cause the "on" circuit position to advance by two. Were advancing pulses no longer applied the third element would stay "on" and the remaining ones "off." When, however, the advancing pulses were again applied, stepping operations would again occur and a fourth, fifth, sixth, etc., element would be turned on in sequence. Should the total number of elements be ten, the first element would be switched on under control of the tenth one and the commutator could thereafter repeat its cycle of operation. It is seen, therefore, that the elements are so interrelated and so intercontrol one another, that upon the application of succeeding advancing and restoring pulses, there is a step-by-step conditioning of each of the elements in first an "on" and then in an "off" status. Each element, so functions, in a definite order, and, when the final one of a series is operated, one cycle of the commutator is completed and a new cycle can be initiated.

The principle and details of operation of the electronic commutator may be understood by reference to Fig. 3 which illustrates a basic circuit of three positions, it being understood that the number of positions can be chosen as desired. The number of elements in Fig. 3 is therefore three and they are designated respectively, as S1, S2, and S3. Portions of the circuit of Fig. 3 which correspond in character and function to those of the circuit, explained in connection with Fig. 2, are given the same reference characters.

Referring to Fig. 3 and assuming that S1 is "on" and S2 and S3 are "off," the manner in which the latter two elements are turned on in succession will now be described. It is also assumed that pulses of the character shown in Fig. 4a, for example, are applied to resistance 72b (Fig. 3) and that pulses of the character shown in Fig. 4b, for example, are applied to resistance 72a. It is to be noted that the pulses shown in Fig. 4a and b are of the same frequency but 180 degrees out of phase. Such symmetrical separation of the pulses, however, is not essential.

The screen of tube 69b (S2) is connected to the midpoint 77 of resistor 63b (S1) through a screen current limiting resistor 74. By virtue of this circuit arrangement, the screen voltage of tube 69b (S2) is determined by that of point 77 and, if S1 is "off," point 77 is near the potential of line 61, whereas, if S1 is "on," point 77 is at a high potential with respect to line 61. When the screen voltage of tube 69b (S2) is low, a reduction of its negative grid bias has no effect on the tube. That is, a low screen voltage of tube 69b (S2) serves as a shut-off for the tube. On the other hand, when the screen voltage of tube 69b (S2) is high, a reduction of its negative grid bias causes increased current flow therethrough. For the normal grid bias applied to the grid of tube 69b (S2), a rise in its screen voltage has no effect on current flow through the tube.

Assuming S1 is "on," point 66b (S1) and the screen of tube 69b (S2) are at a high potential, so that S1 conditions S2 in order that it may be turned on, when an advancing pulse is applied to the grid of its tube 69b. An advancing pulse (Fig. 4a) applied to resistor 72b is effective via line 75, to reduce the negative grid bias of tube 69b (S2) increasing current flow therethrough and thereby tripping S2 to an "on" status (section 2). The rise in potential of point 66b (S2), coinciding with an advancing pulse, is indicated in Fig. 4d. Comparison with Fig. 4c indicates that, momentarily, both S1 and S2 are "on."

The screen of tube 69a (S1) is connected to the midpoint 77 of resistor 63b (S2) through a screen current limiting resistor 74. By virtue of this circuit arrangement the screen voltage of tube 69a (S1) is determined by that of point 77 (S2). If S2 is "off," point 77 is near the potential of line 61, and, if S2 is "on," point 77 is at a high potential with respect to line 61. Thus the screen voltage of tube 69a (S1) varies in the same manner. When the screen voltage of tube 69a (S1) is low, a reduction of its grid bias has no effect. That it, a low screen voltage of tube 69a (S1) acts as a shut-off for the tube. On the other hand, when the screen voltage of tube 69a (S1) is high, a reduction of its negative grid bias causes increased current flow therethrough. For the normal bias applied to the grid of tube 69a (S1) a rise in its screen voltage has no effect on current flow through the tube.

Since S2 is now "on," as described above, point 77 of S2 and the screen of tube 69a (S1) are at a high potential, so that S2 conditions S1 in order that it may be turned off when a restoring pulse is applied to the grid of tube 69a (S1). A restoring pulse (Fig. 4b) applied to resistor 72a is effective via line 76, to reduce the grid bias of tube 69a (S1) increasing current flow therethrough, and thereby tripping S1 to an "off" status, in the manner described in section 2. As a result of this operation, point 66b (S1) drops to a low potential, as indicated in Fig. 4c.

If no further pulses are applied to resistances 72b and 72a, S2 remains "on" and S1 and S3 remain "off." This would be indicated by the fact that the glow tube 78 (S2) would be ignited while those related to S1 and S3 would be dark.

If it be assumed, however, that advancing and restoring pulses are continuously applied to resistances 72b and 72a, respectively, the commutator of Fig. 3 will be continuously operated. To continue the above description, with S2 "on," there is a conditioning of S3 so that the next advancing pulse applied to resistance 72b is effective to trip on S3. The resultant potential rise of point 66b (S3) coinciding with an advancing pulse is indicated in Fig. 4—e. It is seen, from a comparison of parts e and d of Fig. 4, that, momentarily, both S2 and S3 are "on." With S3 "on," it conditions S2 so that it may be shut off by the next restoring pulse on resistor 72a. The resultant potential fall of point 66b (S2), coinciding with a restoring pulse, is indicated in Fig. 4d. S3 (Fig. 3) being "on," also conditions S1 so that it may be turned on when the succeeding advancing pulse appears on line 75. When S1 is turned on, point 66b (S1) rises in potential, as is shown in Fig. 4c. S1, being "on," conditions S3 so that the latter is tripped off upon an application of the succeeding restoring pulse to line 76. The resultant potential fall of point 66b (S3), coinciding with a restoring pulse, is indicated in Fig. 4e.

It is now obvious that as long as advancing and restoring pulses are applied to the commutator circuit the directly coupled elements S1, S2, S3, S1, and so forth, are tripped on and off sequentially and independently of inductive or capacitative coupling. It is also seen that a given element cannot be switched on until its predecessor element is "on" and that a given element cannot be switched off until the succeeding element is "on." With this circuit arrangement, step-by-step progression, from one element to the next, is positive in character. This electronic commutator is utilized in this invention as a means for sequentially producing timed control and entry pulses and the same circuit is employed as the basic circuit for manifesting digits in the accumulator, both functions being described in detail in sections 5 and 7.

Further consideration of the commutator circuit of Fig. 3 indicates that advancing pulses, when applied to resistor 72b, are effective via line 75 to concurrently reduce the negative grid bias of all tubes 69b, each comprising a part of elements S1, S2, and S3, respectively. Likewise, restoring pulses, applied to resistor 72a, are effective via line 76 to concurrently reduce the negative grid bias of all tubes 69a of these elements, respectively. It will be appreciated, however, that a negative grid bias reduction of a tube 69b, due to an advancing pulse, can cause increased current flow therethrough, only when its screen is at high potential, and such screen is at this potential only when a preceding element is "on." This preceding element is the sole one which is "on" when an advancing pulse is applied. Therefore, the reduction of grid bias for all tubes 69b is selectively effective, only in the conditioned one, and it alone is tripped on. It will also be understood that a negative grid bias reduction of a tube 69a, due to a restoring pulse, causes increased current flow therethrough, only when its screen grid is at high potential, and such grid is at this potential, only when a succeeding element is "on." Therefore this reduction of negative grid bias of all tubes 69a is selectively effective, only in the conditioned one to trip it off (all other elements save the succeeding one, already being off and this one having no properly related "on" element to trip it off).

Assuming, as before, that S1 is "on," then the screen of tube 69b (S2) is at a high potential and an advancing pulse, which reduces its grid bias, causes increased current flow therethrough, and S2 is tripped on, as is now understood. As such action occurs, point 77 (S2) begins to rise in potential as does also the screen voltage of tube 69b (S3) connected to said point. It would therefore appear, at first blush, that the advancing pulse which trips on S2, might, by virtue of the resulting screen voltage rise of tube 69b (S3), also cause S3 to trip to an "on" status. This rise in potential of point 77 (S2) however, to its full value is not instantaneous, but occurs exponentially (see Fig. 4d), so that an interval of time elapses from the instant of pulse application until point 77 (S2) reaches its maximum high potential and the same applies also to the screen voltage rise of tube 69b (S3). This time interval exceeds the duration of an advancing pulse so that said pulse ceases to exist by the time that the screen of tube 69b (S3) reaches its maximum potential. Under these circumstances, pentode 69b (S3) experiences concurrently an increase of negative grid bias (because the amplitude of the advancing pulse is decreasing from its positive peak value) and an increase of positive screen voltage, which two conditions oppose and thus prevent any substantial current flow through the pentode. It is seen, therefore, that only one element is tripped on for each advancing pulse. A slight current flow may occur in a tube of another element, such as S3, for example, but its magnitude is insufficient to trip S3 to an "on" status.

4. Oscillator and amplifiers

Pulses are employed in this invention for various purposes, such as for operating the electronic commutator, for making entries into the electronic accumulator, and for many other control purposes. Preferably, the source of such pulses is an oscillator whose output is amplifier for these purposes. Since none of the circuits in this invention depend for their operation upon frequency or phase changes, but depend upon the occurrence, per se, of pulses; locking or synchronizing means are unnecessary to maintain one portion of the circuit in step with another. Accordingly, the device of the present invention provides an electronic accumulator, which is fully automatic, in portions, that in prior devices, have required manual adjustment. Since the operation of the various circuits herein depends alone upon the occurrence, of pulses, the oscillator is not frequency stabilized and is free to drift about a mean base frequency. Such frequency drift, great or small, does not make circuit action any the less positive than if the frequency of the oscillator were maintained as constant as possible, since an operation or operations in any of the circuits cannot occur, unless a pulse actually exists, and no such pulse exists until the oscillator has generated it. Therefore, variations in the time duration of the periods between successive cycles of the oscillator are without effect on the positive and accurate operation of the device comprising this invention.

As will be described more fully later, the electronic accumulator functions upon a cyclical basis, there being one machine cycle employed during the entry of a single desired amount. The duration of time corresponding to one machine cycle determines the base frequency of the oscillator. In this invention, a single machine cycle is divided into twelve equal portions, called index point positions. Since a pulse may be required at any one of the twelve index point positions, the oscillator must necessarily make available such pulses which are separated by periods equal to one twelfth of a cycle duration. That is to say, the oscillator must function at a rate which is twelve times the machine cycle rate. For example, if one cycle of the electronic accumulator is to occur in one two hundred and fortieth of a second or at the rate of 240 machine cycles per second, the frequency of the oscillator is adjusted at 12×240 or 2880 cycles per second.

The oscillator employed herein is of the type commonly known as a multivibrator. Essentially, it consists of a two-stage, resistance coupled amplifier, in which the output of the second stage is fed back to the input of the first stage. Such an oscillator is capable of producing either square topped or saw toothed waves, depending upon the portion of the oscillator circuit from which the waves are derived. The square topped waves are employed herein because they are easily changed into pulses of extremely sharp wave front and short duration. The circuit diagram of the multivibrator and its principle of operation will now be described in detail.

Referring to Fig. 5a, closure of the double blade switch 79 supplies voltage to lines 50 and 80, and to a voltage divider consisting of resistances 56, 57a, 57b, 57c, and 58. Potential is also supplied by means of this divider to lines 61, 81, 82, and 51, their potentials being positive with respect to each other in the order given and with respect to line 80. The oscillator comprises vacuum tubes 83a and 83b and associated resistances and condensers. The anodes of the respective tubes are connected to line 50 through load resistors 84a and 84b and the cathodes are directly connected to line 51.

The anode of tube 83a is coupled back to the grid of tube 83b by means of coupling condenser 85b which is also connected to line 51 through the grid leak resistance 86b. The anode of tube 83b is coupled back to the grid of tube 83a by means of coupling condenser 85a, which is also connected to line 51 through the grid leak resistance 86a. With this circuit connection, the normal bias of the grids of tubes 83a and 83b is zero. Such an arrangement is unstable, and oscillations are initiated by a minute change of emission of either tube. Assuming that the current through 83a momentarily increases, this produces an increased voltage drop across resistance 84a and a decrease in potential across 83a. This decrease is fed by coupling condenser 85b to the grid of tube 83b, making it more negative. Current through 83b is decreased, decreasing the voltage drop across resistance 84b and an increase in potential across 83b. This increase is equal to the original decrease across 83a multiplied by the amplification factor and is thus much higher. Coupling condenser 85a conveys this potential change to the grid of tube 83a making said grid much less negative, with a resulting rapid increase in the current through tube 83a. The voltage drop due to this increased current is in turn fed to 83b with cumulative results. Actually, the current flow through tube 83a is increased to a high value, substantially instantaneously, which flow reaches a maximum when the grid of tube 83b has a negative potential great enough to reduce the current flow in tube 83b to zero. When this condition is reached, the charge on condenser 85b commences to leak off through resistance 86b, the time consumed being determined by the time constant of the condenser 85b and resistance 86b. When this leakage is completed, current flow in tube 83b begins and the operation described above reverses, that is, the grid of 83a will instantaneously become negative, shutting off flow through tube 83a and the grid of tube 83b will instantaneously become slightly positive and heavy flow will occur in tube 83b.

It will now be understood that a heavy current flows alternately and for a given period of time through each of the tubes 83a and 83b. When one tube is conducting, the other tube is shut off, this situation then instantaneously reverses and said one tube is shut off and the other conducts. This produces alternate and sustained voltage drops across resistors 84a and 84b, these voltages being 180 degrees out of phase with each other. These voltages are in the form of square-topped waves, easily converted into pulses that possess a steep wave-front and are extremely short in duration.

Fig. 6 diagrammatically illustrates one machine cycle and part a shows that the voltages (with respect to line 51) which occur across resistor 84a (Fig. 5a) are as stated above, square-topped in form and occur twelve times per cycle. Fig. 6 part b shows that the voltages (with respect to line 51) which occur across resistor 84b (Fig. 5a) are square-topped in form and also occur twelve times per cycle.

Since, as stated above, these voltages are 180 degrees out of phase the potential of point 87a (Fig. 5a) rises at each of the twelve index point positions and drops midway between index points while the potential of point 87b rises midway between each of the twelve index point positions and falls at each index point. One cycle of oscillator operation is that period between successive potential rises of point 87a, for example, and its time duration in seconds is equal to the sum of the time constants of condenser 85a and resistor 86a and of condenser 85b and resistor 86b, respectively.

A rise in potential of point 87a causes charging of condenser 88a and current flow through resistor 89a to line 80. By suitably choosing the value of condenser 88a so that its recovery time is extremely short, the rise in potential of 87a, produces on resistor 89a, a positive pulse of extremely short duration having a steep wave front. A decrease in the potential of point 87a causes condenser 88a to discharge and a negative pulse of the character just noted is thereby produced on resistor 89a. Since the rise and fall of point 87a is constantly recurring, positive and negative pulses are continually produced on resistance 89a, of the form as shown in Fig. 6c. In a similar manner, positive and negative pulses are continually produced on resistance 89b (Fig. 5a) due to the rise and fall in potential of point 87b and these pulses are illustrated in Fig. 6d. It is to be noted, that, as would be expected, the pulses on these resistances are 180 degrees out of phase.

Pulses of the character shown in Figs. 6c and d are employed in many parts of the circuit. To simplify the description, pulses, having positive and negative peaks, occurring in time sequence as shown in Fig. 6c, are termed a-phased and lines conducting such pulses are denoted by underlined a. Pulses, having positive and negative peaks, occurring as shown in Fig. 6d, are termed b-phased and lines conducting such pulses are denoted by underlined b. These pulses, respectively, are amplified and reverse in phase, prior to utilization in various ways, such as, for example, in operating the electronic commutator, in controlling the making of entries into the electronic accumulator, and in other control purposes. The amplifier circuits will now be described.

A line 90 extends from resistor 89a to the grids of amplifying tubes 91b and 92b (Fig. 5a). A line 93 extends from resistor 89b to the grid of amplifying tubes 91a and 92a. The anodes of tubes 91 and 91b are connected to line 50 through load resistors 94a and 94b, and the cathodes of these tubes are directly connected to line 51. The anodes of tubes 92a and 92b are connected to line 50 through load resistors 95a and 95b, and the cathodes of these tubes are directly connected to line 51. Line 80 is negative with respect to line 51, and since resistors 89a and 89b terminate in line 80, its negative potential is the normal grid bias for tubes 91b and 92b, and 91a and 92a.

A positive pulse on resistor 89a reduces the negative grid bias of tube 91b, increasing current flow therethrough and the potential drop across resistance 94b. Condenser 96b discharges and an amplified negative pulse is produced on resistance 98b. A negative pulse on resistor 89a increases the negative grid bias of tube 91b, decreasing current flow therethrough and the potential drop across resistance 94b. Condenser 96b becomes more charged and an amplified positive pulse is produced on resistance 98b. It is to be particularly noted that the amplified pulses appearing on this resistance are b-phased and are therefore similar to those shown in Fig. 6d, while the pulses applied to the grid of tube 91b are a-phased. The manner in which tube 92b (Fig. 5a) functions to also produce b-phased pulses, via line 92c, on resistance 99b (Fig. 5h) is similar to that just described in connection with tube 91b (Fig. 5a). Likewise, the manner in which the b-phased pulses on resistance 89b control tubes 91a and 92a to produce a-phased amplified pulses on resistors 72a1 and 72b is similar to that described in connection with the action of tube 91b. Such pulses are similar to those shown in Fig. 6c.

The foregoing has described the manner in which an oscillator of the multivibrator type is employed to produce square-topped waves, which are converted into pulses of extremely sharp character, and amplified, with reversal in phase, until suitable for use in various portions of the electronic accumulator circuit. It has been shown that two groups of pulses are produced, one of positive polarity occurring at index point positions of a machine cycle and designated as a-phased and the other of positive polarity occurring midway between index points and designated, as b-phased. In some few instances the negative pulses are utilized, as will be explained in detail later. The manner in which both groups of positive pulses are employed for controlling an electronic commutator for producing definitely timed pulses will now be described.

5. *Control of electronic commutator to continuously produced timed pulses*

In Sec. 4, it was stated that the electronic accumulator operates on a cyclical basis. Each entry operation requires a machine cycle, which cycle is divided into twelve equal portions, termed index point positions. As employed in the following description, an expression such as "1," may be considered to mean: the "1" time, or the "1" index point position, in a complete machine cycle. Pulses, which are produced by the multivibrator and which appear amplified and reversed in phase on resistors 72a1, 98b, 72b (Fig. 5a) and 99b (Fig. 5h) are not "tied in" with a machine cycle. That is to say, no pulse appearing on any of these resistances can be specifically designated as a "9," an "8," etc., pulse. Coordinating means, operated by these uncoordinated pulses, are provided to produce pulses which are grouped into or "tied in" with a machine cycle, each pulse included in the group having a differential timed significance within the machine cycle. This coordinating and pulse producing means comprises the electronic commutator, whose principle of operation was described above (section 3, Fig. 3). The circuit diagram of this pulse producing commutator is illustrated in Figs. 5a, 5g and 5m. There are produced both a-phased and b-phased pulses and of both positive and negative polarity, at each of the twelve index point positions comprising one machine cycle, and each element of the commutator is capable of producing, one a-phased pulse and one b-phased pulse. The pulse producing means, therefore comprises twelve elements C12, C9 etc. . . . C1, C0 and C11, said elements being of the type already described (section 2, Fig. 2). Portions of the commutator circuit shown in Figs. 5a, 5g and 5m which correspond in character and function to those of the circuits shown in Figs. 2 and 3 are given the same reference characters. Since all elements are similar, a complete set of reference numerals is applied only to C12 (Fig. 5a).

Resistor 72b (Fig. 5a), previously described, is similar in function to resistance 72b (Fig. 3) in that a-phased pulses are continually applied to line 75 (Figs. 5a, 5g and 5m) whenever the machine is in operation, for the purpose of turning on the elements of the electronic commutator, i. e., they are advancing pulses. Resistance 72a2 (Fig. 5b) is similar in function to resistance 72a (Fig. 3), in that b-phased pulses thereon are effective via line 76 (Figs. 5b, 5a and 5m) to turn off elements of the electronic commutator. The manner in which b-phased pulses are produced on resistance 72a2 (Fig. 5b) will be described later (section 18) but it is sufficient to state at this time that such pulses are continually applied to line 76 whenever the machine is in operation.

When starting up the machine, switch 101 (Fig. 5a) is closed, thereby shunting out a portion of resistance 72b and placing line 75 at the potential of line 51. Under this condition, pulses produced on resistance 72b are ineffective to turn on elements of the commutator.

Prior to effecting entries into the machine, the commutator is conditioned, in a manner to be described in detail in section 18, but it is sufficient to state at this time that the result of this conditioning is to turn off the elements C9, C8, etc., and to turn on solely the element C12.

Following the conditioning operation, switch 101 is opened, and thereupon advancing pulses on resistance 72b continuously control the turning on of the various elements of the electronic commutator.

The manner in which advancing and restoring pulses are employed to sequentially turn on and off each of the elements C12, C9, C8, etc., is as previously explained in section 3 with respect to Fig. 3. In the circuit of Fig. 3, a commutator comprised of only three elements is illustrated, whereas in Figs. 5a, 5g and 5m the commutator comprises twelve elements. The principle of sequential operation is, however, exactly similar in both commutators. From the prior description, it will be understood that each and every one of such elements becomes turned on and off sequentially, prior to a repetition of a commutator cycle, or in other words, one complete operation of all elements of the commutator constitutes a machine cycle and the element C12 demarcates the beginning and terminating point of each cycle. It is to be noted that as long as the machine is in operation and following a conditioning operation, as noted above, advancing and restoring pulses are applied to lines 75 and 76 so that the commutator remains in continuous operation.

As previously stated, the pulses chosen as advancing pulses for the commutator are $a$-phased, and in view of the explanation given in section 3, it will be understood that whenever a point 66b of an element rises in potential under control of an advancing pulse (or a point 66a falls), such action occurs at an index point time. Since the restoring pulses chosen for the commutator are $b$-phased, it will also be appreciated that the fall in potential of a point 66b of an element, under control of a restoring pulse (or the rise of a point 66a) occurs midway between index point positions. The times in a machine cycle at which points 66b of the elements C12, C9, C8, etc. . . . C0, C11, respectively, rise to a high potential and then fall, are shown in Fig. 7a to L, inclusive. The times in a machine cycle at which points 66a of the elements C12, C0, and C11 rise to a high potential and fall are shown, respectively, in Fig. 7m, n, and p.

Fig. 7a to p, inclusive, indicate that substantially square-topped waves are sequentially produced at points 66b and 66a. These square-topped waves are converted into pulses of sharp wave-front and of extremely short duration for entry and for various control purposes including entry control. Each pulse has a definite differentially timed relationship within a machine cycle such as "12," "9," "8," etc., which is maintained throughout machine operations, cycle by cycle.

A rise in potential of point 66b (C12) (Fig. 5a) is effective, via one of the lines in the group generally designated 102 (see also Figs. 5g, 5m and 5n), to charge a condenser 103 (Fig. 5n) and to cause current flow through resistor 104a connected at one end to condenser 103 and at the other to line 51. The value of condenser 103 is so chosen that its recovery time is relatively short, and therefore this current flow through resistor 104a is in the form of a positive short pulse occurring at "12," which is the same as "D" in a cycle. Upon a fall in potential of point 66b (C12) (Fig. 5a) condenser 103 (Fig. 5n) discharges and a pulse of negative polarity have a steep wave-front and of extremely short duration is now produced on resistor 104a. The positive and negative pulses produced on resistor 104a are illustrated in Fig. 8a, and it will be observed, that as stated above, the positive pulse occurs at the "12" or "D" index position and that the negative pulse occurs midway between "9" and "8."

In a similar manner, the rise and fall in potential of the points 66b of elements C9 (Fig. 5a), C8, C7, C6, C5, and C4 (Fig. 5g), C3, C2, C1, C0, and C11 (Fig. 5m) produce positive and negative pulses on resistances 104b (Fig. 5n), 104c, 104d, 104e, 104f, 104g, 104h, 104i, 104j, 104k, and 104L, respectively. The different times in a machine cycle at which the respective pulses occur are illustrated in Fig. 8b to L, inclusive.

The fall and rise in potential of the point 66a of C12 (Fig. 5a), C0 (Fig. 5m) and C11, produce negative and positive pulses on resistors 104m, (Fig. 5n), 104n, and 104p, respectively. The different times in a machine cycle at which these respective pulses occur are illustrated in Fig. 8m, n, and p, respectively.

Consideration of Fig. 8 indicates that the positive pulses shown in Fig. 8a to L, inclusive, occur at the index point times and that the positive pulses shown in Fig. 8m, n, and p occur at a point midway between index point positions. Except as otherwise specifically noted, only the positive pulses are employed in this invention. It should be noted that the return circuit for resistors 104b to 104j, inclusive (Fig. 5n) comprises line 82, the return circuit for resistances 104a, 104k, 104L, and 104p comprises line 51, and the return circuit for resistances 104m, and 104n comprises line 81.

The foregoing has described a continuously operating commutator which comprises a pulse coordinating means operated by uncoordinated impulses to produce pulses which are grouped into repeated machine cycles, each pulse of a group having a differential timed significance in any one cycle. The pulse producing and coordinating means in the embodiment shown and described comprises an electronic commutator of twelve elements. The manner in which square-topped wave forms, as produced by the operation of each of the elements, are converted into pulses of steep-wave front and short duration has also been described. It is seen that each of such pulses has a definite differentially timed relationship which is maintained, machine cycle by machine cycle, as long as the electronic commutator is operating.

Each of the respective "9" through "1" pulses appearing on resistances 104b to 104j, inclusive (Fig. 5n), is a digit representing pulse and each is applied to one line of a group generally designated 105, for a purpose to be explained subsequently in section 15.

The "12" or "D" pulse on resistor 104a is effective, via line 106 (see also Figs. 5h and 5b), for initiating and also for terminating operation of a single entry control device, as described in Sec. 15 and (see also Figs. 5p, 5q and 5r) for terminating carry entries, as is set forth later in sections 8 and 15.

The "0" pulse on resistor 104k (Fig. 5n) is effective, via line 107 (see also Figs. 5h and 5b), for terminating operation of the manually controlled portion of the single entry control device, as will be explained in section 15.

The "11" pulse on resistor 104L (Fig. 5n) is effective via line 108 (see also Fig. 5h) for elusive one entry, as described in Sec. 12 and (see also Figs. 5p, 5q, and 5r) for carry effecting purposes, as is set forth later in section 9.

The "½ after D" positive pulse (see Fig. 8p) obtained from 66a of C11 (Fig. 5m) when C11 is turned off, appears on resistor 104p (Fig. 5n) and is effective via line 109 (see also Fig. 5h) when the accumulator is utilized for subtraction, as is described subsequently in section 10.

The grids of tubes 110a and 110b (Fig. 5n) are respectively connected to resistances 104m and 104n. A pulse, negative in this case (see Fig. 8m) obtained from 66a of C12 (Fig. 5a) when C12 is turned on, appears at "12" on 104m and increases the negative grid bias of tube 110a, decreasing current flow therethrough and the voltage drop across load resistance 111. Condenser 112 becomes charged and a positive pulse is produced at "12" on resistor 113.

A negative pulse (see Fig. 8n) obtained from 66a of C0 (Fig. 5m) when C0 is turned on, appears on resistor 104n at "0" and increases the negative grid bias of tube 110b decreasing current flow therethrough, and the voltage drop across load resistance 111. Condenser 112 is charged as before and another positive pulse is produced on resistor 113 at "0."

Such "12" and "0" pulses appearing on resistor 113 are illustrated in Fig. 8q and they are effective, via line 114 (Figs. 5n, 5h, 5b, 5c, 5d and 5e) for terminating entry control and carry operations of the electronic accumulator, as subsequently described.

The above has described the manner in which digit representing and other pulses are produced and distributed to the accumulator and machine control circuits and their specific use has been broadly referred to.

Having set forth the details of the electronic commutator for producing differentially timed impulses, a description will now be given of one order of the electronic accumulator, the manner of entry control for effecting entries therein, and the manner of determining and effecting carry operations.

6. Entry control device

Before describing the specific details of the entry control device, a more general explanation will be given of one order of the electronic accumulator, particularly with regard to the manner of entry control to effect entries of digits and of manifesting digits therein. In this invention there is provided for each order of the accumulator, a plurality of electronic devices for digit manifesting purposes. That one, of the plurality, which is in a certain chosen status, in combination with the status of an extra device, is indicative of the value of the digit standing in the order and all remaining ones of these devices are in the reverse status. The number of devices employed in each order is less than the number of digits in the notation, which in the present embodiment has been chosen as the tens notation. Each digit manifesting device and the extra device comprises a trigger circuit (section 2, Fig. 2) and, as is now understood, this circuit has either an "on" or "off" status. Six of these trigger circuits or elements, as they are to be designated, are used per order and that one only, of five of said elements, which is "on," in combination with the "on" or "off" status of the sixth element, is indicative of the numerical value of the digit. The status of the five digit elements and the extra one is controlled by an entry control device, which in turn is controlled by the digit representing impulses produced by the electronic commutator (section 5) acting upon the entry control device. Such control produces a step-by-step operation of the elements, as in control of the commutator, except that the operation is not continuous, unless entries are continuous, and, as in the operation of the commutator, commencing with the one succeeding the one only which is "on," there is a sequential conditioning of all elements, except the extra element, in first an "on" and then an "off" status. The extra element is turned on and off successively, whenever the sequential operation of the digit elements begins to repeat. The last element to remain "on," in combination with the "on" or "off" status of the extra element, correspond in numerical designation, to the algebraic sum of the digit in the order and of the entry. The number of elements (including those operated more than once) turned on and off during an entry, is equal to the true value of an entered digit, during an adding process, and is equal to the complemental value of the entered digit, during a subtracting process. The shift of the extra element from an "on" to an "off" status, or vice versa, is dependent upon whether or not the sequential operation of the digit elements begins to repeat. It has been pointed out (section 3), that for each advancing pulse, an element is turned on and that a following restoring pulse turns off the element just preceding. The extra element becomes turned on and off successively for every fifth advancing pulse. By controlling, in accordance with the value of the digit to be entered, the number of advancing impulses which are applied to the elements of a given order, the new element which is "on," upon suspension of application of these pulses, in combination with the "on" or "off" status of the extra element, will numerically designate the new digit, i. e., the algebraic sum of the digit originally in the order and of the entry.

When adding, the entry control device, now to be described and of which there is one per order, is controlled by a pulse, representative of a digit to be entered. The entry control device thereupon allows advancing pulses, whose number is equal to the value of the entry, to be effective in sequentially turning on its associated digit manifesting elements and also in operating the extra element. It is deemed obvious, that control of advancing pulses, alone, will control stepping operations, since it is an "on" element which determines which element will be turned off, the succeeding restoring pulses being, therefore, inoperative until another entry is made. In this manner a step-by-step action occurs and finally a new element remains in "on" status and the extra element is in "on" or "off" status, to indicate the new digit.

Reference to Figs. 8b to 8j, inclusive, which show the digit representing pulses "9" to "1," respectively, indicates that such pulses have one positive peak only, during one machine cycle, and that such peaks occur at differential times in a cycle, numbered according to the digit represented. Fig. 8b, for example, shows a "9" pulse which occurs, nine index point positions ahead of "0," Fig. 8c shows an "8" pulse which occurs, eight index point positions ahead of "0" etc., to Fig. 8j which shows a "1" pulse which occurs, one index point only, ahead of "0." In other words, the time interval in a machine cycle between any digit representing pulse and "0" is proportional to the value of the particular digit chosen to be entered and the total number of index points in such interval is numerically equal to the digit.

As noted above, the digit manifesting elements are controlled by advancing pulses and for a given digit entered it is the function of the entry control device to make available a number of advancing pulses which equals the value of the digit.

The entry control device is called into action at a differential time in a cycle by a digit representing pulse, referred to above, and remains in operation until "0" so that the time interval during which the entry control device is operating is proportional to the value of the entered digit, and the total index points in such interval is numerically equal to the digit. Since one advancing pulse is permitted to be effective to actuate the digit manifesting elements, for each index point position that the entry control device operates, the number of effective advancing pulses for a particular entry equals the numerical value of the digit, and impart, in conjunction with the restoring pulses, step-by-step operation to the digit manifesting elements of the electronic accumulator.

Referring now to Fig. 5d, the entry control device for the tens order of the accumulator, which order is chosen to best illustrate entry, comprises a circuit element, as previously described (Figs. 1 and 2, section 2). This device is generally designated E$t$ (Fig. 5d) and portions of E$t$ which correspond in character and function to those of the circuits explained in connection with Figs. 1 and 2 are given the same reference characters. Tubes 115b and 116b (Fig. 5d) are in parallel with tubes 68b and 69b, and they can also be controlled so as to have the same function as tube 69b, as previously described (Sec. 2), that is, to turn on E$t$ whenever the bias of their respective grids is reduced. The respective operations will be described later. Tubes 115a and 116a are in parallel with tube 68a and it is to be specifically noted that each may have the same function as tube 69a (Fig. 2) previously described (section 2), that is, to turn off E$t$ when the bias of each respective grid is reduced.

Normally the entry control device E$t$ is "off" and when an entry of a digit is made, the device is turned on at a differential time. As will be explained subsequently (section 15), for each of successive amounts to be entered in the accumulator, only one machine cycle is required and a single entry cycle control device is provided in this connection whereby, during adding operations, the screen of tube 69b (E$t$) is at high potential during the complete cycle. Accordingly, a reduction in the negative, control grid bias of tube 69b causes E$t$ to be turned on, in a manner now understood. Assuming it is desired to enter a 3 into the tens order of the accumulator, the manner in which E$t$ is turned on at "3" is as follows.

Referring to Fig. 5n, a "3" digit representing pulse is produced on resistor 104h (section 5) and is effective via one of the lines of group 105, contacts 117t3, now closed (in a manner described later in sections 14 and 15), and line 118t (see also Figs. 5h, 5b, 5c and 5d) to reduce the grid bias of tube 69b (E$t$) thereby turning on E$t$ at "3." With E$t$ "on," point 66b rises in potential, as is shown in Fig. 9b, as does also the screen of tube 119a (Fig. 5d) which is connected to the midpoint of resistor 63b (E$t$) through screen current limiting resistor 74. With the screen of tube 119a at high potential, changes in the grid bias of this tube are now effective to vary current flow therethrough. Referring to Fig. 5a, it is recalled that b-phased pulses are produced on resistor 98b (section 4). Line 120 extends from the grid of 119a (Fig. 5d) (see also Figs. 5c and 5b) to 98b (Fig. 5a) so that the grid of 119a has b-phased impulses continuously impressed upon it, as long as the machine is in operation (see also Fig. 9a). When, as explained above, the screen voltage of tube 119a (Fig. 5d) is raised at "3," the positive and negative b-phased pulses are now effective to increase and decrease, respectively, the voltage drop across load resistor 121. Accordingly, condenser 122 discharges and charges, respectively, and a-phased negative pulses are produced on resistance 123 (see also Fig. 9c).

The manner in which a "0" pulse is produced on resistance 113 (Fig. 5n) has been explained (section 5), and this pulse is effective, once each machine cycle, via line 114 (see also Figs. 5h, 5b, 5c and 5d) to reduce the negative grid bias of tube 116a (E$t$) thereby shutting off E$t$ with an accompanying potential drop of point 66b (E$t$) at "0," as shown in Fig. 9b. Accordingly, the screen voltage of tube 119a (Fig. 5d) falls, and b-phased pulses applied, thereafter, to its control grid, no longer produce changes of current flow therein, and a-phased negative pulses no longer appear on resistance 123 after "0," as is shown in Fig. 9c.

Consideration of the foregoing indicates that when an entry of 3 is made into the tens order of the electronic accumulator, element E$t$ (Fig. 5d) is "on" for three index point positions. During the interval E$t$ is "on," the screen of tube 119a is raised in potential so that b-phased pulses which are applied to its control grid, during said interval, produce current variations therethrough. These current variations appear as a-phased negative pulses on resistance 123. Reference to Fig. 9c shows that the number of a-phased negative peaks which appear on resistance 123 (Fig. 5d) is equal to the number of index point positions during which E$t$ is "on," which in this particular example, is three. The production of the wave forms, as illustrated in Fig. 9c, will now be described.

Resistance 123 is connected to line 51, as is also the cathode of tube 119b. Since the grid of 119b is connected to resistance 123, its normal bias is zero and there is substantially full flow through 119b, so that a positive pulse appearing on resistance 123 has no appreciable effect on current flow through tube 119b.

Since the grid of tube 119b draws current when a positive pulse is applied to resistance 123, such pulse is attenuated by the resultant current flow through 123 and therefore is almost completely lopped off, as illustrated in Fig. 9c. A negative pulse on 123, however, increases the negative bias on the grid of tube 119b, reducing current flow therethrough and the voltage drop across resistance 124, condenser 125 is charged and a b-phased positive pulse appears on resistance 72b, as is shown in Fig. 9d. The number of such positive pulses which are produced on resistance 72b (Fig. 5d) is equal to the number of negative pulses appearing on resistance 123 because of this circuit arrangement. Hence, with an entry of 3 into the tens order of the accumulator, only three negative pulses occur on resistance 123, as described above, and therefore only three positive pulses are produced on resistance 72b, as indicated in Fig. 9d. Pulses on resistance 72b are applied to line 75 (Figs. 5d, 5j and 5q) for the purpose of sequentially turning on or advancing the digit manifesting elements of the accumulator, as will be explained (section 7). It is to be noted, however, that these advancing pulses, are b-phased, in contradistinction to the advancing pulses used in the commutator.

It is further seen that although the entry control device is turned on exactly at an index point position, there is a lag before the digit manifesting accumulator element is turned on, this element being turned on a half index point later.

Fig. 10a to d and Fig. 11a to d, inclusive, apply to the same portions of $Et$ and circuits controlled thereby, as do correspondingly lettered parts of Fig. 9 but relate, respectively, to entries of 6 and of 2.

During the entire cycle in which 6 is entered, the screen of tube 69b ($Et$) (Fig. 5d) is at high potential. Referring to Fig. 5n, a "6" digit representing pulse is produced on resistor 104e (section 5) and is effective via one of the lines of group 105, contacts 117t6, now closed (see sections 14 and 15), and line 118t (see also Figs. 5h, 5b, 5c and 5d) to reduce the negative grid bias of tube 69b ($Et$) thereby turning on $Et$ at "6" (Fig. 10b). The screen voltage of tube 119a (Fig. 5d) thereupon rises so that b-phased pulses (Fig. 10a), applied to its grid via line 120 are now effective to cause a-phased negative pulses (Fig. 10c) to appear on resistance 123 (Fig. 5d), in a manner as previously described. $Et$ is also turned off at "0," as previously described, and during its "on" interval of six index point positions, the six negative pulses produced on resistance 123, are converted, by the action of tube 119b, into six b-phased positive pulses on resistor 72b (see also Fig. 10d). These pulses are effective via line 75 (Figs. 5d, 5j and 5q) to control associated digit manifesting elements.

Likewise, during the entire cycle in which 2 is entered, the screen of tube 69b ($Et$) (Fig. 5d) is at a high potential. Referring to Fig. 5n, a "2" pulse is produced on resistor 104i (section 5) and is effective via one of the lines of group 105, contacts 117t2, now closed (see sections 14 and 15), and line 118t (see also Figs. 5h, 5b, 5c and 5d) to reduce the negative grid bias of tube 69b ($Et$) thereby turning on $Et$ at "2" (Fig. 11b). The screen potential of tube 119a (Fig. 5d) rises so that b-phased pulses (Fig. 11a) applied to its grid, are now effective to cause a-phased negative pulses (Fig. 11c) to appear on resistance 123 (Fig. 5d), in a manner as previously set forth. $Et$ is turned off at "0," as described above, and during its "on" interval of two index point positions, two negative pulses appear (before "0") on resistor 123, which are converted by tube 119b into two b-phased positive pulses (before "0") on resistor 72b (see also Fig. 11d). These pulses are effective via line 75 (Figs. 5d, 5j and 5q) to control associated digit manifesting elements.

Since the entry control devices $Eh$ (Fig. 5e) of the hundreds order and $Eu$ (Fig. 5c) of the units order are similar to $Et$ (Fig. 5d), it is not believed necessary to describe these in detail.

In this section the control of production of advancing pulses for controlling the digit manifesting elements of one accumulator order has been generally explained and it has been pointed out that the number of such pulses produced during adding, equal the value of an entered digit. A detailed description has been given of the circuits of an entry control device and of their operation when the digits 3, 6, and 2, respectively, are to be additively entered. These examples illustrate the manner in which the operation of an entry control device is initiated on a differentially timed basis, under control of manifestations indicative of a digit to be entered, and also illustrate that the device remains operative for a number of index point positions equal to the entered digit, and that its operation is terminated at a fixed time. It has also been shown that, as a result of such operation, pulses are created equalling the number of index point positions during which the device is operative, which pulses are to be utilized for controlling digit manifesting elements of the accumulator (see section 7). The detailed operation of the entry control device during subtraction is described in section 10.

7. Digit manifesting elements

The features in general of the digit manifesting elements of this accumulator were set forth in the introductory portion of section 6. It is noted that six elements (section 2, Fig. 2) are employed, five of which are in a circuit arrangement which is similar to that of an electronic commutator (section 3, Fig. 3). To differentiate between the commutator comprised of elements C12, C9–C11 and the commutator comprised of digit manifesting elements of an order of the accumulator, the latter elements may be referred to as comprising a commutaor-like organization. The six elements comprising, for example, the accumulator tens order are designated $At0$—5, $At1$—6, $At2$—7, $At3$—8, $At4$—9 and $Xt$ in Figs. 5d and 5j. Portions of the accumulator circuit, here shown, which correspond in character and function to those of circuits shown in Fig. 3 are given the same reference characters. Since all elements are similar, a complete set of reference numerals is applied only to element $At0$—5 (Fig. 5d) and to $Xt$ (Fig. 5j).

Resistance 72a1 (Fig. 5a) is similar in function to resistance 72a (Fig. 3) in that pulses on 72a1 (a-phased, however) are applied to line 126 (Figs. 5a, 5b, 5c and 5d) for the purpose of turning off the $At0$—5 element, only. While b-phased pulses are utilized in turning off the commutator, it is noted that a-phased pulses turn off the digit manifesting elements. Since there is a lag or half index point separation between operation of the entry control device and operation of the digit manifesting elements, as was stated above, there is the same time lag in turning off the digit manifesting elements. Hence a-phased pulses are employed in turning off the digit manifesting elements, in order to provide the half index point separation. Resistance 72a3 (Fig. 5h) is also similar in function to resistance 72a (Fig. 3) in that pulses thereon (a-phased in this case) are effective via line 128, (Figs. 5h, 5b, 5c and 5d) to turn off elements $At1$—6 (Fig. 5d), $At2$—7, $At3$—8 and $At4$—9 (Fig. 5j) of the accumulator. The manner in which a-phased pulses are produced on resistance 72a3 is described later (section 17). As mentioned previously (section 4) a-phased pulses are produced on resistance 72a1 (Fig. 5a) as long as the machine is in operation and therefore such pulses are continually applied to line 126 (see also Figs. 9e, 10e, and 11e). With regard to resistance 72a3 (Fig. 5h), it is sufficient to state, at this time, that a-phased pulses are also produced thereon, as long as the machine is in operation, and therefore such pulses are continually applied to line 128 (again see Figs. 9e, 10e, and 11e).

Prior to effecting entries into the accumulator, it is reset in a manner to be described in detail in section 17. It is sufficient to state that the result of this resetting operation is to turn off the elements At1—6, (Fig. 5d), At2—7, At3—8, At4—9 and Xt (Fig. 5j) and to turn on the element At0—5 (Fig. 5d). That 0 stands in the tens order is indicated by the status of two elements At0—5 and Xt, these being "on" and "off" respectively, to thereby indicate by their combined manifestations that the digit in the tens order is 0. It is also necessary, prior to making entries when starting up the machine, to condition the electronic commutator to place the same in operation, as will be described in section 18. Following such resetting and conditioning operations, an entry may be made into any order or orders of the accumulator.

In describing entry control device Et (section 6) the first digit selected for entry was 3 and the manner in which three advancing pulses for controlling the digit manifesting elements are produced on resistance 72b (Fig. 5d) was described in detail. Since restoring pulses also are available from line 126 for At0—5 and from line 128 for the other elements, with an entry of 3, the following occurs: element At1—6 (Fig. 5d) is turned on, At0—5 off, At2—7 (Fig. 5j) on, At1—6 off, At3—8 on and finally At2—7 is turned off. As long as At3—8 is "on", no other element can be turned off, and it is deemed obvious that control of the advancing pulses controls the stepping operations, since continuing restoring pulses are ineffective until another element is turned on. The exact manner in which advancing and restoring pulses are utilized to thusly sequentially actuate these elements is as already explained (section 3, Fig. 3). The operation of these elements during this particular entry together with the maintained "off" status of At4—9 and Xt, is shown in Fig. 9—f to k, inclusive.

It is to be noted that at the beginning of the cycle, At0—5 only, is "on," and at the termination of the cycle At3—8 only (Fig. 5j), is "on" (Fig. 9—i). It is to be particularly noted that prior to and also after the above described entry, Xt remains in "off" status. In this manner 3 is added to 0, with the result that 3 stands in the accumulator. The fact that 3 stands in the tens order is indicated by the status of the two elements At3—8 and Xt, which by being "on" and "off," respectively, indicate combinationally, the new digit in the order. Were no further entry made in subsequent machine cycles, the status of all elements would remain as shown in the above mentioned figures. The fact that 3 stands in the accumulator would be indicated by the illumination of glow tube 78 of (At3—8) (Fig. 5j) and the extinguished status of glow tube 78 (Xt). Those glow tubes, associated with the remaining elements, would also be extinguished. Another novel and more readily identifying method of indicating the digit standing in an order of the accumulator is described in section 16.

In the previous second example (section 6) illustrating the operation of Et (Fig. 5d), the digit selected for additive entry was 6 and in Sect. 6 there was set forth the manner in which six advancing pulses for the digit manifesting elements are produced on resistance 72b. Assuming now that 3 already stands in the tens order of the accumulator; with an entry of 6, the following occurs: the element At4—9 (Fig. 5j) is turned on (Fig. 10j), At3—8 off (Fig. 10i), At0—5 (Figs. 5d and 10f) on, At4—9 off, At1—6 (Figs. 5d and 10g) on, At0—5 off, At2—7 (Figs. 5j and 10h) on, At1—6 off, At3—8 (Fig. 5j) on, At2—7 off, At4—9 on and finally At3—8 (Fig. 10i) is turned off. From the above description it is seen that the first of the advancing pulses, applied to line 75, turns on At4—9. With At4—9 "on," this element is effective, in a manner now understood, to condition At0—5, so that the latter is turned on by the second advancing pulse. Element At4—9 when "on," is also effective, to condition the extra element Xt (Fig. 5j). The screens of pentodes 69a and 69b (Xt) are both connected to screen current limiting resistor 74a which in turn is connected to the midpoint of resistor 63b (At4—9). Accordingly, with At4—9 "on," its point 66b is at high potential so that the screens of tubes 69a and 69b (Xt) are also at high potential. The control grids of tubes 69a and 69b (Xt) are both connected to line 75 to which the advancing pulses are applied. Therefore, whenever Xt is "off," and it is conditioned by At4—9 in the manner just described, and an advancing pulse is concurrently applied to the grids of tubes 69a and 69b (Xt), Xt is shifted to a reverse status (section 2). The second one of the previously mentioned advancing pulses is accordingly effective to turn on Xt (Fig. 5j) and also to turn on At0—5 (Fig. 5d) (see also Figs. 10f and 10k). Shortly thereafter, At4—9 (Fig. 5j) is turned off in the usual manner but further advancing pulses from line 75 which are applied to the grids of tubes 69a and 69b (Xt) are ineffective to change the status of Xt, since the potential of the screens of tubes 69a and 69b (Xt) is low when At4—9 is "off." It will therefore be appreciated that Xt remains in "on" status until At4—9 is again "on" and advancing pulses also, appear on line 75, as described presently. It is further noted, that after At4—9 is "on," the operation of the series of digit manifesting elements begins to repeat and in this instance such repetition is indicated by the turning on of the extra element Xt, as just described above.

It is to be noted that at the beginning of the cycle, At3—8 (Fig. 5j) only, is in "on" status and at the termination of this cycle both At4—9 and Xt are "on." It is to be further particularly noted that prior to the above described entry, Xt is in "off" status and that following the entry, Xt is in "on" status. Thus, 6 is added to 3 and 9 now stands in the accumulator. The fact that 9 stands in the tens order is indicated by the status of the two elements At4—9 and Xt, which by being both "on" indicate, combinationally, the new digit in the order. Were no further entry made in subsequent machine cycles, the status of all elements would remain as shown in the above mentioned figures. The fact that 9 stands in the accumulator would be indicated by the illumination of glow tubes 78 of At4—9 and Xt, while all those associated with the remaining elements would now be dark.

In the previous third example (section 6) illustrating the operation of entry control device Et (Fig. 5d) a 2 was next additively entered into the tens order of the accumulator and in Sec. 6, there was set forth the manner in which two advancing pulses for controlling the digit representing elements are produced on resistance 72b (Fig. 5d). Assuming now that 9 stands in the tens order of the accumulator; with an entry of 2, the following occurs: element At0—5 is turned on, At4—9 (Fig. 5j) off, At1—6 on, and finally At0—5 is turned off. From the foregoing it is seen that the first advancing pulse, applied to line 75, turns on At0—5. Prior to the application of said pulse, element At4—9 is "on" and is effective to condition the extra element Xt, in the manner described above. Therefore, whenever X$t$ is "on," and is conditioned by A$t$4—9 being "on", upon application of an advancing pulse to line 75 and thus to the grids of tubes 69$a$ and 69$b$ (X$t$), X$t$ is shifted to reverse status (section 2) so it is turned off and at the same time that A$t$0—5 is turned on, as illustrated in Figs. 11$k$ and 11$f$, respectively. Shortly thereafter, A$t$4—9 is turned off in the usual manner and further advancing pulses from line 75 applied to the grids of tubes 69$a$ and 69$b$ (X$t$) are ineffective to control X$t$, since the potential of the screens of tubes 69$a$ and 69$b$ (X$t$) is now low. It will therefore be appreciated that X$t$ now remains in "off" status until A$t$4—9 is again "on" and advancing pulses also appear on line 75. It will be further noted that in the sequence of operations after A$t$4—9 is "on," the operation of the digit manifesting elements commences to repeat and that in this instance such repetition is indicated by the turning off of the extra element X$t$. The operation of these elements during this entry cycle (up to and including "11") is shown in Figs. 11$f$ to 11$k$, inclusive. Attention is directed to the fact that at the beginning of the cycle, A$t$4—9 and X$t$ (Figs. 11$j$ and 11$k$) only, are in "on" status and at the termination of the cycle (before "11") A$t$1—6 (Fig. 11$g$) only, is in "on" status. It is to be particularly noted that prior to the above described entry, X$t$ was in "on" status and that following the entry, X$t$ is in "off" status. In this manner 2 is added to 9 with the result that 1 now stands in the accumulator. The fact that 1 stands in the tens order, at "11," is indicated by the status of the two elements A$t$1—6 and X$t$, which being "on" and "off," respectively, indicate, combinationally, the new digit in the order. Were no further entry made in subsequent machine cycles, the status of all elements would remain as shown at "11" in Figs. 11$f$ to 11$k$, inclusive. This would be indicated by the illumination of glow tube 78 of A$t$1—6 (Fig. 5$d$) while those associated with the remaining elements would remain dark.

Since the accumulator elements A$h$0—5, A$h$1—6 (Fig. 5$e$), A$h$2—7, A$h$3—8, A$h$4—9, and X$h$ (Fig. 5$k$) of the hundreds order and A$u$0—5, A$u$1—6 (Fig. 5$c$), A$u$2—7, A$u$3—8, A$u$4—9 and X$u$ (Fig. 5$i$) of the units order are similar to those of the tens order, it is not believed necessary to discuss in detail their operation upon entries being made therein.

The foregoing examples illustrate the manner in which entries are made into an order of the accumulator and the combinational status which the digit manifesting elements and the extra element assume, as a result of said entries. The following table in which X denotes "on" and O denotes "off," illustrates the combinational status of said elements as chosen for each digit of the tens notation, which may stand in an order of the accumulator.

| Digit | Digit manifesting elements | | | | | Extra element |
|---|---|---|---|---|---|---|
| | A0-5 | A1-6 | A2-7 | A3-8 | A4-9 | X$u$, X$t$ or X$h$ |
| 0 | X | O | O | O | O | O |
| 1 | O | X | O | O | O | O |
| 2 | O | O | X | O | O | O |
| 3 | O | O | O | X | O | O |
| 4 | O | O | O | O | X | O |
| 5 | X | O | O | O | O | X |
| 6 | O | X | O | O | O | X |
| 7 | O | O | X | O | O | X |
| 8 | O | O | O | X | O | X |
| 9 | O | O | O | O | X | X |

This section has described the operation of a series of digit manifesting elements of the tens order of the accumulator when three digits are entered therein additively. A 3 is added to 0, a 6 is added to 3, and finally a 2 is added to 9, with the result that 1 finally stands in the order, at "11." An explanation has been given of the step-by-step operation of some of the series of elements, whereby commencing with the one succeeding the one only, which is "on," there is a sequential conditioning of succeeding elements, to first an "on" and then an "off" status. An explanation has also been given of the operation of an extra element, which is switched to an "on" and "off" status successively, whenever the operation of the series of elements begins to repeat. The last element to remain "on," in combination with the "on" or "off" status of the extra element, is seen to represent numerically the sum of the digit in the order and of the entry. It is to be particularly noted that each of the elements, which is affected by sequential operations is utilized in the designation of two digits, and that the particular digit, of the two, which an element represents, is one value when the extra element is "on" and is another value when the extra element is "off." According to this principle of accumulation, only six electronic elements are so controlled as to make possible the representation of all ten digits comprising the tens notation. It is to be noted that, in the second example given, two of the sequentially operated series of elements, namely A$t$3—8 and A$t$4—9, are on twice during the entry. It is to be further noted, that whenever an element is so twice operated, the status of the extra element in one instance is "on" and in the second instance is "off," or vice versa. Such operating conditions exist whenever the entry is five or more. It may be noted that, unlike the continuous action of the electronic commutator comprised of elements C (section 5), the commutator-like order of the electronic accumulator operates intermittently only, namely, only when an entry is made therein. The operation of the accumulator upon subtractive entries is described later in section 10.

Attention is particularly directed to the method of cumulatively manifesting digits in this embodiment of the invention. An accumulator order comprises discrete elements, the number of elements being less, than the number of digits in the tens notation. That one, of five elements, which is "on," in combination with the "on" or "off" status of the extra element, is indicative of the digit standing in the order. Accordingly, this electronic accumulator is based on the principle of employing elements, which total less in number, than the number of digits in the notation. Each of the elements is employed in two numerical designations, and one only, is operative at any one time, in combination with a sixth or extra element, to indicate a chosen digit.

It will be understood that when 2 was added to 9, the tens order of the accumulator passed from 9 to 0 and that a carry increment must be added to the next higher order so that the 1 in the hundreds order may be manifested. The carry determining device will now be described.

8. Carry determining device

Whenever a digit is additively entered into the accumulator, and a digit, having a numerical value, lower than the value of the digit standing in the accumulator, prior to entry, appears as a result of said operation, the accumulator has passed from 9 to 0 and a carry increment must be added into the next higher order. In the particular form of accumulator here shown, that one of the series of five digit manifesting elements, which is finally turned on, as a result of an entry, may be an element which either precedes or follows in the series, the element which is "on," prior to entry. Therefore, to determine whether or not the element which is finally "on," has a lower numerical designation, than the element which was "on" prior to entry, account must be taken of any change in status of the extra or sixth element during an entry. The method of automatically determining a carry condition will now be described.

In the first of the preceding three examples (section 7), a 3 was added to a 0 in the tens order and the extra element remained "off," and in the second example, a 6 was added to a 3 and the extra element was turned "on." In neither example was there denoted, as a result of entry operations, a digit, which is numerically lower in value than the value of the one originally standing in the accumulator, and therefore the accumulator did not pass from 9 to 0. It will be recalled that during the entry, in the first example, the extra element remained unchanged in status and that during the entry in the second example the extra element became switched to an "on" status. It may therefore be stated, that when the extra or sixth element of an order remains unchanged in status or shifts to an "on" status during an entry, the accumulator has not passed from 9 to 0 during said entry. This may be seen by reference to Figs. 9 and 10.

In the third example (section 7) in which a 2 is added to 9 in the tens order, the extra element is turned off during the entry. It may therefore be stated, that when the extra or sixth element of an order is switched to an "off" status during an entry, there is the requirement of a carry entry into the next higher order. It will be appreciated that such carry requirement is determined during the entry portion of a machine cycle, namely, from "9" to "0," inclusive, since an order may pass from 9 to 0 status during the occurrence of said index points in a machine cycle. A novel electronic automatic carry determining device is therefore provided which is under control of the extra element of the digit manifesting means. At an invariably timed position in the machine cycle, designated as the carry time, the carry determining device is so arranged as to have a certain electrical status, if no carry requirement has occurred during the cycle interval "9" to "0," inclusive, but assumes another status if a carry requirement occurs during this stated time interval. The carry determining device may utilize an element which has already been described (section 2, Fig. 2). Normally, the carry determining device is in an "off" status, but if the accumulator passes from 9 to 0 during an entry cycle, the device is turned "on." In Fig. 5q, the carry determining device, for the tens order, of the accumulator is generally designated Rt, and portions of its circuit which correspond in character and function to those described in section 2, Fig. 2, are given the same reference characters. The details of the carry determining device will now be described.

Referring to Fig. 5q, the screen of pentode 69b (Rt) is directly connected to the junction of resistors 287 and 288, which together form a voltage divider between lines 50 and 51. Resistance 288 is shunted by condenser 289 for the purpose of maintaining the screen potential of tube 69b (Rt) substantially constant for screen current flow variations. The normal potential of the screen of tube 69b (Rt) is high with respect to line 61 and a negative control grid bias reduction of this tube is effective to turn on Rt. The control grid of tube 69b (Rt) is connected via line 290a to a point on resistance 290 which is coupled by condenser 291 to point 66a (Xt) (see Fig. 5j).

No pulse appears on resistor 290, as long as the status of Xt remains unchanged. A negative pulse appears on resistance 290, whenever Xt is turned on during an entry, since point 66a (Xt) drops in potential. Such negative pulse increases, the negative grid bias of tube 69b (Rt) (Fig. 5q) and, therefore, is ineffective to turn on Rt. Accordingly, Rt remains in "off" status, both when Xt remains unchanged in status or when it is turned on, during an entry into the tens order, and such are the conditions of operation of Xt, when the accumulator does not pass from 9 to 0. On the other hand when Xt is turned off during an entry, indicating that the accumulator has passed from 9 to 0, point 66a (Xt) (Fig. 5j) rises in potential and a positive pulse of short duration (recovery time of condenser 291 being extremely short) is produced on resistance 290. This positive pulse reduces the negative grid bias of tube 69b (Rt) (Fig. 5q) and is effective to shift Rt from "off" to "on." It is to be noted that Rt may be turned on at any of the index point positions during an entry portion of a machine cycle and that the particular time in said portion is dependent upon the digit in the accumulator and upon the digit entered. Unlike Xt (Fig. 5j), which as stated above, is turned off, in a manner now understood, Rt remains "on" until after the carry portion of a machine cycle, namely, the "11" index point position.

In the above problem when 2 is added to 9, the tens order passes from 9 to 0, and as a result of this entry, Rt is turned on, as just described. When Rt is turned on, its point 66b rises in potential, as is now understood, and this action is illustrated in Fig. 11L in connection with this example. It is to be noted that Rt is turned on concurrently with the shift of Xt to an "off" status (Fig. 11k and L) when the first advancing pulse (Fig. 11d) is applied in this cycle. Fig. 11L shows that Rt remains "on," until "12," in order that Rt may be utilized for controlling the application of a carry increment to the next higher order, at "11" in this same cycle. The manner in which Rt is turned off is as follows.

In section 5, there was described the production of a "12" pulse on line 106 (Figs. 5n, 5p and 5q, for example) once per machine cycle. The grid of tube 129 (Rt) (Fig. 5q) is connected to line 106 so that at "12" in each cycle, the negative grid bias of 129 is reduced. Hence, whenever Rt is turned on during a cycle and prior to "12," Rt is turned off by this "12" pulse, in the manner now understood.

Since the carry determining devices Rh (Fig. 5r) of the hundreds order and Ru (Fig. 5p) of the units order are similar to Rt (Fig. 5q), it is not believed necessary to describe these in detail.

In connection with the examples in which 3 is added to 0, and 6 is added to 3, it is to be noted that the conditions for turning on Rt were not fulfilled. Therefore, Rt remains "off" in each of these two entry cycles and point 66b (Rt) remains at low potential, as illustrated by the solid lines in Figs. 9L and 10L, respectively.

The foregoing has described an electronic carry determining device as employed in an order of the electronic accumulator. It has been shown that when an entry is made, this device remains in one status, if the order does not pass from 9 to 0, and that it assumes another status if such order does pass from 9 to 0. The control produced by the carry determining device upon a carry effecting device will now be described.

9. *Carry effecting device*

Referring now to Fig. 5q, the screen of tube 130a is connected via a screen current limiting resistor 74 to the midpoint of resistance 63b (Rt) and therefore, its voltage at "11" is at either one of two values, depending upon the status of Rt. If there is no carry requirement, the screen of tube 130a is at a low potential, but if there is a carry requirement, the screen grid is at a high potential. This is in accordance with the "off" and "on" status of Rt, as now understood. When the screen voltage of tube 130a is low, a reduction of its negative grid bias is ineffective to vary current flow therethrough. If, however, the screen voltage of tube 130a is high, a reduction of its grid bias causes increased current flow through the tube. The manner in which tube 130a effects the addition of a carry increment at "11" is as follows.

In section 5 there is described the production of an "11" pulse on resistor 104L (Fig. 5n) and on line 108 (Figs. 5n, 5p and 5q) once per machine cycle. The grid of tube 130a (Fig. 5q) is connected to line 108 so that at "11," once every cycle, the negative grid bias of tube 130a is reduced. If its screen potential is high, as is now the case, current flow occurs therethrough, producing a voltage drop across resistance 131. Condenser 132 discharges and a negative pulse appears on resistance 133. The grid of tube 134 is connected to resistance 133 and the negative pulse thereon decreases both current flow through tube 134 and the voltage drop across its load resistance 135. Condenser 136 becomes charged and a positive pulse is produced at "11" on resistance 137. This pulse is effective via line 138 (see also Figs. 5r, 5k and 5e) to reduce the negative grid bias of tube 115b (Fig. 5e) of the hundreds order entry control device Eh. Such bias reduction of tube 115b turns on Eh at the "11" time.

The manner in which a "12" pulse is produced on resistance 113 (Fig. 5n) has been explained (section 5) and this pulse is effective once every machine cycle via line 114 (see also Figs. 5h, 5b, 5c, 5d and 5e) to reduce the negative grid bias of tube 116a (Eh), thereby shutting off Eh at this time. Eh, therefore, remains "on" only until "12" so that a single advancing pulse is produced on resistor 72b and is applied in the manner as previously described (Sect. 6) to line 75 related to the hundreds order, to thereby add one, in said order. Were the hundreds order standing at 0, it would now stand at 1 as a result of this carry operation.

The foregoing has described the manner in which the carry effecting device of the tens order operates to enter a carry increment into the hundreds order when the tens order passes from 9 to 0 in the machine cycle in which a 2 is added to a 9. Had there been a carry requirement, due to the passing of the units order from 9 to 0 in this same machine cycle, a carry increment would also be added in the tens order concurrently with the carry operation just described. In this event, a pulse at "11" appearing on the units order resistance 137 (Fig. 5p), would be effective via line 138 (see also Figs. 5q, 5j and 5d) to reduce the negative grid bias of tube 115b (Et) thereby turning on Et. This shift of Et to "on" status is shown occurring at "11" in Fig. 11b and it, likewise, is turned off at "12" in the same manner as is Eh (Fig. 5e) as described above. Since Et also is "on" for a single index point position, only one advancing carry pulse (Fig. 11d) is applied to the line 75 (Figs. 5d and 5j) related to the tens order. This single advancing pulse would turn on At2—7 (since At1—6 is "on," properly conditioning At2—7) following which At1—6 would be turned off in the usual manner (section 7). The digit standing in the tens order of the accumulator would now be 2 as may be seen by reference to Figs. 11f to 11k, inclusive.

As is well understood, in an accumulator for receiving multidenominational amounts and particularly in the case where carry operations take place concurrently for all orders, there must not only be provision for effecting carry when an order passes from 9 to 0 but also where an order stands at 9 and receives a carry. In this event there must be a "carry through 9" into the next higher order.

In the second example (section 7), as a result of adding 6 to 3, the sum of 9 stands in the tens order. Assume that the units order passes from 9 to 0 due to an entry therein, during the same machine cycle, when 6 is added to 3 (the tens order, as assumed, standing at 9 at "11" time). Not only must a carry increment be added into the tens order but there must also be a carry through the tens order 9, and an entry of a carry increment into the hundreds order. The operation of the carry effecting device under this carry condition is as follows.

Referring to Fig. 10, illustrating conditions when 6 is added to 3 it is seen that At4—9 and Xt (Fig. 5j) are "on" at "11." This is to be expected since it has been assumed that 6 was added to 3 during the entry portion of said cycle. The screen of tube 130b (Fig. 5q) pertaining to the tens order is connected via line 130c (see also Fig. 5j) and the screen current limiting resistor 74 to the midpoint of resistance 63b (Xt), and the suppressor grid of tube 130b (Fig. 5q) is connected via line 130d (see also Fig. 5j) to a point on resistance 64b (At4—9). As long as either one or both of the elements At4—9 and Xt are off, the potentials of either the suppressor grid or the screen grid, or both of these grids of tube 130b (Fig. 5q), are maintained at a low value, and a reduction in the control grid bias of tube 130b is therefore ineffective to vary current flow therethrough. If the tens order stands at any one of the digits 0 to 3, inclusive, both the suppressor and screen grids of tube 130b are at low potential. If the tens order stands at 4, the suppressor grid voltage is high and the screen voltage is low. If the tens order stands at any one of the digits 5 to 8, inclusive, the suppressor grid voltage is low and the screen voltage of tube 130b is high. Therefore, whenever the accumulator stands at any of the digits 0 to 8, inclusive, a control grid bias reduction of tube 130b causes no change in current flow therethrough. On the other hand, if the tens order stands at 9, At4—9 and Xt are both "on" and both the suppressor and screen grids of tube 130b are at high potential so that a reduction of its negative control grid bias increases current flow therethrough. Since, in the particular example under consideration, at "11" the suppressor and screen grid potentials of tube 130b are both high (accumulator tens order stands at 9, At4—9 and Xt "on"), and since the units order is assumed to have passed from 9 to 0 in this same machine cycle, there is a pulse, at "11" on resistor 131 (Fig. 5p), of the units order, this pulse being effective via line 138 (Figs. 5q, 5f and 5d) to not only turn on Et (Fig. 5d), but also (Fig. 5q) to reduce the negative control grid bias of tube 130b. Accordingly, current flow through tube 130b is increased as is also the voltage drop across load resistance 131. Condenser 132 discharges and a negative pulse appears on resistance 133, which pulse increases the negative grid bias of tube 134, decreasing current flow therethrough and the voltage drop across load resistance 135. Condenser 136 is charged, and a positive pulse appears on resistance 137 (Fig. 5q) related to the tens order. This pulse is effective, via line 138 in a manner described above, to turn on the entry control device Eh (Fig. 5e), such action occurring at "11" concurrently with the turning on of Et. The operation of Eh is similar to that described above.

The shift of Et to an "on" status is shown (by the broken line) occurring at "11" in Fig. 10b and it, likewise, is turned off at "12" in a manner now understood. Since Et is "on" for a single index point position, only one advancing pulse (dotted line, Fig. 10d) is applied to the line 75 (Figs. 5d and 5f) related to the tens order. This single advancing pulse turns on At0—5 and turns off Xt, following which At4—9 (Fig. 5f) is turned off in the usual manner. The digit standing in the tens order of the accumulator is now 0, as may be seen by reference to the broken line portions of Figs. 10f to 10k, inclusive. When Xt (Fig. 5f) is turned off, Rt is likewise simultaneously shifted to an "on" status in accordance with the principles of operation of the carry determining device. This turning on of Rt at the same time as the carry pulse is illustrated by the broken line in Fig. 10L and it is seen that it is shifted back to an "off" status at "12." Such actuation of Rt (Fig. 5q) and in fact any other of the carry determining devices, under a similar condition, has no controlling effects on the carry effecting devices of the accumulator.

The foregoing has described the operation of an electronic carry effecting device which functions when an order of the accumulator stands at 9 and receives a carry increment from the next lower order. The principles of effecting carry which have been discussed in this section are universal in application to a plurality of accumulator orders.

10. *Entry control device and digit manifesting elements—Subtracting*

The operation of a single order of the electronic accumulator, for a series of additive entries, has been described in detail. The method of determining when a carry condition exists and the method of effecting carry when an accumulator order either passes from 9 to 0 or stands at 9 and receives a carry has also been set forth.

Summing up in general, with regard to adding, the underlying principle of operation comprises the regulation of a plurality of electronic elements whereby step-by-step operation of the series of elements is produced and operation is also produced of an extra element, whenever the sequential operation of the series of elements begins to repeat. Such step-by-step operations result in the sequential conditioning of each element, in first an "on" status and then an "off" status, commencing with the one succeeding the one only, which is "on," with the result that the last element to remain "on," in combination with the "on" or "off" status of the extra element, corresponds in its numerical designation to the sum of the digit and the entry. This is brought about by effecting step-by-step operations for a predetermined portion of a machine cycle, the extent of the portion of a cycle being proportional to the digit entered. Thus, it is seen that when a 3 is added, three sequential stepping operations occur for three index point positions or three-twelfths of a cycle. When a 6 is entered, six sequential stepping operations occur for six index point positions or for six-twelfths of a cycle. Whenever the number of sequential stepping operations exceeds five, the extra element is switched from an "off" to an "on" status, or vice versa.

Briefly, in adding, the sequential energization of electronic elements begins at differential cyclic times, dependent upon the digit to be added, and is terminated at a fixed cyclic time. Having summarized the principles of adding, a general description will now be given of the principles underlying the method by which digits are subtracted in this electronic accumulator.

When the accumulator is to subtract, step-by-step operation of the accumulator, under control of the entry control device begins at a fixed time in the cycle. This operation continues until the index point position is reached which position corresponds numerically to the subtrahend, at which differential time, suspension of this step by step operation is initiated. Whenever the operation of the step-by-step elements begins to repeat, the extra element is turned to an "on" status, or vice versa. Specifically, step-by-step operations commence as if an entry of 9 were to be additively made. If, for example, a 6 is to be subtracted, digit manifesting elements are sequentially started in operation under control of a "9" pulse on line 75, and are stopped under control of a "6" pulse, representative of the subtractive entry 6. During such interval, the extra element may be switched to a reverse status.

It is obvious that when 6 is subtracted, step-by-step operations occur for three index point positions or three-twelfths of one cycle. During a subtraction operation, in contradistinction to an adding operation, the digit manifesting elements are sequentially operated for a number of index point positions, numerically equal to the nine's complement of the subtrahend, namely, in this example, three. Therefore, when subtracting, step-by-step operations occur during a portion of the cycle, which is proportional to the nine's complement of the subtrahend. Whenever the number of sequential stepping operations exceeds five, the extra element is switched to a status, the reverse of that existing prior to entry.

Considered from another point of view, the method of subtraction is in effect, to add, the nine's complement of the subtrahend. Provision is also made for adding an elusive one, so that the true, or tens complement of the subtrahend, is added, thereby forming a true difference amount.

The result of this step-by-step operation of the digit manifesting elements and of the elusive one entry, is (commencing with one succeeding the one only which is "on"), to effect a sequential conditioning of each digit manifesting element, in first an "on" status and then an "off" status, and a possible operation of the extra element, the last element to remain "on," in combination with the "on" or "off" condition of the extra element, corresponding in its numerical designation to the difference between the digit previously standing in an order and the digit subtractively entered.

It will be understood that the various electronic tubes and related circuits which comprise the previously described entry control, carry determining, and carry effecting devices, the digit manifesting elements, the extra elements, etc., are also employed for subtracting. The operation of the single entry control device, which is also employed as a member of the subtraction control device, will be described in detail in section 15.

Referring now to Fig. 5c, the entry control device $Eu$ for the units order of the accumulator is similar to $Et$ (Fig. 5d, section 6) and it is therefore not believed necessary to describe $Eu$ in detail. Normally $Eu$ is "off," and when a "½ after D" pulse is effective via line 147 (as described in Sect. 15), early in a subtraction cycle, the device is turned on. As will be explained subsequently, (section 15) during a single subtractive entry, only one machine cycle elapses, and further, the screen of tube 69b ($Eu$) is at a low potential during the complete cycle, so that 69b is not operative, as it is in adding. As will also be explained later (section 15) the screens of pentodes 139a and 140a (Fig. 5h) are at a high potential during the complete cycle. The manner in and time at which $Eu$ is turned on will now be described.

Referring to Fig. 5n, a "½ after D" pulse is produced on resistor 104p (section 5) and is effective via line 109 (see also Fig. 5h) to reduce the negative grid bias of tube 140a. Since, as stated above, the screen potential of 140a is high, this grid bias reduction increases current flow through 140a and the voltage drop across load resistor 141. Condenser 142 discharges and a negative pulse is produced on resistance 143. The grid of tube 140b is connected to resistance 143 and the negative pulse on the latter increases the negative grid bias of tube 140b, reducing current flow through the tube and the voltage drop across load resistor 144. Condenser 145 is charged and a positive pulse is produced on resistor 146. This positive "½ after D" pulse is effective via line 147 (see also Figs. 5b and 5c) to reduce the negative grid bias of tube 116b ($Eu$) (Fig. 5c) thereby turning on $Eu$. With $Eu$, "on," point 66b rises in potential at "½ after D," as illustrated in Fig. 12b, as does also the screen of tube 119a (Fig. 5c). The manner in which a rise in the screen potential of tube 119a produces advancing pulses on resistor 72b is as described previously (section 6). The production of these pulses is initiated at a fixed time, as is seen by comparison of $Eu$, $Et$ and $Eh$ in Figs. 16a (3), 16b (3) and 16c (3), respectively, and is stopped at differential times in accordance with the digit entered.

The reason for turning on $Eu$ at "½ after D" rather than at "9," as might be expected, will be clear after considering the following: At the beginning of a subtraction cycle, $Eu$ is "off," and it was shown in connection with the trigger circuit (section 2, Figs. 1 and 2) that a pulse applied concurrently to both portions of said circuit, shifts it to a reverse status. Consequently, if it be supposed that a 9 were to be subtracted and a subtraction control "9" pulse (instead of "½ after D") were to be applied to tube 116b ($Eu$) (Fig. 5d) and also a digit manifesting "9" were to be concurrently applied to tube 115a ($Eu$) (to which subtractive entries are applied, see later), $Eu$ would shift to an "on" status and remain so until "0." It is required, however, when 9 is to be subtracted, that $Eu$ remain "off". Hence, were the control for $Eu$, as just supposed, advancing pulses would actuate the digit manifesting elements under conditions when none is required, since the nine's complement of 9 is 0. Therefore, in subtracting a nine, $Eu$ must be allowed to turn on without allowing any advancing pulses to be produced and must be turned off at "9." This condition is fulfilled by causing $Eu$ to turn on at "½ after D" so that it will be turned off by the "9" pulse.

Reference to Fig. 12b indicates that point 66b ($Eu$) begins to rise in potential at "½ after D." Even though there is an accompanying rise in the screen voltage of tube 119a, no pulse appears on resistance 72b for the following reason. The aforementioned rise of point 66b ($Eu$) is not instantaneous but occurs exponentially (see Fig. 12b). Therefore, there is a lapse of time before point 66b ($Eu$) reaches its maximum high potential, and the same applies also to the screen voltage rise of tube 119a. This time interval, exceeds the duration of a pulse, as illustrated in Fig. 12a, which is applied to the grid of tube 119a (Fig. 5c). Hence, the pulse, as in Fig. 12a, applied at "½ after D," ceases to exist by the time that the screen of tube 119a reaches its maximum voltage, as is seen by comparison of Figs. 12a and 12b. Under these circumstances, tube 119a experiences concurrently, an increase of negative grid bias (because the amplitude of the pulse applied is decreased from its positive peak value) and an increase of screen voltage, which two conditions oppose each other, so that there is no current flow through the pentode. Accordingly, no negative and positive pulses are produced (at "½' after D"), on resistances 123, and 72b, respectively (see Fig. 12c and d).

Assume that it is desired to subtract a 6. $Eu$ is turned on at "½ after D," as described above. A "6" digit representing pulse, produced on resistor 104e, (Fig. 5n) (section 5), is effective via one of the lines of group 105, contacts 117u6, now closed (in a manner described later in sections 14 and 15) and the line 118u (see also Figs. 5h, 5b and 5c) to reduce the negative grid bias of tube 115a (Fig. 5c) thereby turning off $Eu$ at "6," with an accompanying potential drop of point 66b ($Eu$) as illustrated in Fig. 12b. Accordingly, the screen voltage of tube 119a (Fig. 5c) falls, and advancing pulses are no longer produced on resistance 72b, as illustrated in Fig. 12d, and as now understood. Consideration of the foregoing indicates that when a digit of 6 is to be subtracted, $Eu$ (Fig. 5c) is "on" for three index point positions. During this interval, the number of advancing pulses produced on resistance 72b is not only equal to the number of index point positions, namely, three, during which $Eu$ is "on," but this number is equal to the nine's complemental value of the subtrahend, which in this case is 6.

Assuming that 5 stood in the units order of the accumulator, prior to the subtractive entry of 6, these three advancing pulses are effective to turn $Au1$—6 (Fig. 5c) on, $Au0$—5 off, $Au2$—7 (Fig. 5i) on, $Au1$—6 off, $Au3$—8 on, and finally $Au2$—7 off. The extra element $Xt$, remains "on" during this entry operation. The manner in which advancing and restoring pulses actuate the digit manifesting elements and the former actuate the extra element is now understood. The operation of these elements during this subtractive entry cycle is illustrated in Fig. 12f to k, inclusive. Attention is directed to the fact that at the beginning of the cycle, both Au0—5 and Xu are in "on" status, and at "11" in the cycle, both Au3—8 and Xu are in "on" status (Fig. 12f to k). It is to be noted that prior to and following the above described entry, Xu is and remains, in "on" status. In this manner, the nine's complement of 6, namely 3, is added to 5, and the result 8 stands in the accumulator. The fact that 8 stands in the units order is indicated by the status of two elements. Au3—8 and Xu, by both being "on," indicate combinationally the new digit in the order.

In order that a true difference amount may be formed, the true complement of 6, namely 4, should be added. As is understood when employing complemental addition as a method of subtracting, it is necessary to add an elusive one into the units order of an accumulator. In the electronic accumulator of this invention, provision is made for adding the elusive one and this operation takes place at "11" or the carry time in a cycle. The manner in which an elusive one entry is effected will now be described.

Referring to Fig. 5n, an "11" pulse, produced on resistor 104L (section 5), is effective via line 108 (see also Fig. 5h) to reduce the negative grid bias of tube 139a. Since the screen voltage of tube 139a, during subtraction, is high (Sect. 15) the reduction of its negative grid bias causes an increase of current flow therethrough and an increased voltage drop across load resistance 147a. Condenser 148 discharges and a negative pulse is produced on resistance 149. The grid of tube 139b is connected to resistance 149 and the negative pulse thereon is effective to decrease current flow through tube 139b and the voltage drop across load resistance 150. Condenser 151 is charged and a positive pulse is produced on resistance 152. This "11" pulse is effective via line 153 (Figs. 5h, 5b and 5c) to reduce the negative grid bias of tube 115b (Fig. 5c) thereby turning on Eu. With Eu "on," point 66b rises in potential at "11," as illustrated in Fig. 12b, as does also the screen of tube 119a (Fig. 5c). Eu remains in an "on" status, until "12," at which time it is turned off, in a manner described previously with respect to Eh (Fig. 5e) (section 9). With Eu functioning in this manner, a single advancing pulse only, is produced on resistance 72b to thereby effect addition of the elusive one, into the units order of the accumulator. The result of this operation is to turn on Au4—9 (Fig. 5i) and to turn off Au3—8 so that at the termination of the complete subtraction cycle both Au4—9 and Xu are in "on" status (see Fig. 12). Thus the true complement of 6, namely 4, is added to 5, to produce 9 which is the true difference between the minuend 5 and the subtrahend 6. The fact that 9 stands in the units order is indicated by the status of two elements. Au4—9 and Xu, by both being "on," indicate combinationally the new digit in the order. The fact that 9 stands in the accumulator would be indicated by the ignited state of the glow tubes 78 of Au4—9 and Xu (Fig. 5i), while the glow tubes associated with the remaining elements would be dark.

Fig. 13 illustrates special conditions occurring in similar portions of Eu and circuits controlled thereby during the problem of the subtraction of 9, from 9 standing in the accumulator. In this particular problem, at "½ after D," Eu (Fig. 5c) is shifted to an "on" status, as described above. Referring to Fig. 5n, a "9" digit representing pulse produced on resistor 104b (section 5) is effective via one of the lines of group 105, contacts 117u9, now closed (see sections 14 and 15), and line 118u (see also Figs. 5h, 5b and 5c) to reduce the negative grid bias of tube 115a (Eu) thereby turning off Eu at "9." The rise and fall in potential of point 66b (Eu), as a result of these operations is illustrated in Fig. 13b. Reference to Fig. 13d indicates that no advancing pulses are produced on resistance 72b (Fig. 5c) during the "9" through "0" interval, when the digit 9 is subtracted. This is in accordance with the general description of the operation of Eu, as given above. Accordingly, there is no actuation of associated digit manifesting elements or of the extra element.

In discussing the principles of operation of the electronic accumulator for subtraction, it was stated that the number of advancing pulses, provided by an entry control device, equals the nine's complement of the digit to be subtracted. In the instant problem, this digit is 9 and its nine's complement is 0. Therefore, no advancing pulses are required and during the "9" through "0" interval, Au4—9 and Xt (Fig. 5i) which together can represent 9, remain "on," as at the beginning of the cycle.

At "11," an entry of the elusive one is made, in the manner described above. Reference to Fig. 13b indicates that Eu is turned on at "11" and off at "12" and during this single index point position, one advancing pulse is provided and an increment of 1 is added to the units order. The result of this operation is to turn on Au0—5 and to turn off Xu (Fig. 13f and k), and to turn off Au4—9 (Fig. 13j). Thus, the true or tens complement of 9, namely 1, is added to 9, to form 0, which is the true difference between 9 and 9. The fact that 0 stands in the units order is indicated by the status of two elements. Au0—5 and Xu by being "on" and "off," respectively, indicate combinationally, the new digit in the order. The fact that 0 stands in the accumulator would be indicated by the glow tube 78 of Au0—5 which would now be ignited, while those associated with the remaining elements would be dark. It will be understood that the principles of subtracting, as explained above, also apply to the tens and hundreds orders of the accumulator. When a significant digit has not been subtractively entered, during the variable entry period of a cycle, into an accumulator order, the complement 9 will be entered by the end of this period. Considering the hundreds order, for example, Eh is turned on at D½ and the elements A and X of this order will perform nine steps of advance before Eh is turned off by the 0 pulse applied via line 114 to tube 116a of this order.

This section describes the operation of the entry control device and associated digit manifesting elements and the extra element of an accumulator order when two digits are successively entered therein, subtractively. First 6 is subtracted from 5, and next a 9 is subtracted from 9 with the result that 0 stands in the order. An explanation is given of the entry control device and it is seen that this is turned on, at a fixed time, early in a cycle and is turned off, at a differential time corresponding to the digit subtracted. This entry control device, when "on," allows advancing pulses, which in number equal the nine's complement of the subtrahend, to be effective for sequentially operating digit manifesting elements, and for also operating the extra element, whenever the sequential operation of the series of elements begins to repeat. The manner of introducing the elusive one is also described. It is shown that as a result of these operations, the one of the series of elements which remains "on," in combination with the "on" or "off" status of the extra element, is indicative of the difference between the digit originally standing in the order and the subtrahend.

11. Carry determining device—Subtracting

When the method of complemental addition is employed as the basis of subtracting, as in this invention, the process of determining when there are carry requirements may be best understood by remembering that nine's complements, of digits to be subtracted, are added. Therefore, when the sum of the nine's complement of a digit being subtracted and a digit already standing in the accumulator equals or exceeds ten, a given order passes from 9 to 0 and the requirement for adding a carry into the next higher order exists.

Applying the foregoing rule to each of the subtraction problems described in section 10, it is seen that when a 6 is subtracted from 5 (3 added to 5) no carry is required; and that when a 9 is subtracted from a 9 (0 added to 9) no carry is likewise required. In the last problem, however, a "carry through 9" between the units and tens orders is required, by virtue of the elusive one entry in the units order, as will be explained in Sec. 12.

Attention is directed to the fact that with regard to these two problems, and prior to the entry of the elusive one, the extra element $Xu$ is unchanged in status, i. e., it remains "on" (see Figs. 12$k$ and 13$k$). On the other hand, it will be understood, that when there is a passage of an order from 9 to 0, the extra element is changed in status during the subtractive entry, i. e., is shifted from an "on" to an "off" status.

Whenever a digit is subtracted in the accumulator and the extra element is switched from an "on" to an "off" status, the accumulator has passed from 9 to 0 and a carry increment therefore must be added into the next higher order. It is appreciated that the principles for determining carry which apply in adding (section 8) also apply in subtracting. Accordingly, the carry determining device (section 8) which is employed in adding may also be utilized in subtracting operations and therefore the mode of construction and operation of $Ru$ (Fig. 5$p$) need not be described in detail. It is sufficient to state that if a carry requirement is necessary, $Ru$ will be turned on.

Reference to Figs. 12L and 13L dealing with the subtraction of 6 and 9, respectively, indicate that $Ru$ remains in "off" status from "9" through "0," in accordance with the principles of carry determination, upon subtracting, and in accordance with the fundamentals of operation of a carry determining device (section 8), because in these two problems, there were no carry requirements. A subsequent example of subtraction shows this carry device in action when there is a requirement of carry (section 15).

12. Carry effecting device—Subtracting

The manner in which a carry determining device, controls an associated carry effecting device, to apply a carry increment to the next higher order, when the carry determining device is "on," as the result of the passage of an order from 9 to 0 during a subtractive entry of a digit, is exactly similar to such action as previously described during addition (section 9). Likewise, upon subtracting, the manner in which the carry effecting device of an order functions, when it stands at 9 and receives a carry, to apply a carry increment to the next higher order, is exactly similar to such action as previously explained (section 9).

Attention is directed to the fact that during subtraction, a carry operation occurs at "11," as does also the entry of the elusive one into the units order (Sec. 10). Referring to Figs. 5$h$, 5$n$ and 5$p$, line 153, to which is applied the elusive one pulse at "11," is also connected to the grid of pentode 130$b$ (Fig. 5$p$) of the units order, carry effecting device. A negative control grid bias reduction of this tube is effective to cause increased current flow therethrough, provided the potentials of the suppressor and screen grids of tube 130$b$ are high (units order stands at 9) as has been previously explained (section 9). Accordingly, during subtraction, whenever the units order stands at 9, upon entry of the elusive one, a carry increment is concurrently applied to the tens order, in a manner now understood. Such "carry through 9" condition occurs in connection with the subtraction of 9 from 9 (section 10, Fig. 13).

It will now be seen from the description in this section, that electronic carry effecting devices are provided, whereby upon subtracting, carry operations may be controlled, when orders of the electronic accumulator either pass from 9 through 0, or stand at 9 and are carried into 0 by carry from a lower order or by reception of an elusive one.

It is also seen that such carry circuits apply to an electronic accumulator adapted for both adding and subtracting, and that the underlying principles by which these operate apply to any number of orders of such an accumulator.

Having described its underlying principles, the operation of a key controlled embodiment of the electronic accumulator, will now be explained, in which multidenominational quantities may be entered into the accumulator.

13. General—Key controlled machine

The key controlled machine, in which there is incorporated an electronic accumulator comprising a plurality of orders, is constructed and operated briefly, as follows: The operator sets up multidenominational amounts, in succession, upon a keyboard. Having set up any one amount, a motor bar is depressed and an entry of such ordered item of the multidenominational amount is effected, concurrently, into the respective orders of the electronic accumulator. The circuits and associated devices are capable of performing both adding and subtracting operations. An indication, in true numeral outline, of the numbers comprising the total amount standing in the accumulator, is provided by cathode ray oscilloscopes, one of which is provided for and controlled by each of the respective order digit manifesting elements of the accumulator. After a series of amounts have been entered into the machine and the total thereof taken, the operator manipulates switches and control circuits which thereby reset all orders of the accumulator to zero. Subsequently, further amounts may be entered into the machine.

14. *Structure key controlled machine*

Referring to Figs. 17 and 18, the machine is shown as including a base comprising a cabinet 154, in which are located the electronic devices and associated circuits of the novel key controlled electronic accumulator, and also various control mechanisms for the indicating cathode ray oscilloscopes. The top 155, of cabinet 154 comprises a base for mounting two sections of the complete device.

Mounted on cabinet top 155, at the left side, as viewed in Fig. 17, is a keyboard section enclosed by a casing 156. Projecting through the top of the casing are key stems 157 to each of which is fastened a numbered key top 158. Three banks of ten keys each, one bank for each of three orders, are provided.

At the right side of the cabinet top 155 is located the indicating oscilloscope unit. This unit comprises three cathode rays tubes 159$u$, 159$t$, and 159$h$, mounted in a suitable sheet metal housing including two side plates 160 and 161, fastened to the cabinet top 155. The cathode ray tubes are supported by suitable sockets 162 (Fig. 18) fastened to a frame member 163, extending between the side plates 160 and 161. The ends of the cathode ray tubes extend through openings in the front end 164 of the sheet metal housing. A funnel-shaped hood 165, provided at the front of this unit increases the clarity of the images on the cathode ray tubes.

In Fig. 19 is illustrated the interior construction of the units order keyboard control comprising the key stems 157 guided by slots in a cover 166, and cross members 167 and 168, respectively. Springs 169, stretched between lugs 170 on the key stems and suitable spring anchors in the cross member 167, hold the keys in their undepressed positions in which they are located by ledges 171, formed on the key stems, abutting cover 166. The lower ends of the key stems carry insulation pieces 172. These pieces coact with the movable member of the contact assemblies, generally designated 117, in such a manner, that when a key stem is depressed, a normally open contact assembly is closed. Contact assemblies 117 are supported by a frame member 173, there being one contact assembly for each key stem.

A means for holding the keys depressed is provided as follows: An elongated key bar 174 is provided for each bank of keys. The bar 174 is pivoted at each end to the top of links 175, respectively, whose lower ends are loosely mounted and spaced on shaft 176 extending the width of the keyboard and supported by the keyboard frame. Springs 177, respectively fastened to each bar 174, urge each bar to the right, as viewed in Fig. 19, until bent over ears 178, forming a part of the bar, respectively abut the cam surfaces 179, of the key stems 157. If any key, in the units order, for example, is depressed, during the first part of its downward movement a camming surface 179 on a key stem 157 will move an ear 178 to the left, as viewed in Fig. 19, and cause its bar 174 to move likewise. Further downward movement of the key stem permits the ear 178 to return a short distance to the right and lodge on top of a ledge 180, thus holding the key depressed, and consequently its associated contacts closed. It will be understood that the foregoing applies as well as to the tens and hundreds order key banks and associated contacts.

A motor bar 181 is provided, which is mounted on the top of a stem 182. The stem 182 is guided by slots in the cover 166 and in the cross members 167 and 168, respectively. A spring 183 holds this stem in its undepressed position. A center blade 181 m. b. of a three part contact assembly 184 located to the left of the stem 182, is actuated by an insulation block 185 fastened to the stem 182 of motor bar 181. As shown in Fig. 19, the right-hand contacts of assembly 184 are closed when the motor bar is not depressed. Upon depression of the motor bar, however, the camming surface on the block 185 causes the center blade 181 m. b. to move to the left, thus opening the right-hand pair of contacts and closing the left-hand pair of contacts. Releasing the motor bar restores these pairs of contacts to their normal positions, as illustrated in Fig. 19. Having described the mechanical details of the key controlled machine (with the exception of those relating to the indicating oscilloscopes), the electrical circuits will now be discussed in detail. The complete wiring diagram of this machine is incorporated in Figs. 5$a$ to 5$n$, inclusive, and 5$p$ to 5$s$, inclusive, these figures being grouped together and arranged, as indicated in Fig. 5.

15. *Operation—key controlled machine*

The operation of this machine will be described in detail in connection with entries of three multidenominational quantities; two of which will be added, and the third of which will be subtracted. Closure of switch 79 (Figs. 17, 18 and 5$a$) connects lines 50 and 80 to a potential source of the polarity indicated, and closure of switch 186 (Figs. 17, 18 and 5$s$) connects lines 187 and 51 to a potential source of the polarity indicated. Lines 187 and 51 supply power for indicating oscilloscopes which are described later (section 16). Closure of switch 188 (Figs. 17, 18 and 5L) supplies power to a motor 189 and lamps 190 for purposes also explained in section 16. Before making entries into the accumulator, the operator conditions the electronic commutator in a manner to be described (section 18) and thereupon opens switch 101 (Figs. 17, 18 and 5$a$) which permits advancing pulses to be effective, to continually sequentially operate the commutator (section 5) to produce, cycle after cycle, the required digit representing the control pulses, timed within a cycle. Attention is particularly directed to the fact that no manual operations are required (other than those related to conditioning and starting) to secure for machine use, pulses having the proper timed relationship.

The accumulator is then reset to zero, in a manner to be described later (section 17), thereby placing A$u$0—5 (Fig. 5$c$), A$t$0—5 (Fig. 5$d$) and A$h$0—5 (Fig. 5$e$) in "on" status, all remaining digit manifesting and extra elements being turned off. It is assumed that the first amount which is to be entered into the accumulator is to be additively entered. Accordingly, switches 191$a$ (Fig. 5$b$) and 191$b$ (Fig. 5$h$), both controlled by toggle 191 (Figs. 17 and 18) are in the position, as shown.

It is assumed that the first multidenominational amount to be additively entered is 159. The operator, therefore, depresses the 1, 5 and 9 key tops 158 (Figs. 17 and 18) in the hundreds, tens and units orders, respectively, of the keyboard, causing closure of contacts 117$h$1 117$t$5 and 117$u$9 (Fig. 5$n$). The closure of these contacts permits digit manifesting pulses "1," "5" and "9" to initiate operations of the entry control devices in the respective orders of the accumulator, upon depression of motor bar 181 (Fig. 19) to move 181 M. B., as described presently. It is appreciated that the operator desires to enter the amount of 159 into the accumulator, only once, and mention has been made heretofore (sections 6 and 10) that a single entry cycle control device is provided for this purpose. The manner in which this device functions is as follows.

In general, when operation of the single entry control device is initiated by the operator's depression of the motor bar 181 (Figs. 17, 18 and 19), such depression may occur at any time within a machine cycle as defined by operation of the electronic commutator (Figs. 5a, 5g and 5m). In its operation, the single entry control device coordinates a manual operation, which may possibly occur at any time, with the basic timing of the electronic commutator and other parts of the accumulator, so that this manual operation does not have to be critically timed with respect to any cyclical operation. In addition, the single entry control device is so arranged that its control over digit manifesting pulses is exercised, for one machine cycle only. Thus, for each depression of the motor bar, all digits, of the amount set up on the keyboard are entered concurrently into the respective orders of the accumulator, and once only.

Referring to Fig. 5b, the single entry control device comprises two elements, of the type described previously (section 2, Figs. 1 and 2). These two elements are designated T1 and T2 and portions of their circuits which correspond in character and function to those of the circuits illustrated in Figs. 1 and 2 are given the same reference characters. The details of the operation of this device are as follows, assuming that both T1 and T2 are initially "off."

In Fig. 5b, a voltage divider comprising resistors 192 and 193 is provided between lines 50 and 51. The central blade 181 M. B. of contact assembly 184 (Fig. 19) controlled by the motor bar 181 is normally positioned, as shown in Fig. 5b and connects the junction point of these resistors to one side of condenser 194 whose other side is connected to line 51. With the central blade 181 M. B. of contact assembly 184, in the position shown (Fig. 5b), condenser 194 is charged to the potential across resistance 193. Upon depression of the motor bar 181 (Fig. 19) the central blade 181 M. B. (see also Fig. 5b) shifts to the reverse position from that shown and the charge on condenser 194 is completely dissipated in the form of a sharp pulse on resistor 195. Another pulse cannot be produced on 195 until condenser 194 is again charged and this does not occur until central blade 181 M. B. is returned to the position as shown (Fig. 5b) upon release of motor bar 181 (Fig. 19). Hence, for each depression of the motor bar, only one pulse is produced on resistance 195 (Fig. 5b). Maintained depression of the motor bar merely serves to maintain condenser 194 in discharged condition and therefore no additional pulse or pulses appear on 195.

The grid of tube 196 (T1) is connected to resistor 195 so that when the pulse appears on 195, T1 is turned on, as is now well understood, and its point 66b rises in potential. The shift of T1 to an "on" status and the accompanying rise in potential of its point 66b is illustrated in Fig. 14a (1) as occurring by happenstance near "6" in a machine cycle.

The screen of tube 69b (T2) is connected via screen current limiting resistor 74 to the midpoint of resistance 63b (T1), and, with T1 "on," the screen potential of tube 69b (T2) is raised, so that a reduction in its negative grid bias will be effective to turn on T2.

The manner in which a pulse is produced at "D" which is the same as "12," on resistor 104a (Fig. 5n) was explained in section 5, and such pulse is effective via line 106 (see also Figs. 5h and 5b) to reduce concurrently the negative grid bias of tubes 69a and 69b (T2). Since T2 is "off," and since as stated above, the screen potential of its tube 69b is now high, its negative grid bias reduction at "D" causes T2 to be turned on. With T2 "on," its point 66b rises in voltage at "D," as is shown in Fig. 14b (1).

Summing up, it is seen from the foregoing that whenever the operator depresses the motor bar, shifting center blade 181 M. B. (Fig. 5b) to the reverse position from that shown, T1 is turned on and this turning on may occur at any time in a machine cycle depending on when the operator chances, at his option, to depress the motor bar. It is also seen that when T1 is "on," it permits T2 to be shifted to an "on" status at a definite time only in a machine cycle, namely, "12" (or "D") which, as is now understood, marks the beginning of a machine cycle. As is explained later in this section, T2 remains "on," for one machine cycle only.

The screens of pentodes 69b of Eu (Fig. 5c) Et (Fig. 5d) and Eh (Fig. 5e) are each connected to line 196, which, through switch 191a (Fig. 5b), now, in the position, as shown, for adding, connects to line 197 which extends via screen current limiting resistor 74 to the midpoint of resistance 63b (T2). With T2 "on," which occurs at the beginning of a cycle, which is, in this case, the entry cycle, the screen potential of these pentodes 69b is high and negative grid bias reductions thereof are effective to turn on Eu (Fig. 5c) Et (Fig. 5d) and Eh (Fig. 5e). Such reductions occur at differential times during the entry cycle in accordance with the digit representing pulses applied to the respective grids via lines 118u, 118t and 118h, as previously described for 118t (section 6). Since an amount of 159 is to be entered, Eh, Et and Eu are turned on at "1," "5" and "9," respectively. The accompanying potential rise of points 66b of Eh, Et and Eu and the resultant production of one, five and nine advancing pulses on related resistances 72b are illustrated, respectively, in Figs. 16c (1), 16b (1) and 16a (1).

The nine advancing pulses which appear on resistance 72b, Fig. 5c (units order) cause sequential operation of Au1—6, Au2—7, etc., as is now understood, with the result that, at the termination of the cycle, both Au4—9 and Xu (Fig. 5i) are in "on" status, Fig. 16a (1).

The five advancing pulses which appear on resistance 72b, Fig. 5d, (tens order) cause sequential operation of At1—6, At2—7, etc., so that at the termination of the cycle, both At0—5 (Fig. 5d) and Xt (Fig. 5j) are "on," Fig. 16b (1).

The single advancing pulse produced on resistance 72b, Fig. 5e (hundreds order) causes Ah1—6 (Fig. 5e) only, to turn on, with Xh (Fig. 5k) remaining "off" Fig. 16c (1).

Since, obviously, none of the accumulator orders passes from 9 to 0 during the entry of 159, the carry determining devices Ru (Fig. 5p), Rt (Fig. 5q) and Rh (Fig. 5r) remain "off," as illustrated in Figs. 16a (1), 16b (1) and 16c (1), respectively.

The b-phased pulses which are continually produced on resistance 98b (Fig. 5a) and which are applied via line 120 (see also Figs. 5b, 5c, 5d and 5e) to the grids of pentodes 119a (Figs. 5c, 5d and 5e), relating, respectively, to each of the three orders of the accumulator, are illustrated in Fig. 15a.

The a-phased pulses which are continually produced on resistances 72a1 (Fig. 5a) and 72a3 (Fig. 5h) and which are applied via lines 126 and 128, respectively (see also Figs. 5b, 5c, 5d and 5e), as restoring pulses for the digit manifesting elements, are illustrated in Fig. 15b.

Eu, Et and Eh are turned off at "0," via lines 114 and tubes 116a, respectively, as described in Sec. 6.

The turning of on of T1 and T2 is described previously in this section. With T2 "on" (Fig. 5b), T1 may now be turned off, since it has performed one of its functions, namely, causing T2 to be turned on. T2, when in "on" status, is utilized to control the shift of T1 to an "off" condition, as will now be described. The screen of tube 69a (T1) is connected to line 197, so that its potential is high when T2 is "on." During the cycle in which 159 is entered, therefore, the screen voltage of tube 69a (T1) remains high so that a negative bias reduction of its grid will turn off T1. The production of a pulse at "0" on resistance 104k (Fig. 5n) has been described (section 5), and said pulse is effective via line 107 (see also Figs. 5h and 5b) to reduce the negative grid bias of tube 69a (T1) so that T1 is turned off. The accompanying fall in potential at "0" of point 66b (T1) is illustrated in Fig. 14a (1).

As explained above, the function of T2 (Fig. 5b) is to permit only a single entry of the amount 159. It follows, therefore, that T2 must not remain "on," longer than one machine cycle. The shift of T2 back to an "off" condition is the second function of T1. This may be performed by T1, only when it is "off" to which status it is returned at "0," as just described. With T1 now "off," its point 66a is at a high potential with respect to line 51 and the screen of tube 69a (T2), which is connected via screen current limiting resistor 74b to the midpoint of resistance 63a (T1), is, therefore, also high. A reduction in the negative grid bias of tube 69a is therefore effective to turn off T2. The grid of tube 69a (T2) is connected to line 106, to which is applied a pulse at "12," as previously described, so that this pulse, which occurs at the termination of that machine cycle in which 159 is entered, turns off T2. The accompanying drop in potential at "12" of point 66b (T2) is illustrated in Fig. 14b (1). Since the screen potential of tubes 69b of Eu (Fig. 5c), Et (Fig. 5d) and Eh (Fig. 5e) also drop, further applications to their respective grids (in following machine cycles) of digit manifesting pulses "9," "5" and "1," do not cause Eu, Et and Eh to be turned on. Hence, no further entries of 159 occur so that Ah1—6 (Fig. 5e), At0—5 (Fig. 5d) and Xt (Fig. 5j) and Au4—9 and Xu (Fig. 5i) remain "on," while Xh (Fig. 5k) remains "off," until another entry is made.

The foregoing has described, in the additive entry of an amount 159 into the electronic accumulator, the detailed operation of circuits comprising a single entry control device, and the manner in which said device permits only one entry of the amount 159.

Assuming now that a different amount, for example, 647, is to be additively entered into the accumulator. The operator depresses the 6, 4 and 7 key tops 158 (Figs. 17 and 18) in the hundreds, tens, and units orders, respectively, of the keyboard producing closure of contacts 117h6, 117t4 and 117u7 (Fig. 5n). The closure of these contacts will permit the digit manifesting pulses "6," "4" and "7" to initiate operations of the entry control devices in the various orders of the accumulator as follows: Upon the operator's depression of the motor bar 181 (Figs. 17 and 18), center blade 181 M.B. (Figs. 19 and 5b) shifts to the reverse position from that shown and the charge on condenser 194 is completely dissipated across resistor 195, as described above. The resultant pulse turns on T1 by happenstance, near "3" in a machine cycle and the accompanying rise of point 66b (T1) is illustrated in Fig. 14a (2). By the control afforded by the "on" status of T1 (Fig. 5b), T2 is turned on at "12" (or "D") as explained above. The rise of point 66b (T2), at this time, is illustrated in Fig. 14b (2). With T2 "on," digit representing pulses may now initiate the operation of the various entry control devices.

Since T2 is "on," the screens of 69b of Eu, Fig. 5c, Et, Fig. 5d, and Eh, Fig. 5e, are at high potential and negative grid bias reductions thereof turn on Eu, Et and Eh, such reductions occurring at differential times in the cycle in accordance with the digit representing pulses applied to the respective grids. Since an amount of 647 is to be additively entered, Eh, Et, and Eu are turned on at "6," "4" and "7," respectively. The accompanying potential rise of points 66b of Eh, Et and Eu and the resultant production (before "11") of six, four and seven advancing pulses on related resistances 72b are illustrated, respectively, in Figs. 16c (2), 16b (2) and 16a (2).

The seven advancing pulses which appear on resistance 72b, Fig. 5c (units order), cooperating with restoring pulses, turn on Au0—5 and turn off Xu, turn off Au4—9, and produce sequential operation of Au1—6, etc., and of Xu, with the result that, at the termination of the entry portion of the cycle, Au1—6 (Fig. 5c) and Xu (Fig. 5i) are "on," Fig. 16a (2).

The four advancing pulses which appear on resistance 72b, Fig. 5d (tens order), cooperating with restoring pulses, turn on At1—6, turn off At0—5, and produce sequential operation of At2—7, etc., and of Xt, so that at the termination of the entry portion of the cycle, At4—9 (Fig. 5j) and Xt are "on," Fig. 16b (2).

The six advancing pulses produced on resistance 72b, Fig. 5e (hundreds order), cooperating with restoring pulses, turn on Ah2—7, turn off Ah1—6, and produce sequential operation of Ah3—8, etc., and of Xh, so that at the termination of the entry portion of the cycle, Ah2—7 (Fig. 5k) and Xh are "on," Fig. 16c (2). Eu, Et and Eh are turned off at "0," as before.

The addition of 7 to 9 in the units order causes said order to pass from 9 through 0, and accordingly, Ru (Fig. 5p) is turned on (section 8) and such action is shown occurring between "7" and "6" in Fig. 16a (2). At carry time, since the units order has passed from 9 through 0, Ru (Fig. 5p) controls its associated carry effecting device (section 9) and Et (Fig. 5d) is turned on until "12." As a result of this operation, a carry increment of one is added into the tens order, causing At0—5 (Fig. 5d) to be turned on and At4—9 and Xt (Fig. 5j) to be turned off; see also Fig. 16b (2).

Since at "11" the tens order stood at 9 due to the addition of 4, to 5 standing therein, and since it receives a carry from the units order, the tens order carry effecting device operates (Sec. 9) to shift Eh (Fig. 5e) to an "on" status. Eh remains "on" until "12" and there is a resultant addition of a carry increment into the hundreds order to thereby turn on Ah3—8 (Fig. 5k) and to turn off Ah2—7; see also Fig. 16c (2). It is to be noted that Xh, remains "on," during this carry operation.

During the cycle in which 647 is entered, T1 (Fig. 5b) is turned off at "0" under the control of T2, followed by a shift of T2 to an "off" status at "12" under the control of T1, as described in this section. The accompanying voltage drop of points 66b in T1 at "0" and T2 at "12" is shown, respectively, in Figs. 14a (2) and 14b (2). Since the screen potential of tubes 69b of the entry control devices Eu, Et and Eh also drops, further applications to their respective grids of digit manifesting pulses "7," "4" and "6," in subsequent machine cycles, do not cause the entry control device to be turned on. Hence, further entries of 647 cannot occur.

The foregoing has described the entry of an amount 647 additively into the electronic accumulator, which already contains the quantity 159, to form the sum 806. Accordingly, Ah3—8 and Xh (Fig. 5k), At0—5 (Fig. 5d) and Au1—6 (Fig. 5c) and Xu (Fig. 5i), remain "on," and Xt (Fig. 5j) remains "off" until a following entry is made. It was further pointed out, that upon addition of the second amount to the first, there were requirements for carry, and such carry operations have also been explained.

In order to subtract, the operator throws toggle 191 (Figs. 17 and 18), thus shifting switches 191a (Fig. 5b) and 191b (Fig. 5h) to a reverse position from that shown. With switch 191a shifted, line 196 is connected to line 61 and with switch 191b shifted, the screens of tubes 139a and 140a are connected to line 197, which is connected through screen current limiting resistor 74 (Fig. 5b) to the midpoint of resistance 63b (T2). With this circuit arrangement, during subtraction, the screen voltage of tubes 139a and 140a is determined by the status of T2 and it is recalled that T2 is "on" during a single complete machine cycle, when an entry is made. Accordingly, the screen potential of tubes 139a and 140a is high during a single full subtraction cycle and reductions in negative grid bias of these tubes are effective to increase current flow through them.

Assuming now that a third amount of 203 is to be subtractively entered into the accumulator, the operator depresses the 2, 0 and 3 key tops 158 (Figs. 17 and 18) in the hundreds, tens and units orders, respectively, of the keyboard producing closure of contacts 117h2, 117t0, and 117u3 (Fig. 5n). The closure of contacts 117h2 and contacts 117u3 permits, (after depression of the motor bar) the digit representing pulses "2" and "3" to terminate variable entry operations of the entry control devices in the respective orders of the accumulators. The closure of contacts 117t0 connects line 118t to line 51.

Upon the operator's depression of the motor bar 181 (Figs. 17, 18 and 19), center blade 181 M. B. (Figs. 19 and 5b) shifts to a reverse position from that shown, and the charge on condenser 194 is completely dissipated across resistor 195 as now understood. The resultant pulse turns on T1 and the accompanying rise in potential of point 66b (T1) is shown in Fig. 14a (3), as occurring by happenstance, between "0" and "11." By the control afforded by the "on" status of T1 (Fig. 5b), T2 is turned on at "12," as previously described, and the rise of point 66b (T2) at "12" is shown in Fig. 14b (3). With T2 "on," the screen potential of tube 140a (Fig. 5h) is high (via line 197) so that a "½ after D" pulse, applied to its grid, via line 109, results in the production of a positive pulse on resistance 146 (section 10). This pulse is effective via line 147 (see also Figs. 5h, 5b, 5c, 5d and 5e) to concurrently turn on Eu, Et and Eh at "½ after D." The production of advancing pulses is initiated at the chosen fixed time and stopped at differential times, as described previously in Sect. 10. The accompanying potential rise of points 66b of Eu, Et and Eh at "½ after D" and the resultant production of six, nine and seven advancing pulses (before "11") on related resistances 72b are shown, respectively, in Figs. 16a (3), 16b (3) and 16c (3).

In the units order, 3 is to be subtracted, and at "3," accordingly, Eu (Fig. 5c) is shifted to an "off" status (section 10). During the six index point positions that Eu is "on," six advancing pulses are effective to sequentially operate related digit manifesting elements. At the termination of the entry portion of the cycle, Au2—7 (Fig. 5i) is in "on" status while Xu is "off" (Fig. 16a (3)).

In the tens order 0 is to be subtracted and at "0," therefore, Et (Fig. 5d) is turned off, in the normal manner (section 6). No "0" digit representing pulse is applied to line 118t (Figs. 5n, 5h, 5b, 5c and 5d) since contacts 117t0 (Fig. 5n) are closed to connect said line to line 51. During the nine index point positions that Et (Fig. 5d) is "on," nine advancing pulses are effective to sequentially operate related digit manifesting elements. At the termination of the entry portion of the cycle, both At4—9 and Xt (Fig. 5j) are in "on" status but no other elements are "on"; see Fig. 16b (3).

In the hundreds order 2 is to be subtracted, and at "2," accordingly, Eh (Fig. 5e) is shifted to an "off" status (section 10). During the seven index point positions that Eh is "on," seven advancing pulses are effective to sequentially operate related digit manifesting elements. At the termination of the entry portion of the cycle, both Ah0—5 (Fig. 5e) and Xh (Fig. 5k) are in "on" status; see also Fig. 16c (3).

The subtraction of 3 from 6 in the units order, causes said order to pass from 9 to 0 and accordingly, Ru (Fig. 5p) is turned on (Sect. 11). At "11," Ru (Fig. 5p) controls its associated carry effecting device (section 12) and Et (Fig. 5d) is turned on until "12." As a result of this operation, a carry increment of one is added in the tens order, causing At0—5 (Fig. 5d) to be turned on and Xt (Fig. 5j) to be turned off and At4—9 is sequentially turned off; see also Fig. 16b (3).

The subtraction of 0 from 0 in the tens order results in 9 standing in the tens order, prior to "11," the carry time. Since at "11" time, the tens order stands at 9 and receives a carry via line 138 (Fig. 5q) from the units order, the tens order carry effecting device (section 12) operates to shift Eh (Fig. 5e) to an "on" status. Eh remains "on" until "12" and there is a resultant addition of a carry increment into the hundreds order to thereby turn on Ah1—6 (Fig. 5e) and to turn off Ah0—5 while Xh (Fig. 5k) remains unchanged, in "on" status; see also Fig. 16c (3).

With T2 (Fig. 5b) "on," the screen potential of tube 139a (Fig. 5h) is high and an "11" pulse applied to its grid via line 108 results in the production of a positive pulse on resistance 152 (section 10). This pulse is effective via line 153 (see also Figs. 5h, 5b and 5c) to turn on Eu at "11." E$u$ remains "on" until "12" and as a result of this operation, an elusive one, is added into the units order, causing A$u$3—8 (Fig. 5$i$) to be turned on and A$u$2—7 to be turned off while X$u$ remains unchanged in "off" status; see also Fig. 16$a$ (3).

During the cycle in which 203 is subtractively entered, T1 (Fig. 5$b$) is turned off at "0" under the control of T2, followed by a shift of T2 to an "off" status at "12" under the control of T1, in a manner now understood. The accompanying voltage drop of points 66$b$ of T1 at "0" and T2 at "12" is shown, respectively, in parts $a$(3) and $b$(3) of Fig. 14. Since the screen potential of tubes 140$a$ and 139$a$ (Fig. 5$h$) also drops when T2 is "off," further applications of "½ after D" and "11" controlling pulses (during subsequent machine cycles) to the grids thereof are ineffective to cause either turning on of the entry control devices or an application of the elusive one to the units order. Hence, further subtractive entries of 203 cannot occur.

In connection with the above explanation of subtracting operations, it is shown that tubes 140$a$ and 140$b$ permit a "½ after D" pulse to effect turning on of all entry control devices and that tubes 139$a$ and 139$b$ permit an "11" pulse to effect entry of the elusive one, and also carry operations if the units order stands at 9. It has also been shown that tubes 140$a$ and 139$a$ are conjointly controlled by T2 of the single entry control device. It is therefore seen, that during subtraction, the single entry control device not only performs its regular function of permitting a single entry only, to be made into the accumulator, but it also determines that such entry is to be made subtractively and, accordingly, performs the additional function of a subtraction control device.

The foregoing has described the entry of an amount 203 subtractively into the electronic accumulator, which already contains the quantity 806, to form the difference amount 603. Accordingly, A$h$1—6 (Fig. 5$e$) and X$h$ (Fig. 5$k$) At0—5 (Fig. 5$d$) and A$u$3—8 (Fig. 5$i$) remain "on," and X$t$ (Fig. 5$j$) and X$u$ (Fig. 5$i$) remain "off" until a following entry is made. It was pointed out that upon subtraction of this third amount from the sum of the first two quantities entered, there were requirements for carry, and such carry operations have also been explained as was also the entry of the elusive one in the units order.

It will be appreciated that the neon lamps 78 (Figs. 17, 5$c$, 5$d$, 5$e$, 5$i$, 5$j$ and 5$k$) associated with and controlled by each of the digit manifesting and extra elements in the three orders of the accumulator may be utilized to indicate the amount standing in the accumulator at the termination of any of the foregoing entry cycles described above. However, the digit manifesting and extra elements of the electronic accumulator are adapted to control indicating cathode ray oscilloscopes whereby the digit standing in any order may be displayed in true numeral outline. The manner in which the various orders of the accumulator control the oscilloscopes and their mode of operation will now be described.

16. Indicating

Before describing in detail the method of indicating digits standing in the electronic accumulator, a more general explanation will be given. Two elements are utilized, one of which is the indicating element for displaying numerals, in true character outline, upon the fluorescent screens of cathode ray tubes and the other of which comprises a control element, including a pattern component emitter, which generates and transmits potential changes to the cathode ray tubes so that the latter tend to display a composite outline, composed of all the different digits. The control element also includes selectors which operate synchronously with, and in timed relation to, the pattern component emitter. The potentials applied to certain of the deflecting plates of the cathode ray tubes for controlling the formation of character outlines are derived from amplifying tubes whose input is controlled by the pattern component emitter. Similar deflection plates of each cathode ray tube have the same potentials applied thereto.

With regard to a given order, when a particular digit is to be indicated, the negative grid bias of a related cathode ray tube is decreased, under control of the combinational effect of the digit manifesting element which is "on" and of the extra element, and by the selectors corresponding thereto, either for a continuous period of time, or for successive periods of time with intervals therebetween, so that the cathode ray tube forms and displays the digit in true numeral outline; and the grid bias is left unmodified during other periods of time when other digits of the notation, would otherwise be displayed. A particular selector is adapted to cooperate with all similarly denoted digit manifesting elements located in each one of the plurality of accumulator orders.

The cathode ray tube indicator herein employed, is similar in principle of operation and in many details of construction to the one fully described and claimed in applicant's copending application Serial No. 313,061, filed January 9, 1940. Before proceeding to the manner in which digits are displayed, a brief explanation will be given of the general characteristics of the cathode ray tubes whose construction is illustrated in Figs. 17 and 18 and which are diagrammatically indicated in Fig. 5$s$, by 159$h$, 159$t$, and 159$u$. Each cathode ray tube comprises an evacuated envelope within which, extending from left to right, are disposed, an indirectly heated cathode 198, which is the source of electrons, a control grid 199, a No. 1 anode 200, a No. 2 anode 201, and two pairs of deflection plates. The upper and lower vertical deflection plates are respectively designated YU and YL, and the right and left hand horizontal deflection plates are respectively designated XR and XL. When the potential of YU is positive with respect to YL, the electron beam from source 198 is deflected upwardly, but when YU is negative, with respect to YL, the beam is deflected downwardly. When XR is positive with respect to XL, the electron beam from source 198 is deflected to the right but when XR is negative, with respect to XL, the beam is deflected to the left. Each cathode ray tube includes the usual fluorescent screen 202 (Figs. 17 and 18) upon which the electron beam is focused.

When the cathode ray tube is operating with each plate of each pair at the same potential, the electron beam is centrally or axially located in the tube and impinges on the center of fluorescent screen 202. The relative potentials of the vertical deflection plates determines whether the beam moves vertically up or down. The relative potentials of the horizontal deflection plates determines whether the beam moves to the right or left. In the cathode ray tubes illustrated, the potentials of the upper vertical plate YU and of the right hand horizontal plate XR, respectively, are controlled by the pattern emitter to produce relative potential changes, so that the electron beam is so sequentially positioned as to trace a desired path representative of a chosen pattern and thus of a certain digit, when the grid bias permits the beam to pass. By causing the electron beam to repeatedly traverse the same path, the required digit outline is visibly produced on the screen. Having pointed out the general operating characteristics of a cathode ray tube, as here employed, the manner of producing the potentials to be applied to the YU and XR deflection plates, to position the electron beam, will now be described.

Mounted within cabinet 154 (Fig. 17) is a motor 189 (Fig. 5L) which, through any suitable drive, such as a belt 204 (Fig. 20) is adapted to drive a shaft 205 suitably mounted for rotation. Shaft 205 has a number of selectors each generally designated as 206, mounted at one end thereof. Ten of these selectors 206 are provided and each has insulating and conducting portions thereon, some of the selectors having only one insulating and one conducting portion while others have a plurality of such portions, as illustrated schematically in Fig. 24. A pair of brushes 207a, 207b (Fig. 20) cooperate with the periphery of each selector. The conducting and insulating portions of the various selectors are so arranged as to effect circuit operations at definite angular positions of rotation of shaft 205, as is readily understood by reference to Fig. 24. The purpose of these selectors and their timing will be explained presently.

Also mounted on shaft 205 (Fig. 20), for rotation therewith, is a disk 208. Disk 208 is transparent for the most part, but is provided with two concentric tracks 208X and 208Y (Fig. 22) comprising opaque sections of varying width. To direct light on the tracks, two sources of light are provided, each comprising a lamp 190 (Fig. 21), which are respectively suitably enclosed by housings 210 (Fig. 20). A separate reflector 211 (Fig. 21) directs light from each lamp 190, through a lens system 212, which includes a narrow rectangular aperture 213, so that the light is concentrated in a thin rectangular pencil upon a particular opaque track. One lamp is on one side of disk 208 and directs light to and through track 208X, and the other is on the same side of disk 208 and directs light to and through track 208Y. On the opposite side of the disk 208 and aligned with the tracks are located two photocells which are respectively designated 214X and 214Y (Fig. 22), one of which is positioned to receive varying portions of the rectangular pencil of light from one lamp, as determined by one track, and the other of which is positioned to receive varying portions of the rectangular pencil of light from the other lamp, as determined by the other track (Fig. 20). It is obvious that the amount of light falling upon photocells 214X and 214Y, respectively, is varied in accordance with the degree of radial width of the respective opaque tracks and such light variations are produced under control of different circumferential portions of the respective tracks, as disk 208 is rotated. By suitably connecting each of the photocells 214X and 214Y (Fig. 5L) by means of the lines 214b and 214a and the common line 214c, to a source of potential (Fig. 5s) and to a respective load resistor, variable current flow is produced through the respective resistor proportional to changes in the amount of light falling upon the associated cell.

Track 208X produces variation in the amount of light falling on photocell 214X, and the resulting voltage changes across its associated load resistor 224X (Fig. 5s) are amplified and applied to the horizontal deflection plates XR (Fig. 5s) of the cathode ray tubes. Track 208Y produces variations in the amount of light falling on photocell 214Y, and the resulting voltage changes across its associated load resistor 224Y are amplified and applied to the vertical deflection plates YU (Fig. 5s) of the cathode ray tubes. The configurations of the tracks 208X and 208Y are such that in one revolution of the disk 208, such light and voltage variations are produced to so control the electron beams of the cathode ray tubes, that if they were continuously permitted, by the respective order digit elements, and the respective extra elements, to impinge upon the respective fluorescent screens 202 (Figs. 17 and 18) they would produce a visible but composite pattern, similar to that shown in Fig. 23. This composite pattern comprises a composite representation of all digits which are to be displayed, namely, digits 0 to 9, inclusive. The rising sequence of numerals, as applied to Fig. 23, indicate the order in which an electron beam sweeps out the composite representation. The numerals on the 208X and 208Y tracks (Fig. 22) correspond to those shown in Fig. 23 and indicate the track configuration required to deflect the electron beam to the positions required by the composite pattern. Figs. 23a, 23b and 23c illustrate sequential steps in the formation of the composite pattern.

The method of constructing tracks such as 208X and 208Y (Fig. 22) so that a given visible pattern is produced, is described in detail in said application Serial No. 313,061. It may be stated briefly, however, that only a certain portion or portions of the complete tracks 208X and 208Y are employed to form any one chosen character. The composite pattern is such that some portions thereof form parts, of a plurality of different characters, while other portions are used to complete formation of these characters or to form other characters. It is obvious, that as disk 208 rotates, portions of a given character may or may not be formed in immediate succession.

If, instead of continuously permitting impingement of the electron beam, which would result in the composite pattern of Fig. 23, the beam of any certain cathode ray tube is prevented from impinging on its related fluorescent screen, except for a selected portion or portions of the interval required to produce the composite pattern, then during that portion or portions of the interval, in which the beam is allowed to reach the fluorescent screen, there is produced the outline of one, only, of said ten digits. The electron beam of a cathode ray tube is prevented from reaching its related fluorescent screen when its grid bias is maintained at or below cut-off.

The selectors 206 (0), 206 (1), etc. (Figs. 24 and 5L) are provided for the purpose of maintaining the screen grids of tubes 237 (0), 237 (1), etc. (Fig. 5f), at the lower of two potentials, during the time all portions of the tracks of disk 208 are presented to the light during one revolution thereof, except the time, during which the one portion or those portions, are presented, whose presentation produces deflection plate potentials of the cathode ray tubes, of such character, as to cause the beam to trace out the outline of the numeral pertaining to one, only, of each of said ten selectors. As previously mentioned, the selectors 206 (0), 206

(1), etc., rotate synchronously with disk 208 and by comparison of the drawing numerals appearing in Figs. 24, 23 and 22, it is seen that the insulating portion or portions of a particular selector occupy circumferentially distributed positions, corresponding to the circumferentially distributed positions occupied by the portion or portions of tracks 208X and 208Y, required to control the production of potentials, to so deflect the electron beam, that the digit, related to the particular selector is produced. It is to be noted that the digit manifesting element, in a particular order, which is "on," in combination with the "on" or "off" status of the extra element, determines the particular selector which will be effective to control the grid of a cathode ray tube related to a particular accumulator order. Having generally described the pattern component emitter and related selectors; the cathode ray tube indicator and the manner of applying changing potentials to the YU and XR deflection plates of the cathode ray tubes will now be described.

Referring to Figs. 17, 18 and 5s, with switch 186 closed, potential is supplied to lines 187 and 51, and to a first voltage divider comprising resistors 215, 216, 217, and 218 (Fig. 5s) and to a second voltage divider comprising resistors 219, 220, and 221. The No. 2 anode 201, and the deflection plates YL and XL of tubes 159h, 159t, and 159u are all connected to line 187. The potential applied to the No. 1 or focusing anodes 200 is determined by the voltage across resistor 220. The heater-cathodes 198 are connected to line 222, whose potential, with respect to line 51, is that across resistance 221. Each of the control grids 199 of the respective tubes, whose negative bias is to be reduced under control of the digit manifesting tube which is "on," is connected, as described presently, to individual resistances 223 (Fig. 5L), one side of which connects to line 51. With this circuit arrangement, therefore, the negative bias normally applied to each of the grids 199 is the difference in potential between lines 222 and 51, and is of sufficient magnitude to prevent the electron beams from impinging upon their related respective fluorescent screens 202 (Figs. 17 and 18).

Closure of switch 188 (Figs. 17, 18 and 5L) supplies energy to the motor 189 and to the filaments of lamps 190. With motor 189 in operation, shaft 205, the commutators 206 (0), 206 (1), etc., and the disk 208 are continuously rotated. Resulting variations in the amount of light which are produced by the varying cross section, opaque portions of tracks 208X and 208Y are impressed on photocells 214X and 214Y, respectively, to effect resistance changes thereof. The anodes of each of these photocells are connected via line 214c to line 187, and the cathode of photocell 214Y is connected via line 214a to one end of resistor 224Y whose other end is connected to line 222, while the cathode of photocell 214X is connected via line 214b to one end of resistor 224X whose other end is also connected to line 222. Changes in the resistance of photocells 214X and 214Y, due to variations in light falling thereon, cause changes in the amount of current flow through their associated respective resistors 224X and 224Y. Accordingly, the voltage drops across resistors 224X and 224Y vary in accordance with the variations in the configurations of tracks 208X and 208Y. For example, as the light falling on 214X increases, its resistance decreases, and the total resistance of 214X plus 224X is likewise decreased, and increased current flow occurs therethrough. Accordingly, the voltage drop across 224X is increased. When, however, the light reaching 214X decreases, its resistance increases and the total resistance of 214X plus 224X is likewise increased, and decreased current flow occurs therethrough. Hence, the voltage drop across 224X is decreased. The same also applies to 214 Y and 224Y for variations in light reaching 214Y, as determined by track 208Y.

Whenever the potential drop across 224X increases, condenser 225X is charged and there is current flow through resistor 226X connected to line 227. Whenever the potential across resistance 224X decreases, condenser 225X discharges and there is reverse current flow through resistor 226X. The grid of tube 228X is connected to resistor 226X and it will be appreciated that the normal bias applied to the grid of tube 228X is the difference in potential between lines 222 and 227 or the voltage drop across resistance 217. By means of this circuit arrangement, current flow in resistor 226X varies in accordance with the configuration of track 208X and since the grid of tube 228X is connected to resistor 226X, variations in its bias are also in accordance with the configuration of track 208X.

The screen of tube 228X is connected to screen current limiting resistor 229X and via line 229a to the junction of resistances 215 and 216. Condenser 230X is provided for filtering purposes and serves to maintain the screen of tube 228X at substantially constant potential. Changes in the grid bias of tube 228X result in variations of current flow therethrough and through its load resistance 231X, which are amplified variations of the flow through 226X. One side of condenser 232X is connected to the anode side of resistance 231X, and the other side of this condenser is connected through resistance 233X to line 187. As will be now apparent, potential changes produced on resistance 233X are similar to those appearing on resistance 231X. The foregoing has described the manner in which light variations, controlled by track 208X, are converted into amplified electrical potential changes which are proportional to said light variations.

The production of amplified electrical potential changes on resistance 233Y, corresponding to light variations caused by track 208Y, is accomplished by a similar circuit arrangement in which similarly numbered components bear the suffix "Y."

Line 234X is connected at one end to the junction of resistance 233X and condenser 232X, and, since the other end of line 234X is connected to the XR deflection plates in cathode ray tubes 159h, 159t, and 159u, the potential variations at this junction are applied to the XR horizontal deflection plates.

Line 234X is similarly connected to the junction of resistance 233Y and condenser 232Y, and to the YU deflection plates in cathode ray tubes 159h, 159t, and 159u, so that the potential changes at this junction are applied to the YU vertical deflection plates.

Having described the manner of applying changing potentials to the deflection plates of the cathode ray tubes, a detailed explanation is now given of the method by which a digit manifesting element, a related extra element, and a selector, having a numerical designation which corresponds to the digit combinationally indicated by the aforementioned elements, conjointly effect a reduction of the negative bias of a control grid of a cathode ray tube, to thereby remove the normal cut-off bias and permit the tube to display, in true numeral outline, the numeral corresponding to the digit manifesting element.

As previously described in section 15, the result of entering three multidenominational quantities into the electronic accumulator is to produce a total amount of 603 standing therein. More specifically 3 stands in the units order of the accumulator and $Au3$—8 (Fig. 5$i$) is the sole digit manifesting element which is "on," in the units order, while the extra element $Xu$ is "off," as is now understood. With $Au3$—8 "on," point 66$b$ thereof is at the higher of two potentials with respect to line 51, and accordingly, a point along resistance 64$b$ ($Au3$—8) is likewise at a high potential. Since the remaining elements $Au0$—5, $Au1$—6, $Xu$, etc., are "off," corresponding points on their resistances 64$b$ are at low potential with respect to line 51. With $Xu$ "off," however, point 67$a$ is at the higher of two potentials with respect to line 51, and hence, a point along resistance 64$a$ ($Xu$) is likewise at a high potential. Lines 235 (0—5), 235 (1—6), etc., of the units order connected, respectively, to points on the respective resistors 64$b$ of elements $Au0$—5 to $Au4$—9, inclusive (and also to corresponding elements of the tens and hundreds orders), and line 235$r$ from a point on resistor 64$b$ ($Xu$ and line 235L from a point on resistor 64$a$ ($Xu$), for example, are formed into a cable 236U (see, for example, Figs. 5$i$, 5$c$, 5$d$, 5$e$ and 5$f$). Upon emerging from each of the cables 236U, 236T and 236H, respectively (Fig. 5$f$), all of the sets of lines, except 235L and 235$r$, connect, respectively, to the No. 1 grids of pentagrid mixer tubes 237 (0), 237 (1), etc., one set for each order. The line 235L connects to the No. 3 grids of all tubes 237 (0) to 237 (4), inclusive, and line 235$r$ connects to the No. 3 grids of tubes 237 (5) to 237 (9), inclusive. It will be understood that line 235 (3—8) (Fig. 5$i$), connected to a point on resistor 64$b$ ($Au3$—8), extends via cable 236U to the No. 1 grids of both the tubes 237 (3) and 237 (8) (Fig. 5$f$) of the units group U. On the other hand, a line, such as 235 (1—6) (Fig. 5$c$), connected to a point on resistor 64$b$ ($Au1$—6), extends via cable 236U to the No. 1 grids of both the units tubes 237 (1) and 237 (6) (Fig. 5$f$). Each of the anodes of units tubes 237 (0), etc., are connected together and to one end of a common resistance 238U whose other end is connected to line 50. The cathodes of tubes 237 (0), etc., are connected to line 51. It is seen that the difference in potential, between the point on a resistor 64$b$ ($Au0$—5 to $Au4$—9, inclusive), and line 61, is the No. 1 grid bias potential for a pair of tubes (237) (Fig. 5$f$). Likewise, it is seen that the difference in potential between a point on resistors 64$a$ and 64$b$, respectively, ($Xu$) (Fig. 5$i$) and line 61 is the No. 3 grid bias potential for two groups, respectively, of five tubes (237) each. When a point on a resistor 64$b$ ($Au0$—5 to $Au4$—9, inclusive) is at a low potential, the No. 1 grid bias of its related pair of tubes (237) is sufficient to suppress current flow therethrough, irrespective of possible negative bias reductions of the No. 3 grids or increases in voltage of the No. 2 and No. 4 grids. When a point on either one of resistors 64$a$ and 64$b$ ($Xu$) (Fig. 5$i$) is at a low potential, the bias of the No. 3 grids of the related group of five tubes 237) is sufficient to suppress current flow therethrough, irrespective of possible negative bias reductions of the No. 1 grids or increases in voltage of the No. 2 and No. 4 grids.

When, however, a point on a resistor 64$b$ ($Au0$—5 to $Au4$—9, inclusive) is at a high potential, the No. 1 negative grid bias of its related pair of tubes (237) is reduced, permitting current flow through a particular one only, of the related pair of tubes (237), when its No. 3 negative grid bias is also reduced and the potential of its No. 2 and No. 4 grids is sufficiently high. From the foregoing it will be appreciated that, since $Au3$—8 (Fig. 5$i$) is "on," the tubes 237 (3) and 237 (8) (Fig. 5$f$) comprise that pair in the units order group of tubes (237) whose No. 1 negative grid bias is reduced but since $Au0$—5, $Au1$—6, etc., are "off," the No. 1 grid bias of their associated tubes 237 (0) and 237 (5), and 237 (1) and 237 (6), etc., Fig. 5$f$, has a value at or below cut-off. Also, since $Xu$ (Fig. 5$i$) is "off," tubes 237 (0) to 237 (4), inclusive, Fig. 5$f$, comprise that group of units order tubes (237) whose No. 3 negative grid bias is reduced via line 235L, while the No. 3 negative grid bias of tubes 237 (5) to 237 (9), inclusive, Fig. 5$f$, is maintained at or below cut off. Tube 237 (3) is, therefore, the only tube in the units group which has both its No. 1 and No. 3 negative grid bias reduced. It is obvious, that an increase in the No. 2 and No. 4 grid voltage applied to any of the tubes 237 (0), 237 (1), etc., will not cause current flow therethrough, provided one or both of the negative grid bias potentials applied to the No. 1 and No. 3 grids is at or below the cut-off value. Only that tube of the (237) group which has both its No. 1 and No. 3 grid bias, reduced, and its No. 2 and No. 4 grid bias positively increased, can pass current, as will be described presently.

It is deemed clear, that the manner in which elements $At0$—5, $At1$—6 ... $At4$—9, $Xt$, control related tubes (237) (Fig. 5$f$) of the tens order group T, and the manner in which elements $Ah0$—5, $Ah1$—6 ... $Ah4$—9, $Xh$ control related tubes (237) (Fig. 5$f$) of the hundreds order group H, is similar to that described in connection with the units order group U.

In this particular problem, with 603 entered in the accumulator, the No. 1 negative grid bias of tubes 237 (0), and 237 (5), of the tens order group T, is reduced, since $At0$—5 (Fig. 5$d$) is "on," while the No. 3 negative grid bias of tubes 237 (0) to 237 (4), inclusive, only, of the tens order group is reduced via line 235L, since $Xt$ (Fig. 5$j$) is "off."

Also, with 603 entered in the accumulator, the No. 1 negative grid bias of tubes 237 (1) and 237 (6) of the hundreds order group H, is reduced, since $Ah1$—6 (Fig. 5$e$) is "on," while the No. 3 negative grid bias of tubes 237 (5) to 237 (9), inclusive, only, of the hundreds order group is reduced via line 235$r$, since $Xh$ (Fig. 5$k$) is "on."

Even though the No. 1 and No. 3 negative grid bias of a tube (237) may be reduced, such as is true of tube 237 (3) in the units order group U, with 603 entered in the accumulator, there still is no increase in current flow therethrough until its No. 2 and No. 4 grid potential is raised in a positive direction. Such voltage rise in a particular tube such as 237 (3) of group U, for example, is brought about by the operation of the particular selector 206 (3) (Fig. 5L). Attention is directed to selector 206 (3) (Figs. 24 and 5L) and it is seen that this selector has two insulated portions and two conducting portions. The latter, when effective, shortcircuit the major portion of resisance 239 (Fig. 5L) associated therewith, which, together with resistance 240, form a voltage divider between lines 50 and 61. Point 241 on said divider is connected to line 242 (3) of a group combined into a cable 243 (see also Fig. 5f). Upon emerging from cable 243, line 242 (3) extends to the No. 2 and No. 4 grids of all tubes 237 (3), including that one relating to the units order group U. When the conducting portions of selector 206 (3) (Fig. 5L) are effective, point 241 is very near the potential of line 61, and by virtue of line 242 (3) (see also Fig. 5f) the No. 2 and No. 4 grid voltages of all tubes 237 (3) is likewise very close to the potential of line 61. At such low potential, neither a No. 1 or No. 3 negative grid bias reduction nor both, of any of the tubes 237 (3) would be effective to produce current flow therethrough.

Referring again to Figs. 24 and 5L, when each of the two insulated portions of selector 206 (3) is effective, the major portion of resistance 239 associated therewith is no longer shortcircuited and the potential of point 241 rises, since resistance is thus added to the divider between point 241 and line 61. Through the circuit connection provided by line 242 (3) (see also Fig. 5f) the No. 2 and No. 4 grid potentials of all tubes 237 (3) are high when resistance 239 (Fig. 5L) is non-shorted. As the No. 1 and also the No. 3 grid bias of tube 237 (3), of the units order group U, only (Fig. 5f), is reduced (under control of A$u$3—8 and X$u$ as described above), and since its No. 2 and No. 4 grid potentials are raised for two intervals during each revolution of selector 206 (3) (Fig. 5L), current flow through said tube 237 (3) of group U occurs during said intervals. No current flow occurs through the tubes 237 (3) related to the tens and hundreds orders groups when their No. 2 and No. 4 grid potentials are likewise raised, since neither of their No. 1 grid biases has been reduced (neither the tens nor hundreds orders of the accumulator stand at 3).

Likewise, an insulated portion of selector 206 (0) (Figs. 24 and 5L) removes the short circuit from the major portion of its related resistance 239 and the potential of its point 241 rises. Through the connection provided by line 242 (0) (see also Fig. 5f) the No. 2 and No. 4 grid potentials of all tubes 237 (0) is raised. Since the negative bias of the No. 1 and No. 3 grids of tube 237 (0) of the tens order group T, only, is reduced under control of both A$t$0—5 and X$t$, current flow through this tube occurs whenever its No. 2 and No. 4 grid voltages are raised. No current flow occurs through the tubes 237 (0) related to the units and hundreds orders groups, respectively, when their No. 2 and No. 4 grid potentials are likewise raised, because neither of their No. 1 grid biases has been reduced.

Similarly, two insulated portions of selector 206 (6) (Figs. 24 and 5L) remove the short circuit from the major portion of its related resistance 239 and the potential of its point 241 rises during two different intervals. Through the connection provided by line 242 (6) (see also Fig. 5f) the No. 2 and No. 4 grid potentials of all tubes 237 (6) is raised. Since the grid bias of both the No. 1 and No. 3 grids of tube 237 (6) of the hundreds order group H, only, is reduced under control of both A$h$1—6 and X$h$, current flow through this tube occurs whenever its No. 2 and No. 4 grid voltages are raised. No current flow occurs through the tubes 237 (6) related to the units and tens orders groups, respectively, when their No. 2 and No. 4 grid potentials are likewise raised, because neither of their No. 1 grid biases has been reduced.

It is seen from the foregoing, that each selector (206) (Fig. 5L) controls the No. 2 and No. 4 grid voltage rise of tubes (237) (Fig. 5f), which are located in a plurality of orders, without necessarily effecting an increase of current flow therethrough. Current flow does occurs, however, through that one, only, of the tubes (237) in a given order, whose No. 2 and No. 4 grid potential is raised, which is the one having a numerical designation corresponding to the digit standing in the order. Such action takes place, because coincident with the increase, in a positive direction, of its No. 2 and No. 4 grid bias, its No. 1 and No. 3 negative grid biases are reduced by the status of two elements which, in combination, represent a number corresponding to the digit standing in the order.

This current flow through tube 237 (3) relating to the units order group U causes a voltage drop across resistance 238U (Fig. 5f) and such drop is maintained until a conducting portion of selector 206 (3) (Fig. 5L) shorts its associated resistance 239. Such action occurs twice during every revolution of selector 206 (3) (Fig. 5L). Upon each voltage drop across resistance 238U, condenser 244 associated therewith, whose recovery time is relatively large, discharges via line 244U in a circuit which includes resistance 245 (Fig. 5L). Current flow occurs at a substantially constant rate through resistance 245 during any interval that there is a maintained voltage drop across resistance 238U. This current flow is such that a point on resistance 245 is negative in potential with respect to line 51. The grid of tube 246 is connected to resistance 245 and accordingly, when a negative potential appears on 245, the normal negative grid bias of tube 246 is increased, decreasing current flow therethrough and through load resistance 247U causing a decreasing voltage drop across 247U. Such voltage drop across 247U is equal in duration to that across resistance 238U (Fig. 5f). When such conditions occur, condenser 248 (Fig. 5L) whose recovery time is also relatively large, becomes charged and a positive potential appears on resistance 223U for the duration of a voltage drop across resistance 247U. Such a potential is square-topped in character and during each revolution of selector 206 (3) appears twice on resistance 223U. Resistance 223U is connected via line 249U to the grid 199 (Fig. 5s) of the units order cathode ray tube 159$u$. Accordingly, a positive potential on resistance 223U is effective to reduce the negative grid bias of cathode ray tube 159$u$ to a value less than cut-off. Therefore, under this condition, the electron beam of tube 159$u$ is permitted to impinge upon its fluorescent screen.

Summing up, upon a maintained No. 1 and No. 3 negative grid bias reduction of the units order tube 237 (3) (Fig. 5f) as described above, selector 206 (3) (Fig. 5L) produces a negative grid bias reduction of cathode ray tube 159$u$, for two intervals, during each revolution that it makes. Since the selectors and disk 208 are both rotated by motor 189, these bias reductions of tube 159$u$ occur, concurrently with the generation under control of disk 208, of those potentials, required to trace the numeral 3. These potentials are amplified and applied to the deflection plates YU and XR of all tubes 159, as described above, thereby producing relative voltage changes between the upper and lower plates and between the right and left plates, and the reduction of the bias of tube 159$u$ permits its electron beam only, to impinge upon its fluorescent screen, only during production of these potentials, whereby the numeral 3 has its outline traced on this screen, in true numeral outline, where it is readily visible, as illustrated in Fig. 17.

In the same manner, current flow occurs through tube 237 (0) (Fig. 5f) of the tens order, once for each revolution of disk 208 by virtue of the operation of selector 206 (0) (Fig. 5L), since At0—5 (Fig. 5d) is "on" and Xt (Fig. 5j) is "off." Such current flow results in a voltage drop across resistance 238T (Fig. 5f) and in the same manner, as described in connection with resistance 238U, there is produced a drop across resistance 247T and a positive potential on its associated resistance 223T (Fig. 5L) related to the tens order. Resistance 223T, related to the tens order, is connected via line 249T to the grid 199 (Fig. 5s) of the tens order cathode ray tube 159t, so that a positive potential on said resistance 223T is effective to reduce the negative grid bias of cathode ray tube 159t to a value less than cut-off, once per revolution of disk 208. Therefore, under this condition, the electron beam of tube 159t is permitted to impinge upon its fluorescent screen. In this manner, upon a maintained reduction of the negative grid bias of the No. 1 and No. 3 grids of the tens order tube 237 (0) (Fig. 5f), selector 206 (0) (Fig. 5L) causes a negative grid bias reduction of cathode ray tube 159t for a single interval during each of its revolutions. This bias reduction of tube 159t occurs, concurrently with the generation under control of disk 208, of those potentials, which are required to trace the numeral 0. These potentials are amplified and applied to the deflection plates YU and XR of all cathode ray tubes 159, as described previously, and since the electron beam of tube 159t only, is now permitted to impinge upon its fluorescent screen during production of these potentials, the numeral 0 is traced on said screen in true numeral outline, where it is readily visible, as illustrated in Fig. 17.

In the same manner, current flow occurs through tube 237 (6) (Fig. 5f) related to the hundreds order, twice per revolution of disk 208 by virtue of the operation of selector 206 (6) (Fig. 5L), since both Ah1—6 (Fig. 5e) and Xh (Fig. 5k) are "on." Such current flow results in a voltage drop across resistance 238H (Fig. 5f) and the appearance of a voltage drop across resistance 247H and a positive potential on its associated resistance 223H (Fig. 5L) in the same manner as described in connection with the units order. The grid 199 (Fig. 5s) of cathode ray tube 159h is connected by line 249H to the hundreds order resistance 223H. Hence, a positive potential on this resistance 223H is effective to reduce the negative grid bias of cathode ray tube 159h to a value less than cut-off. Therefore, under this condition, the electron beam of tube 159h is permitted to impinge upon its fluorescent screen. In this manner upon a maintained reduction of the negative grid bias of the No. 1 and No. 3 grids of the hundreds order tube 237 (6) (Fig. 5f), selector 206 (6) (Fig. 5L) causes a reduction of the negative grid bias of cathode ray tube 159h for two intervals during each of its revolutions. This bias reduction of tube 159h occurs, concurrently with the generation by disk 208, of those potentials, which are those required to trace the numeral 6. These potentials are amplified and applied to the deflection plates YU and XR of all cathode ray tubes 159, as described previously. Since the electron beam of tube 159h only, is permitted to impinge upon its fluorescent screen during production of these potentials, the numeral 6 is traced on this screen in true numeral outline, where it is readily visible, as illustrated in Fig. 17. While component portions of the individual numbers 6, 0 and 3 are traced, in succession, on the screens of cathode ray tubes 159h, 159t and 159u during each revolution of disk 208 (Fig. 5L), the tracings are repeated with such a high rapidity that flicker is eliminated. Consequently, to an observer, the total amount standing in the accumulator, namely 603, is continually and constantly visibly manifested by the cathode ray tubes of the indicator (Fig. 17). If desired, the operator may suppress the display of amounts standing in the accumulator by opening switch 250 (Figs. 17, 18 and 5L). With switch 250 open, no potential difference is applied to the voltage dividers 240—239 (Fig. 5L) and thus the No. 2 and No. 4 grid potentials of all tubes 237 (0), etc. (Fig. 5f), is reduced to zero. Accordingly, no current flow can occur through any of the tubes 237 (0), etc., irrespective of No. 1 and No. 3 negative grid bias reductions thereof, which are effected by digit manifesting and extra elements. Thus, the grid bias of cathode ray tubes 159h, 159t and 159u (Fig. 5s) is maintained at cut-off and no electron beams impinge upon related fluorescent screens.

Having described in detail the manner in which an amount standing in the electronic accumulator is visibly manifested in true numeral outline by a cathode ray tube indicator, an explanation will now be given of the method of resetting the accumulator to zero, prior to making a new series of entries therein or prior to any operation of the device.

17. Resetting—accumulator

The method of resetting an electronic accumulator of the type described in said copending application Serial No. 314,767 consists of adding to the digit standing in each order of the accumulator a series of unit amounts, one unit per machine cycle, to progressively incrementally advance each order to 0. When each order stands at 0, no further unit amounts can be entered therein. It is seen that the order containing the smallest digit (other than 0) determines the number of machine cycles required for a resetting operation.

The method employed for resetting the electronic accumulator of the present application, is different in principle from that above, in that the time required for reset is independent of the value of the digits standing in the accumulator. The resetting operation in the present application is performed in three steps and in all orders: the first step produces a turning off of all the extra elements which are "on," the second step produces a turning off of all the digit manifesting elements, which are "on," and the third step produces a turning on of the digit manifesting elements, Au0, At0, and Ah0, and since the extra elements are all "off," 0 stands in all orders.

Referring to Fig. 5h, line 90, to which a-phased pulses are applied (section 4), is connected to the grid of tube 258. The screen of this tube is connected to the junction of resistances 259 and 260, which together form a voltage divider between lines 50 and 51. The screen potential of tube 258 is normally maintained at that of line 51, by switch 261, normally closed, as shown, so that bias reductions of its control grid have no effect on current flow therethrough. The anode of tube 258 is connected to line 50 through load resistance 262 and is coupled to resistance 263 through condenser 264. Any positive potential on resistance 263 is effective, via line 265 (see also Figs. 5b, 5c, 5i and 5p, for example) to produce a grid bias reduction of tube 292 Fig. 5p, for example (see also Figs. 5q and 5r). The anode of each tube 292 is connected to the point 66b of a related extra element $Xu$ (Fig. 5i), $Xt$ (Fig. 5j) and $Xh$ (Fig. 5k), respectively.

To produce the first step in the resetting operation, the operator throws switch 261 (Figs. 17, 18 and 5h) to the reverse position from that shown, thus removing the shunt from resistance 260 and producing a rise in a positive direction of the screen voltage of tube 258. Negative control grid bias reductions of 258, produced by $a$-phased pulses appearing on line 90, cause increased current flow through the tube and its load resistance 262, with the result that $b$-phased positive pulses appear on resistance 263. The first positive pulse, appearing on resistance 263, is effective via line 265 to reduce the grid bias of all tubes 292 (Figs. 5p, 5q and 5r). Accordingly, current flow occurs through each tube 292 and resistance 62b associated therewith and thus is effective to turn any of the extra elements, which may be "on" to an "off" status. Since a total amount of 603 now stands in the accumulator, $Xh$ (Fig. 5k) only, of the extra elements is "on," prior to the above described initial resetting operation, and as a result of this resetting operation $Xh$ is switched "off." Had $Xt$ (Fig. 5j) and $Xu$ (Fig. 5i) also been "on," they would have been switched "off," concurrently with $Xh$.

It was stated in section 7 that resistance $72a3$ (Fig. 5h) has $a$-phased pulses produced thereon and it was seen that these pulses are effective via line 128 (see also, for example, Figs. 5b, 5c, 5i and 5p) to restore any of the four sequentially operated elements in any order, which are "on," to an "off" status, when elements which follow in the series are turned on. The details of the circuits by which $a$-phased pulses are produced on resistance $72a3$ (Fig. 5h) will now be described.

Line 93 (Figs. 5a, 5g and 5h), to which $b$-phased pulses are applied (section 4) is connected to the No. 1 grid of pentagrid mixer tube 251 (Fig. 5h). The No. 2 and No. 4 grids of tube 251 are internally joined and externally connected to the junction of resistances 252 and 253, which together form a voltage divider between lines 50 and 51. The No. 2 and No. 4 grids of tube 251 draw current, which may vary due to tube operation. Accordingly, resistance 253 is shunted by condenser 254, whose recovery time is relatively large. Thus, the potential of the No. 2 and No. 4 grids of tube 251 is maintained substantially constant for current variations therethrough. Grid No. 3 of tube 251 connects to a point on resistance 99b, said point being normally at the potential of line 80, since switch 255 is maintained closed, as shown, so that grid No. 3 of tube 251 is normally maintained at the potential of line 80 and $b$-phased pulses appearing on the non-shunted portion of resistance 99b have no effect on the bias of this grid. The anode of tube 251 is connected to line 50 through load resistance 256 and is coupled to resistance $72a3$ through condenser 257. It is to be noted that in the pentagrid mixer type of tube (251), either the No. 1 grid or the No. 3 grid or both together may contribute to the control of the plate current handled by the tube. As normally operated in the present device, as stated above, the bias of the No. 3 grid of tube 251 is maintained constant, while $b$-phased pulses continually vary the bias of the No. 1 grid. Resulting current flow variations through the tube and through resistance 256 in turn produce $a$-phased pulses on resistance $72a3$. The amplitude of the pulses appearing on resistance $72a3$ is ample for the digit manifesting element control purposes, referred to in section 7.

To produce the second step in the resetting operation, the operator throws switch 255 (Figs. 17, 18 and 5h) to the reverse position from that shown. The $b$-phased pulses on resistance 99b are now effective to reduce the negative bias of the No. 3 grid of tube 251, while, as stated above, $b$-phased pulses, applied to line 93, are effective to reduce the negative bias of the No. 1 grid of tube 251. With switch 255 open, $b$-phased pulses are concurrently applied therefore, to the No. 1 and No. 3 grids of tube 251 and cause an effective negative bias reduction, which is greater in magnitude than that caused by the No. 1 grid alone, and the current flow through tube 251 is greater than normal. The resulting voltage drops across resistance 256 are also increased, so that with switch 255 in open position, the amplitude of the pulses appearing on resistance $72a3$ is greater than that of pulses normally appearing thereon. These $a$-phased pulses, of increased magnitude, are applied to line 128 (see, for example, Figs. 5h, 5b, 5c and 5i) to restore, any of the $Au1$—6 to $Au4$—9, inclusive, $At1$—6 to $At4$—9, inclusive, and $Ah1$—6 to $Ah4$—9, inclusive, digit manifesting elements, which are "on," to an "off" status, as will now be described.

It is assumed, as stated above, that the total amount of 603 stands in the electronic accumulator prior to the resetting operation, and, as is understood, $Au3$—8 (Fig. 5i), $At0$—5 (Fig. 5d) and $Ah1$—6 (Fig. 5e) are "on." Even though the screen potential of tube 69a ($Au3$—8) is low (since $Au4$—9 is "off"), the $a$-phased pulses of increased amplitude, now appearing on line 128, produce a greater than normal reduction of the negative grid bias of tube 69a, increasing current flow therethrough sufficiently to turn $Au3$—8 from an "on" to an "off" status. It is to be noted that the first of the $a$-phased pulses of increased amplitude appearing on line 128 is effective to accomplish this result. Succeeding similar pulses appearing on line 128 have no further effect but they merely continue until switch 255 (Fig. 5h) is returned to the position, as shown.

Also, even though the screen potential of tube 69a ($Ah1$—6) (Fig. 5e) is low (since $Ah2$—7 is "off"), the $a$-phased pulses of increased amplitude, now appearing on line 128, produce a greater than normal reduction of the negative grid bias of tube 69a, increasing current flow therethrough sufficiently to turn $Ah1$—6 from an "on" to an "off" status. It is to be noted that $Ah1$—6 (Fig. 5e) and $Au3$—8 (Fig. 5i) are returned to an "off" status, concurrently, under control of the first of the $a$-phased pulses of increased amplitude appearing on line 128.

Having thrown switch 255 (Fig. 5h) first to the reverse position from that shown and then having returned it to the position, as illustrated, the operator has turned "off" any of the $Au1$—6 to $Au4$—9, inclusive, digit manifesting elements, and similar elements of the tens and hundreds orders, which are "on." It is to be noted, however, that element $At0$—5 which is "on" is not turned off, under control of the pulses on line 128, and neither are $Au0$—5 nor $Ah0$—5.

To produce the third step of the resetting operation, the operator again manipulates switch 261 (Fig. 5h), which turns on the $Au0$—5, $At0$—5, and $Ah0$—5 digit manifesting elements, as will now be described.

With switch 261 again in a reverse position from that shown, the shunt across resistance 260 is removed, thus producing a rise in the screen potential of tube 258. With such a rise, negative grid bias reductions of tube 258, produced by $a$-phased pulses appearing on line 90, again cause increased current flow through 258 and its load resistance 262, with the result that positive $b$-phased pulses appear on resistance 263. The first such positive pulse, appearing on resistance 263, is effective via line 265 (see also Figs. 5b, 5c, 5d and 5e) to reduce the negative grid bias of all tubes 266 (Figs. 5c, 5d and 5e, respectively). The anode of each tube 266 is respectively connected to the point 66a of a related element $Au0$—5 (Fig. 5c), $At0$—5 (Fig. 5d) and $Ah0$—5 (Fig. 5e). Accordingly, current flow occurs through each tube 266 and is effective to concurrently shift $Au0$—5, $At0$—5 and $Ah0$—5 to an "on" status, if they are not already "on," thus completing a full resetting operation. Each order of the accumulator now stands at 0, since elements $Au0$—5, $At0$—5, and $Ah0$—5 are "on" and the extra elements $Xu$, $Xt$, and $Xh$ are "off," as are all other remaining elements. It is appreciated that the first of the $b$-phased pulses appearing on line 265, is effective, in the manner just outlined, to accomplish this result. Succeeding similar pulses appearing on line 265 have no further effect and merely continue to appear until switch 261 (Fig. 5h) is returned by the operator to the position, as shown.

The foregoing has described the method employed for resetting the electronic accumulator of this invention, so that the quantity 000 stands therein, and it is seen that the operation is effected without regard to cyclical machine timing, and that the time required for reset is independent of the value of the digits standing in the accumulator.

18. Conditioning—Electronic commutator

As will be explained in the latter portion of this section, it is necessary, prior to operation of the device of the present invention, to condition the electronic commutator. This conditioning operation is performed in two steps: the first step turns off any of the commutator elements C9 (Fig. 5a), C8, etc. (Figs. 5g and 5m), which are "on," and the second step turns on the C12 element (Fig. 5a), which is arbitrarily chosen for this purpose. The method employed for conditioning the electronic commutator is similar in principle to that employed for resetting the electronic accumulator (section 17).

It was stated in section 5 that $b$-phased pulses are produced (in some manner) on resistor 72a2 (Fig. 5b) and it was seen that they were effective via line 76 (see also Figs. 5a, 5g and 5m) to restore any of the C9, C8 etc. . . . C11 commutator elements, which are "on," to an "off" status, when a following element is turned on, during the sequential operation of the device. Before proceeding to the description of the electronic commutator conditioning, the details of the circuits by which $b$-phased pulses are produced on resistance 72a2 (Fig. 5b) will be described.

Line 90 (Figs. 5a and 5b, for example), to which $a$-phased pulses are applied (section 4) is connected to the No. 1 grid of pentagrid mixer tube 267 (Fig. 5b). The No. 2 and No. 4 grids of tube 267 are internally joined and externally connected to the junction of resistances 268 and 269, which together form a voltage divider between lines 50 and 51. As was explained previously (section 17) in connection with condenser 254 (Fig. 5h), condenser 270 (Fig. 5b) aids this voltage divider in maintaining constant, the potential of the No. 2 and No. 4 grids of tube 267, for current variations therethrough. Grid No. 3 of tube 267 connects to a point on resistance 271, which is coupled by condenser 272 and line 273, to the anode of amplifier tube 92a (Fig. 5a). The manner in which tube 92a controls production of $a$-phased pulses on resistance 271 (Fig. 5b) is exactly similar to its action in producing such pulses on resistance 72b (Fig. 5a) as explained previously (section 4). The point on resistance 271 to which the No. 3 grid of tube 267 is connected is normally maintained at the potential of line 80, since switch 274 (Figs. 17, 18 and 5b) is normally closed, as shown. Therefore, the No. 3 grid of tube 267, is maintained at the potential of line 80, and $a$-phased pulses appearing on the non-shunted portion of resistance 271 have no effect on the bias of this grid. The anode of tube 267 is connected to line 50 through load resistance 275, and is coupled to resistance 72a2 through condenser 276. As is now understood, either the No. 1 grid or the No. 3 grid, or both together, may control the amount of plate current handled by the tube 267. In the normal arrangement of tube 267, as set forth above, the bias of the No. 3 grid is maintained constant while $a$-phased pulses continually vary the bias of the No. 1 grid. Resulting current flow variations through the tube and through resistance 275 produce the $b$-phased pulses on resistance 72a2. The amplitude of the pulses appearing on this resistance is ample for electronic commutator element control purposes referred to in section 5.

To operatively condition the electronic commutator, the operator throws switch 274 (Fig. 5b) to the reverse position from that shown. The $a$-phased pulses on resistance 271 are now effective to reduce the negative bias of the No. 3 grid of tube 267, while $a$-phased pulses, applied to line 90, are also effective, to reduce the negative bias of the No. 1 grid of tube 267, so that with switch 274 open, $a$-phased pulses are concurrently applied to the No. 1 and No. 3 grids of tube 267, and cause an effective negative bias reduction which is greater in magnitude than that caused by the No. 1 grid alone. Accordingly, the current flow through tube 267 is greater than normal. The resulting voltage drops across resistance 275 are increased in magnitude as is also the amplitude of the $b$-phased pulses produced on resistance 72a2, or in other words, with switch 274 in open position, the amplitude of the pulses appearing on resistance 72a2 is greater than that of the pulses normally appearing thereon. These $b$-phased pulses of increased magnitude are applied to line 76 (see also Figs. 5a, 5g and 5m) to restore any of the C9, C8 . . . etc. C11 elements which are "on," to an "off" status, as will now be explained.

Let it be assumed that C8 (Fig. 5g) is the sole element "on." Even though the screen potential of tube 69a (C8) is low (C7 assumed to be "off"), the $b$-phased pulses of increased amplitude now appearing on line 76 produce a greater than normal negative grid bias reduction on this tube 69a, increasing current flow therethrough sufficiently to turn C8 from an "on" to an "off" status. It is understood that the first of the $b$-phased pulses, of increased amplitude, appearing on line 76 is effective to accomplish this result. Succeeding similar pulses appearing on line 76 have no further effect and they merely continue until switch 274 (Fig. 5b) is returned to the position, as shown.

Having thrown switch 274 (Fig. 5b) first to the reverse position from that shown and then having returned it to the position, as illustrated, the operator has turned off any of the C9, C8 ... etc. ... C11 electronic commutator elements which are "on." To perform the second step in the conditioning of the commutator, the operator manipulates switch 281 (Fig. 5b) which turns C12 to an "on" status, in a manner now to be explained, provided such element is not already "on."

Referring to Fig. 5b, line 93 (to which b-phased pulses are applied section 4) is connected to the grid of tube 278. The screen of this tube is connected to the junction of resistances 279 and 280, which together form a voltage divider between lines 50 and 51. The screen potential of tube 278 is normally maintained at that of line 51, since switch 281 is normally closed, as shown, so that bias reductions of its grid have no effect on current flow therethrough. The anode of tube 278 is connected to line 50 through the load resistance 282, which is coupled to resistance 283 by condenser 284. Any positive potential on resistance 283 is effective to cause a negative grid bias reduction of tube 285. The anode of tube 285 is connected, via line 286, to point 66a (C12) (Fig. 5a).

Summing up, to perform the second step in the commutator conditioning operation, the operator throws switch 281 (Fig. 5b) to the reverse position from that shown, thus removing the shunt from resistance 280 and producing an increase in the screen potential of tube 278. Grid bias reductions of tube 278, controlled by b-phased pulses appearing on line 93, cause increased current flow through the tube and its load resistance 282, with the result that a-phased pulses appear on resistance 283. The first positive pulse, appearing on resistance 283 is effective to reduce the negative grid bias of tube 285, increasing current flow therethrough producing a voltage drop across resistance 62a (Fig. 5a) which brings about a shift of C12 (Fig. 5a) from an "off" to an "on" status. It is appreciated that the first of the a-phased pulses applied to tube 285 (Fig. 5b) is effective to accomplish this result. Succeeding similar pulses applied to this tube have no further effect and they merely continue to appear until switch 281 (Fig. 5b) is returned by the operator to the position as shown.

The foregoing has described the method employed for conditioning the electronic commutator of this invention, so that all, save a particular one of its elements are placed in an "off" status, and it is seen that the operation is effected without regard to cyclical machine timing, and that the time required for a conditioning operation is independent of the number of elements which may be "on" or of their numerical designation.

When starting up the machine for normal operation by closing the main power switch 79 (Fig. 5a) to apply potential to lines 50, 61, etc., the status assumed by many of the circuit elements such as C12, C9, etc., T1 (Fig. 5b), T2, Eu (Fig. 5c) etc.; Au0—5, Au1—6, etc.; Et, At0—5 (Fig. 5d), At1—6, etc., Eh, Ah0—5 (Fig. 5e) Ah1—6 etc., Ru (Fig. 5p), Xu (Fig. 5i), Rt (Fig. 5q) Xt (Fig. 5j), etc., may be either an "on" or an "off" status, and is governed solely by chance.

The operator therefore proceeds to operatively condition the electronic commutator, as explained in this section, and to place it in operation by opening switch 101 (Fig. 5a). Thereupon, the commutator produces pulses, as described in section 5, and the control pulses "0" and "12" are effective to shift T1 (Fig. 5b), T2, Eu (Fig. 5c) Et (Fig. 5d), Eh (Fig. 5e), Ru (Fig. 5p), Rt (Fig. 5q) and Rh (Fig. 5r) to their normal "off" status, as is now understood. The above mentioned occasion for conditioning the electronic commutator is the only conditioning required when operating the machine.

The digit manifesting and extra elements comprising the accumulator are then reset to indicate zero, as described previously (section 17), and the operator may now make entries into the accumulator.

Except to indicate general relationships, no mention has been made hereinabove of the speed with which the electronic accumulator, based on the principles disclosed in this invention, may operate and accept multidenominational entries. Actually, the accumulator is adapted to operate and to accept multidenominational entries at a rate which covers a wide range. It is believed to be capable of handling and receiving entries of multidenominational amounts for a range of rates which extends from one every twelve seconds to approximately one in one hundred thousandths of a second. Stated otherwise, entries may be made into the accumulator at rates which vary from five per minute to approximately six million per minute. It should also be mentioned that the speed of operation of the cathode ray tube indicator (section 16) bears no relation whatever to that of the electronic accumulator. It is, of course, desirable to avoid flicker in the display of digits, corresponding to total amounts standing in the accumulator, and for this reason the pattern component emitter should rotate at a rate not less than sixteen revolutions per second and preferably its speed should be nearer to twenty-four or thirty revolutions per second.

Novel means are therefore provided including novel electronic manifesting means, sequentially operable in proportion to the value of a digit entered, and additional means operated once, for each complete sequence of operation of said first means, to produce a combinational indication of said digit, and novel means are also provided for producing carry, for producing carry upon a carry, and for controlling the visible tracing of different desired numeral outlines, in a novel manner, in accordance with the combinational indication of said numeral.

While there has been shown and described and pointed out the novel features of the invention as applied to a single embodiment, it will be understood, that various omissions and substitutions and changes, in the form and details of the device illustrated, and in its operation, may be made by those skilled in the art, without departing from the spirit of the invention. It is the intention, therefore, to be limited, only as indicated by the scope of the following claims.

What is claimed is:

1. An electrical accumulator comprising a plurality of electronic elements each operable to an on and to an off condition, means controlled by the on condition of one of said elements, conditioning solely the succeeding element in an off condition, preparatory to operation to an on condition, advancing means producing an electrical pulse cooperating with said succeeding element, when conditioned, to turn said element on, said element when on, conditioning said first element preparatory to operation to an off condition, restoring means producing an electrical pulse cooperating with said first element, when conditioned, to turn said element off, each succeeding element bearing the same relationship to succeeding and preceding elements as said first and second elements, an additional element controlled by one, only, of said preceding elements and operable to an on condition upon operation of said one element, only, to an on condition, and operable to an off condition upon operation of said one element, only, again to an on condition, entry control means controlled by a manifestation representative of a digit to be entered controlling the number of applications of said advancing pulses in proportion to the value of a digit to be entered, whereby the on condition of one of said plurality of elements and the on or off condition of said additional element, combinationally represent the value of said digit, and said entry means controlled by a manifestation representative of another digit to be entered, again controlling the number of applications of said advancing pulses in proportion to the value of said other digit, whereby the on condition of said plurality of elements in combination with the on or off condition of said additional element, combinationally indicate the cumulative value of said first and said second entered digits.

2. An electrical accumulator comprising a plurality of electrical elements, each including an electronic emitting device and associated circuits, operable to either of two sustained electrical on and off conditions upon successive applications of electrical pulses, means electrically connecting said elements into a closed network whereby upon application of successive control pulses, said elements are cyclically sequentially operated, and each operated sequentially to an on and to an off condition, and an additional element, controlled by a single one, only of said elements and operable to an on condition by a control pulse when said single element is in one electrical condition and operable to an off condition by a control pulse when said single element is again in the same electrical condition, means, controlled by a manifestation representative of a digit to be entered, limiting the number of effective applications of said control pulses, in proportion to the value of a digit to be entered, to thereby step the on condition of said elements sequentially about said closed network and to operate said additional element to one condition, when said single element is operated to said one condition and to operate said additional element to the opposite condition when said single element is again operated to said one condition, the combinational on condition of any one of said plurality of elements and the on or off condition of said additional element, manifesting the corresponding digit, said means controlled by a manifestation representative of another digit to be entered limiting the number of applications of said control manifestations, in proportion to the value of said second digit to produce a combinational manifestation representative of the cumulative value of said first and second digits.

3. An electronic accumulator comprising a plurality of cyclically operable electronic elements, each operable to an on and to an off condition under control of successive electrical manifestations and an additional element operable to an on and to an off condition under control of said successive electrical manifestations and under control of one of said plurality of elements, means interconnecting said plurality of elements, whereby the on condition of one element conditions the next succeeding element to be turned on, upon application of an electrical manifestation thereto, entry control means controlling the effective application of said electrical manifestations to all of said elements, and initially rendered operative to permit said application, by a first electrical control manifestation at a relatively fixed time, means terminating said operation under control of an electrical control manifestation, differentially timed so as to represent a digit to be subtractively entered, means causing operation of said control means for a unit differential time increment, whereby an additional one is entered into said accumulator.

4. An electronic accumulator including in each of a plurality of orders, a plurality of cyclically operable electronic elements, each operable to an on and to an off condition under control of successive electrical manifestations and an additional element having an on and an alternative off condition and reversible from on to off and off to on condition under control of said successive electrical manifestations and under control of one of said plurality of elements, means interconnecting said plurality of elements whereby the on condition of one element conditions the next succeeding element to be turned on upon application of an electrical manifestation thereto, entry control means controlling the application of said electrical manifestations to all of said elements and initially rendered operative to permit said application, by a first electrical manifestation at a relatively fixed time, means terminating said operation, under control of an electrical manifestation, differentially timed so as to represent a digit to be subtractively entered, means producing a second electrical manifestation at a second relatively fixed time to permit operation of said control means, means terminating said operation a unit differential time increment later to thereby enter an elusive one, and carry producing means controlled by the on condition of a chosen one of a plurality of elements in one order and the on condition of said additional element and by said second manifestation to introduce a carry into the next higher order.

5. An electrical accumulator comprising a plurality of electronic elements for producing individual electronic manifestations, each in combination with each of two electrical manifestations produced by an additional element controlled by one of said plurality, combinationally representative of one, only, of the digits of a chosen notation, means sequentially operating different numbers of said plurality of elements, and said additional element when said one element is operated, in proportion to the value of a digit to be entered, subtraction controlling means, cooperating with said sequentially operating means to control subtractive entry of a succeeding digit whereby said elements and said additional element are sequentially operated, to produce a different combinational manifestation, means controlling said sequentially operating means to sequentially operate another one of said plurality of elements to enter therein an elusive one, and means simultaneously controlled by said last named means and by the elements producing the combinational representation of the highest digit of said notation to produce a carry effect.

6. An electronic accumulator comprising in each denominational order, cyclically sequentially operable elements, each operable to either one of two sustained electronic conditions, means for sequentially conditioning said elements successively, to each of said conditions, to adjust one of said elements to one condition, an additional element, controlled by one, only, of said preceding elements and operable first to one of said sustained conditions and then to the other of said sustained conditions upon successive operations of said one only of said elements, to one of said sustained conditions, the combinational effect of said one adjusted element and said additional element indicating a first digit entered, subtraction-control means, initiating a sequential conditioning of said elements at a relatively fixed cyclical time, said sequential conditioning means, upon determination of a second digit, terminating said sequential operation to thereby adjust another one of said elements to said one condition, means rendered effective under control of said subtraction means, sequentially conditioning said elements of the lowest order at a fixed cyclical time and means limiting said sequential conditioning to a unit digital amount, whereby an elusive one is entered in the said lowest order.

7. An electronic accumulator comprising a plurality of cyclically operable elements, each operable to an on and to an off condition under control of successive electrical manifestations and an additional element selectively reversible from an on and to an off condition and vice versa under control of said successive manifestations and means coupling the additional element to only one of said plurality of elements to be primed thereby for either reversal in condition, means interconnecting said plurality of elements, whereby the on condition of one element conditions the next succeeding element, to be turned on upon application of an electrical manifestation thereto, entry control means controlling the application of said electrical manifestations to said elements, in proportion to the values of digits to be entered, and carry means, including means controlled by the change from an on to an off condition of said additional element, to produce a carry effect.

8. An electrical accumulator including in each of a plurality of orders, a plurality of cyclically operable electronic elements, each operable to an on and to an off condition under control of successive electrical manifestations and an additional element operable to an on and to an off condition under control of said successive electrical manifestations selectively in accordance with its previous condition and under further control of one of said plurality of elements, means interconnecting said plurality of elements, whereby the on condition of one element conditions the next succeeding element, to be turned on upon application of an electrical manifestation thereto, entry control means controlling the application of said electrical manifestations to said elements, in proportion to the value of digits to be entered, carry means, including means controlled by the change of said additional element from an on to an off condition, to produce a carry from a lower order to the next higher order, and means controlled by the on condition of an element in said next higher order and the on condition of said additional element in said next higher order and by said carry effect to produce a carry in the still next higher order.

9. An electronic accumulator comprising a plurality of electronic elements for producing individual electronic manifestations and an additional element, producing, alternately, a similar manifestation and a different manifestation, the combinational effect of each of said individual manifestations and of one of said alternate manifestations being representative of a different digit, means producing a series of pulses, proportional to the value of a digit to be entered, sequentially operating different numbers of said plurality of elements in proportion to the value of the digits to be entered and operating said additional element to an alternate manifestation each time a chosen number of said plurality of elements is operated, and electronic carry producing means, including means controlled by the change of said additional element from one manifestation to the other.

10. An electronic accumulator comprising a plurality of electronic elements for producing individual electronic manifestations and an additional element producing, alternately, one of two manifestations, the combinational effect of each of said plurality of elements with its manifestation and of said additional element, in one of said two manifestations, being representative of a different digit, means sequentially operating different numbers of said elements, in proportion to the values of digits to be entered, and alternately operating said additional element after operation of a chosen number of said plurality of elements, and means, including means controlled by the change of said additional element from one of said two manifestations to the other, to produce a carry effect.

11. An accumulator including electronic manifesting means producing a manifestation representative of a digit entered, said manifestation comprising a combined manifestation of an electrical condition and a separate manifestation of the same or, alternately, of a different, electrical condition, means for altering the combinational manifestation of said electronic means, means, controlled by an electrical manifestation representative of a digit to be entered, controlling said altering means, in steps, equal in number to the value of a digit to be entered to produce a combinational manifestation indicative of the cumulative value of said digits, means testing for a carry condition, and electronic carry means controlled by the change of said separate manifestation from one to the alternate electrical condition and by said testing means, for producing a carry effect.

12. An accumulator comprising in each denominational order an intermittently operable electronic commutator-like organization, adjustable to produce any chosen one out of a plurality of the same kind of electrical conditions, an electronic element alternately producing a similar electrical condition and a different electrical condition, means controlled by a manifestation, representative of one digit, of a chosen notation, to be entered, for adjusting said organization to produce one of said plurality of conditions and to adjust said electronic element to produce one of its electrical conditions, the combinational effect being representative of said digit of said notation, said control means, when controlled by a manifestation representative of a second digit, adjusting said organization to produce the one of said plurality of conditions and the one of said two conditions of said element, representative of the cumulative value of said first and said second digits, means controlled by passage of said organization and said element in one order, from a combinational condition representative of the highest to a combinational condition representative of the lowest digit of said notation to thereby produce a carry effect, and means controlled by a combinational electrical condition in the next higher order, representative of the highest digit of said notation and by said carry effect to produce a carry in the still next higher order.

13. An accumulator comprising an intermittently operable electronic commutator-like organization adjustable to produce a chosen one of a plurality of the same kind of electrical conditions, an electrical element alternately producing a similar electrical condition and a different electrical condition, means controlled by a manifestation representative of a digit to be entered for adjusting said commutator-like organization to produce one of said plurality of conditions, and to adjust said element to produce one of its electrical conditions, the combinational effect being representative of said digit, said control means when controlled by a manifestation representative of a second digit, adjusting said commutator-like organization to produce the one of said plurality of conditions and one of said two conditions of said element, representative of the cumulative value of said first and said second digits, and means controlled by passage of said commutator-like organization and electrical element from a combinational effect representative of the highest to a combinational effect representative of the lowest digit of a chosen notation to produce a carry effect.

14. An accumulator comprising a plurality of electronic elements, sequentially arranged in a closed chain and operable individually to a chosen electrical condition, an additional element capable of assuming either the chosen electrical condition or another electrical condition, means for supplying pulses to said elements of the chain and said additional element to operate said elements of the chain sequentially for different durations of time to advance said chosen electrical condition to different positions within said chain, and for also operating the additional element, to said chosen electrical condition upon completion of one cycle of such operation of said chain and to another electrical condition upon completion of a second cycle of such operation of said chain, and means rendering said operating means operative for different periods of time, said periods varying in duration in accordance with successive digits entered, whereby the position of said chosen condition within said chain is adjusted in accordance with the cumulative value of said digits and said additional element is operated to said chosen condition or to said other condition dependent upon the number of designation of the last cycle of operation of said chain.

15. An electronic accumulator comprising in each denominational order, cyclically sequentially operable elements, each operable to either one of two sustained electronic conditions, an additional element operable to either one of two sustained electronic conditions, means for sequentially conditioning said elements, successively to each of said two conditions, and said additional element to one condition upon completion of one cycle of operation of said first elements, to adjust all said elements to a combinational condition indicative of a digit entered, and means for producing successive digit entries by controlling said sequentially conditioning means, in accordance with the value of digits to be entered, to adjust one of said elements to one condition and said additional element to one of its conditions, to thereby combinationally indicate the cumulative value of digits entered.

16. An electronic accumulator comprising sequentially operable elements, electrically connected into a closed chain, each operable to either of two sustained electrical conditions, means for sequentially operating said elements to each of said conditions, an additional element, operable to one of said chosen sustained electrical conditions upon completion of one sequence of operation of all the elements of said chain and operable to the other chosen electrical condition upon recurrence of such sequence of operation of said chain, and means variably limiting the sequential operation of the elements by the first-named means to differential times indicative of the values to be entered.

17. An electrical accumulator comprising cyclically sequentially operable elements, each operable to either one of two sustained electronic conditions, means for sequentially conditioning said elements successively to each of said conditions to adjust one of said elements to one condition, an additional element, operable to one of said two conditions upon completion of operation of all of said first elements and operable to the other of said two conditions upon a second completion of operation of all of said first elements, means for producing a digit entry into said accumulator by controlling said sequentially conditioning means, in accordance with the value of a digit to be entered, to adjust one of said elements to one of said two conditions and said additional element to one of said two conditions to thereby indicate the cumulative value of digits entered, and reset means for resetting said additional element to one condition, all of said first elements, except one, to said same condition and said one of said first elements to said other one of said two conditions.

18. An electronic accumulator comprising a plurality of electronic elements producing combinational manifestations, composed of the same kind of manifestation, of all of said elements except one element, and alternate kinds of manifestations of said one element, each combinational manifestation being representative of a different digit, means producing a series of pulses, proportional to the value of a digit to be entered, sequentially operating different numbers of all of said elements except one, in proportion to the value of digits to be entered, and said one element when all of said elements except said one, have been operated, and means for resetting all of said elements to a manifestation representative of zero, comprising means resetting all of said elements except two to one kind of manifestation, resetting said one element to the same kind of manifestation and resetting one only of said elements to a different manifestation to thereby indicate zero.

19. An accumulator comprising a plurality of individual electronic elements, each operable to an on and to an off condition, sequentially, an additional electronic element, similarly operable to an on and to an off condition, means commonly connected to all of said elements, including the additional element, for sequentially operating said plurality in proportion to digits entered and said additional element to on condition simultaneously with the turning on of one of said plurality of elements and to off condition simultaneously with repeat turning on of said one of the plurality of elements, and back again to on condition upon a second repeat turning on of said one of the plurality of elements in proportion to said digits entered, the on condition of any one of said plurality together with the on condition of the additional element being indicative of one number and together with the off condition of the additional element being indicative of another number, differing by a constant amount from the first mentioned number.

20. An electronic accumulator comprising a plurality of electronic elements, each including a pair of electronic devices cross-connected so that each device is in one condition while the other device is in a different condition, the conditions of the paired devices of an element determining a chosen state or a different state of the element depending on which of the devices is in a particular condition, means electrically connecting said plurality of electronic elements into a closed chain so that each element when in the chosen state conditions a succeeding element to assume the chosen state, an additional element outside said chain, electrical means coupling the additional element to only one of the electronic elements of the chain to be controlled by said one element, said additional element and the elements of the chain combining to reflect the successive values of a given notation, a source of electrical manifestations for successively operating said elements of the chain and the additional element, and entry control means controlling application of said manifestations to the elements for a differential time related to the value to be entered.

21. An electronic accumulator comprising a ring of electronic elements and an additional element outside the ring combining with the ring of elements for selectively manifesting the different values of a notation, each said element being capable of assuming one or another of different electrical conditions in response to electrical manifestations impressed thereon, means interconnecting the elements of the ring so that a chosen condition in one prepares the next element of the ring to be turned to the chosen condition upon application of an electrical manifestation thereto, means electrically coupling the additional element to only one element of the ring for control by the latter, entry means producing and applying said electrical manifestations to all of said elements, including the additional element, and means to determine a differential period of operation of the entry means in accordance with the differential magnitude of any value to be entered.

22. The accumulator according to claim 21, said entry means comprising electrical means selectively responsive to electrical control manifestations, said determining means including means to transmit to the latter electrical means an electrical control manifestation at a differential time, of a given cycle, related to a value to be entered for initiating operation of the entry means and including means to transmit to the latter electrical means an electrical manifestation at a predetermined time of the cycle to interrupt operation of the entry means, with said differential period being the interval between initiation and interruption of operation of the entry means.

23. The accumulator according to claim 21, said entry means being selectively responsive to electrical manifestations, said determining means including subtraction control means to produce an electrical manifestation at a predetermined time of a given cycle for initiating operation of the entry control means and including means to produce an electrical manifestation at a differential time of the cycle, after operation of the entry control means has begun, for interrupting operation of the entry control means so as to cause entry of the complement of the value.

24. In combination, entry receiving means comprising a series of electronic units, an additional unit, each unit having a chosen condition and an alternative condition, circuits interrelating the units for progressive operation to the chosen condition, means to apply advancing, electrical pulsations to the circuits to effect said progressive operation, entry control means to control the application of the pulsations to the circuits, means to detect digits of a notation called for entry and acting through said entry control means to limit the number of pulsations applied to the circuits in accordance with a detected digit whereby the progressive operation of the units is correspondingly limited, and means controlled by the additional unit in combination with each unit of the series to selectively manifest all the digits of the notation, only one digit at a time being so manifested according to the digit standing in the entry receiving means.

25. In combination, a totalizer comprising a digit entry receiving electrical network of a series of electronic discharge means and additional electrical means, said electrical means capable of producing each of two different electrical manifestations in alternation and said series of electronic discharge means producing electrical manifestations selectively combining with one of said manifestations of the electrical means to manifest, combinationally certain digits and selectively combining with the other manifestation of the electrical means to manifest, combinationally, other digits, means so electrically, operatively connecting the series of electronic discharge means and the additional electrical means into the network as to enable the discharge means to operate sequentially to produce their manifestations and to enable the additional means to operate so as to change from either manifestation thereof to the other upon completion of one cycle of such sequential operation of the series of discharge means and so as to change back to its previous manifestation upon completion of a repeat such cycle, and so on in a cyclical manner, a common source of electrical pulses connected to the series of discharge means and to said additional electrical means for entering digits in the network by electrically pulsing the series of electronic discharge means and the additional electrical means in said network to effect the aforesaid operations of the electronic discharge means and the additional electrical means thereby to produce a combinational manifestation of the cumulative value of entered digits, and means controlled by the change of the additional electrical means from one of its manifestations to the other to produce a carry effect.

26. In combination, an electronic commutator continuously producing a plurality of electrical pulses at predetermined, differential times of a chosen time base, a digit entry receiving electrical network of a plurality of digit manifesting electronic discharge means, means so connecting the electronic discharge means into the network as to be intermittently operable to produce a sequence of electrical manifestations and, also, each of two different electrical manifestations in alternation, one to be produced upon completion of said sequence and the other to be produced upon completion of a following, repeat sequence, either of said two different electrical manifestations combining selectively with the manifestations produced in the sequence to manifest, combinationally, different digits, and means, placed under selective control of the manifestations of said commutator in accordance with the differential magnitudes of digits to be entered in the network, for intermittently operating the plurality of electronic discharge means to produce the manifestations within said sequence and the two different manifestations in alternation so as to combinationally manifest the total of entered digits.

27. In combination, a ring of sequentially operable electronic discharge means, each sequentially operable to an on and to an off condition to adjust the on condition to a chosen position within said ring, additional electronic discharge means having either an on or an off condition and so operatively connected to the ring as to be operable from either condition to the other upon completion of each cycle of operation of the ring, entry control means, having a common connection to all of the discharge means of the ring and to said additional discharge means, for sequentially operating a number of said discharge means of the ring in proportion to the value of a digit to be entered and to operate the additional discharge means so as to turn it from on to off condition or from off to on condition upon completion of each cycle of sequential operations of all the discharge means in the ring, whereby the additional means alternates in condition in accordance with the number of such cycles which are performed, and digit entry determining means controlling the entry control means to effect said operations of the ring of discharge means and of the additional means in accordance with the cumulative value of the entered digits.

28. In combination, a series of electronic discharge units, an additional electronic discharge unit, means interconnecting the units of the series to one another and the last unit of the series to the additional unit to enable the units of the series to be sequentially operated in response to successive pulses, each concurrently applied to all said units and the additional unit to be operated in response to one such pulse to one electronic condition after said series of units has completed sequential operation and to a different electronic condition in response to another such pulse after the series of units has again completed sequential operation, whereby the additional unit will alternate in electronic condition in accordance with the number of completions of sequential operation of the series of units, and means, including said interconnecting means, for effecting said operations of the several units in accordance with the values entered.

29. In combination, a digit entry receiving electrical network of a group of electronic digit manifesting means connected for operation singly, in steps, to produce digit manifestations selectively in the network, said network including an additional element operable to produce one manifestation in the network upon completion of said operation of all the manifesting means of the group, to produce another manifestation upon a second such completion, and to produce the previous manifestation upon a third such completion, and so on in alternation, and means controlled by digit representing manifestations for producing stepping pulses, proportional in number to the cumulative value of the digits to be entered, and impressing each of said pulses concurrently upon all of the digit manifesting means of the group and upon said additional element of the network to effect said operations of the group of digit manifesting means and of the additional element, with such operations resulting in production in the network of a combinational manifestation of the cumulative value, such combinational manifestation including the manifestation produced in the network by the group of manifesting means and either manifestation produced by the additional element.

30. In combination, digit entry receiving, totaling, and manifesting means comprising an electrical network of a series of discrete electronic circuits and an additional electronic circuit, each said circuit including grid-controlled electronic discharge means operable to establish one or another of alternative electrical conditions in the circuit, means electrically operatively connecting said circuits of the series to one another for sequential grid-controlled operation of their respective electronic discharge means and connecting the additional circuit to the series for grid-controlled operation of its electronic discharge means to establish one electrical condition of the additional circuit upon completion of the sequential operation of the series of circuits and to establish the alternative electrical condition of the additional circuit upon completion of repeat sequential operation of the series of circuits, and so on in alternation, whereby the additional circuit will alternate in electrical condition in accordance with the number of times the sequential operation of the series of circuits is completed, and digit entry means comprising electrical pulse applying means for applying pulses to all of said circuits, including the additional electronic circuit, concurrently so as to bring about said grid-controlled operations of the electronic discharge means in accordance with the cumulative value of the entered digits.

31. A totalizer comprising an electrical network of a series of electronic trigger circuits and an additional electronic trigger circuit, each capable of tripping to one electronic condition or a reverse electronic condition, means electrically operatively connecting the series of trigger circuits for sequential tripping operation of each, upon pulsing of the network, first to one electronic condition and then to the reverse condition, means so connecting the additional circuit into the network as to be tripped, upon pulsing of the additional trigger circuit and upon completion of the sequential operations of all the circuits in the series, from either electronic condition to the reverse electronic condition and, upon completion of repeat sequential operations of the circuits in the series, to be tripped back to its previous electronic condition, whereby the additional circuit alternates in electronic condition in accordance with the number of times sequential operations of the circuits in the series are completed, and means for pulsing all of said trigger circuits, including the additional trigger circuit, concurrently for entering digits in the network to effect said operations of the series of circuits and of the additional circuit in accordance with the cumulative value of digits entered.

32. An electronic accumulator or the like comprising a series of electronic elements, alternately operable to an on and to an off condition, means so electrically connecting said elements that successive elements of said series condition one other element, only, for reversal from off to on condition, an additional electronic element also alternately operable to on and to off condition, and electrical means by which one element of said series conditions said additional element for reversal from either assumed condition to the other, and pulsing means commonly connected to all of said elements, including the additional element, for stepping along the on condition of said first elements and operating said additional element alternately to on and to off condition.

ARTHUR H. DICKINSON.